United States Patent [19]
Yamashiro et al.

[11] Patent Number: 5,884,718
[45] Date of Patent: Mar. 23, 1999

[54] TRAVELING APPARATUS, AND CONTROL METHOD AND ROTATIONAL-ANGLE DETECTOR APPLIED THERETO

[75] Inventors: Ryoji Yamashiro, Kamakura; Tomoyuki Yasuda, Naka-gun; Ryuji Koshiba, Setagaya-ku, all of Japan

[73] Assignee: Nikon Corporation, Japan

[21] Appl. No.: 512,855

[22] Filed: Aug. 9, 1995

Related U.S. Application Data

[63] Continuation-in-part of Ser. No. 288,538, Aug. 10, 1994, abandoned.

[30] Foreign Application Priority Data

| Aug. 11, 1993 | [JP] | Japan | 5-199680 |
| Sep. 24, 1993 | [JP] | Japan | 5-237655 |
| Sep. 24, 1993 | [JP] | Japan | 5-237656 |
| Dec. 15, 1993 | [JP] | Japan | 5-315451 |
| Dec. 15, 1993 | [JP] | Japan | 5-315453 |
| Dec. 12, 1994 | [JP] | Japan | 6-307254 |

[51] Int. Cl.⁶ ............................... B62D 5/00
[52] U.S. Cl. ............................ 180/9.32; 180/9.36
[58] Field of Search ........................ 180/9.1, 9.32, 180/9.34, 9.36, 9.38, 21, 209; 280/43, 43.17, 43.23, 43.24

[56] References Cited

U.S. PATENT DOCUMENTS

| 3,346,062 | 10/1967 | Richison et al. | 180/9.32 X |
| 4,671,369 | 6/1987 | Tiffin et al. | 180/9.32 X |
| 4,915,184 | 4/1990 | Watkins | 180/9.32 X |
| 4,977,971 | 12/1990 | Crane, III et al. | 180/9.32 X |
| 5,395,129 | 3/1995 | Kao | 180/9.32 X |

*Primary Examiner*—Kevin Hurley
*Attorney, Agent, or Firm*—Pennie & Edmonds LLP

[57] ABSTRACT

A traveling apparatus which can travel on a flat ground and on stairs is disclosed. The traveling apparatus is comprising a pair of left and right crawler units arranged on either one of a front portion and a rear portion below a body, a crawler unit arranged on the other one of the front portion and the rear portion, a wheel arranged at the center between the pair of left and right crawler units, and a pair of wheels arranged left and right with respect to the crawler unit. Here the wheels are arranged to move up and down relative to the crawler units.

7 Claims, 45 Drawing Sheets

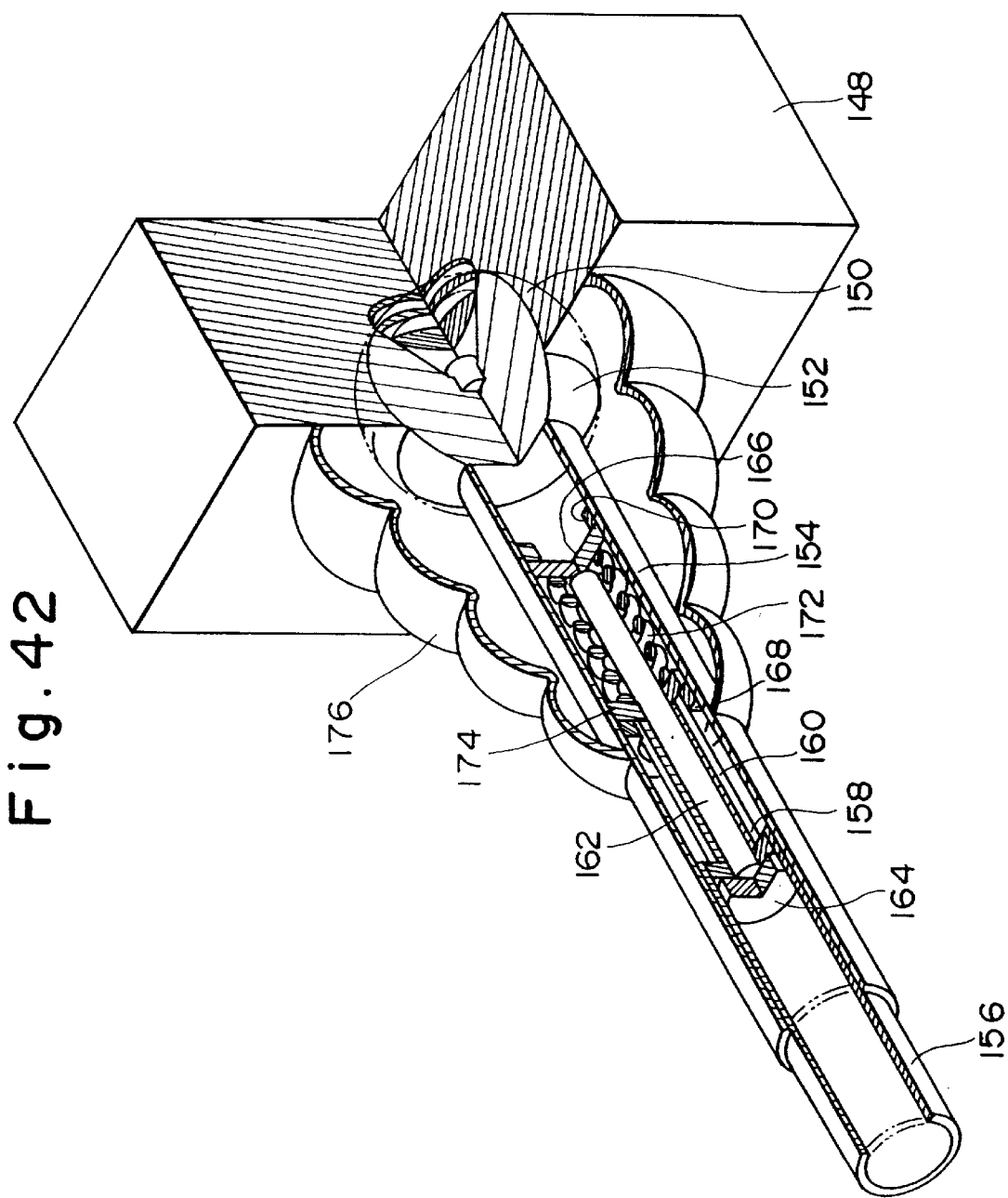

TRAVELING APPARATUS, AND CONTROL METHOD AND ROTATIONAL-ANGLE DETECTOR APPLIED THERETO

RELATED APPLICATIONS

This is a continuation-in-part of application Ser. No. 08/288,538 filed Aug. 10, 1994 now abandoned.

BACKGROUND OF THE INVENTION

1. Field of the Invention

The present invention relates to a traveling apparatus which can travel on the flat ground and travel up and down on the stairs, a follow-up control method applied when an operator controls the traveling apparatus, and a rotational-angle detecting apparatus used in controlling the traveling apparatus.

2. Related Background Art

An example of conventional traveling apparatus of this type is one as described in Japanese Laid-open Patent Application No. 56-138071, which is shown in FIG. 1. The apparatus is so arranged that four independently driven crawler units $12_1$ thru $12_4$ are set at the four corners of main body 10 so as to swing about respective fulcrums at one ends $14_1$ thru $14_4$ independently of each other whereby the apparatus can take various postures. Another example is one as described in Japanese Laid-open Patent Application No. 58-167262, which is shown in FIG. 2. In the apparatus arms $18_1$, 182 with auxiliary wheels $16_1$, $16_2$ at the distal end are rotated to change the shape of crawlers so as to enhance the traveling properties on the stairs. A further example is one as described in Japanese Laid-open Patent Application No. 3-279087, which is shown in FIG. 3. In the apparatus four crawler units $20_1$ thru $20_4$ are so set as to rotate or swing about respective fulcrums at central portions $22_1$ thru $22_4$ and a plurality of motors are provided to drive and swing the crawler units $20_1$ thru $20_4$. Another example of a combination of crawler units and wheels is one as described in Japanese Laid-open Patent Application No. 60-85083, which is shown in FIG. 4. In the apparatus traveling wheels $28_1$, $28_2$ having up-and-down mechanisms $26_1$, $26_2$ are given in addition to crawlers 24 whereby the apparatus can travel on the stairs and can travel at high speed on the flat ground.

The conventional traveling apparatus had, however, the following problems. The example of FIG. 1 requires a great deal of skill in handling to change the posture of crawler units $12_1$ thru $12_4$ in accordance with the road conditions. The example of FIG. 2 requires a complex control to change the posture. Further, the example of FIG. 3 needs a lot of motors for crawler units $20_1$ thru $20_4$, which makes the structure complex. In addition, these three examples had the problem that the traveling speed was slower on the flat ground because of the drive of crawlers as compared with the wheel traveling, which lowered the energy efficiency. The example of FIG. 4 has the traveling wheels $28_1$, $28_2$, but is provided with only a pair of crawlers 24 fixed on the body. This arrangement brings a drawback that shock cannot be avoided upon sudden forward inclination at the start of descending stairs or at the end of ascending stairs.

SUMMARY OF THE INVENTION

It is, therefore, an object of the present invention to provide a compact traveling apparatus which is excellent in the traveling properties on the stairs and on the flat ground. It is another object of the present invention to provide a follow-up control method applied when an operator controls the traveling apparatus and to provide a rotational-angle detecting apparatus used in controlling the traveling apparatus.

An above object of the invention can be achieved by a traveling apparatus which can travel on a flat ground and on stairs, comprising a pair of left and right crawler units arranged on either one of a front portion and a rear portion below a body, a crawler unit arranged on the other one of the front portion and the rear portion, a wheel arranged at the center between the pair of left and right crawler units, and a pair of wheels arranged left and right with respect to the crawler unit, wherein the wheels are arranged to move up and down relative to the crawler units.

Another object of the invention can be achieved by a method for controlling a traveling apparatus, in which when an operator moves while grasping a control bar projecting from the traveling apparatus, the traveling apparatus is controlled based on an operational force transmitted from the operator to the control bar so that a speed of the traveling apparatus becomes equal to a speed of the operator, comprising comparing a value of the operational force with a first value preliminarily set and with a second value preliminarily set as having the same sign as the first value, an absolute value of the first value being larger than an absolute value of the second value, accelerating the traveling apparatus at an acceleration according to the value of the operational force when the value of the operational force has the same sign as the second value and an absolute value of the operational force is greater than the absolute value of the second value, decelerating the traveling apparatus at an acceleration according to the value of the operational force when the value of the operational force has the same sign as the first value and the absolute value of the operational force is greater than an absolute value of the first value and the absolute value of the operational force is smaller than an absolute value of the second value, and stopping the traveling apparatus when the value of operational force has the same sign as the first value and the absolute value of the operational force is smaller than the absolute value of the first value.

Also another object of the invention can be achieved by an apparatus for detecting rotational angles with three degrees of freedom, comprising a ball rotating together with a measured object, a holder having a spherical inner surface for receiving the ball to form a spherical joint with the ball, a first belt light-emitting member set on either one of the ball and the holder, a first belt light-receiving member set on the other one of the ball and the holder, and detecting means for a detecting position of intersection between the light-emitting member and the light-receiving member.

In a follow-up control method of the present invention, a transmitting member for transmitting a motion of a moving object detects the motion of the moving object and control is exercised based on a result of the detection so as to make a traveling apparatus having drive means follow up the moving object. The motion of the moving object is detected as a distance difference between the traveling apparatus and the moving object from an amount of expansion or contraction of the transmitting member. The control is switched from a velocity control method for supplying a command to drive the drive means as using a value corresponding to the distance difference detected, as a velocity value to an acceleration control method for supplying a command to drive the drive means as using a value corresponding to the distance difference detected, as an acceleration value and using a value obtained by integrating the acceleration value with respect to time, as a velocity value. The switching is made manually or automatically between the velocity control method and the acceleration control method.

The velocity of the drive means is controlled by the velocity control method in the range where the velocity of the traveling apparatus is lower than a set value of control method switching velocity preliminarily set. When the velocity of the traveling apparatus exceeds the set value of control method switching velocity, the control is automatically switched from the velocity control method to the acceleration control method. Once the control is switched from the velocity control method to the acceleration control method, the velocity of the drive means is controlled by the acceleration control method before the velocity of the traveling apparatus becomes zero and the distance difference detected becomes zero. When the velocity of the traveling apparatus becomes zero and the distance difference detected becomes zero, the control of the velocity of the drive means is automatically switched to the velocity control method.

A preferred embodiment is so arranged that the motion of the moving object is detected as a force proportional to the amount of expansion or contraction of the transmitting member and that the force is converted into the distance difference between the traveling apparatus and the moving object.

A follow-up traveling apparatus of the present invention has drive means, detection means for detecting a motion of a moving object through a transmitting member, and control means for controlling the drive means, based on a result of the detection, and moves so as to follow up the moving object. The detection means detects the motion of the moving object in terms of the distance difference between the traveling apparatus and the moving object from an amount of expansion or contraction of the transmitting member. The control means comprises velocity control means for supplying a command to drive the drive means as using a value proportional to the distance difference detected, as a velocity value, an acceleration control means for supplying a command to drive the drive means as using a value proportional to the distance difference detected, as an acceleration value and using a value obtained by integrating the acceleration value with respect to time, as a velocity value, and control method switching means for performing manual or automatic switching between the velocity control means and the acceleration control means.

The control means is so arranged that the velocity control means controls the velocity of the drive means in the range where the velocity of the traveling apparatus is lower than a set value of control method switching velocity preliminarily set and that when the velocity of the traveling apparatus becomes greater than the set value of control method switching velocity, the control means performs automatic switching from the velocity control means to the acceleration control means. Once the control is switched from the velocity control means to the acceleration control means, the acceleration control means controls the velocity of the drive means before the velocity of the traveling apparatus becomes zero and the distance difference detected becomes zero. When the velocity of the traveling apparatus becomes zero and the distance difference detected becomes zero, the control of the velocity of the drive means is automatically switched to the velocity control means.

A preferred embodiment is so arranged that the detection means detects the motion of the moving object as a force proportional to the amount of expansion or contraction of the transmitting member and that the force is converted into the distance difference between the traveling apparatus and the moving object.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 42 is a perspective view, partly in cross section, to show an embodiment with another rotational-angle detecting mechanism in a similar arrangement to FIG. 24;

DESCRIPTION OF THE PREFERRED EMBODIMENTS

Figure 1:
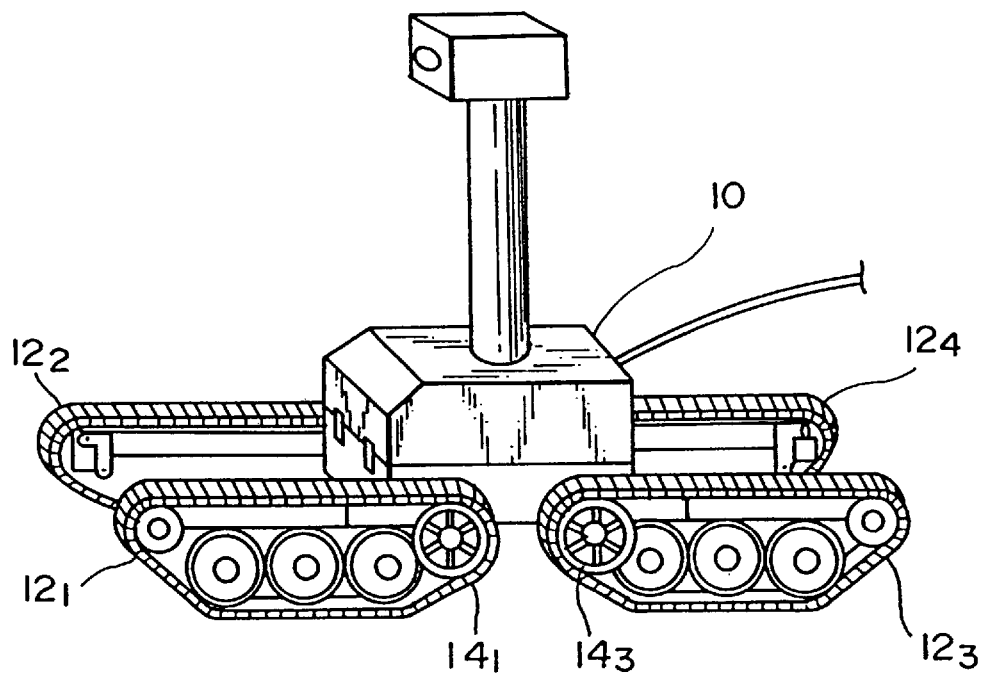
FIGS. 1, 2, 3 and 4 are drawings to show conventional traveling apparatus which can travel both on the flat ground and on the stairs.
Figure 2:
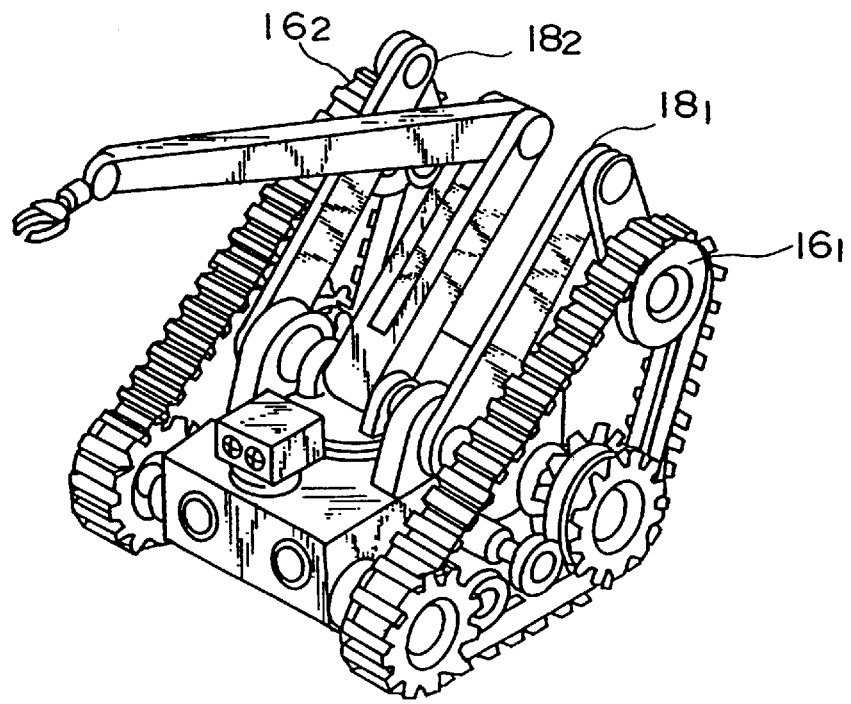
Figure 3:
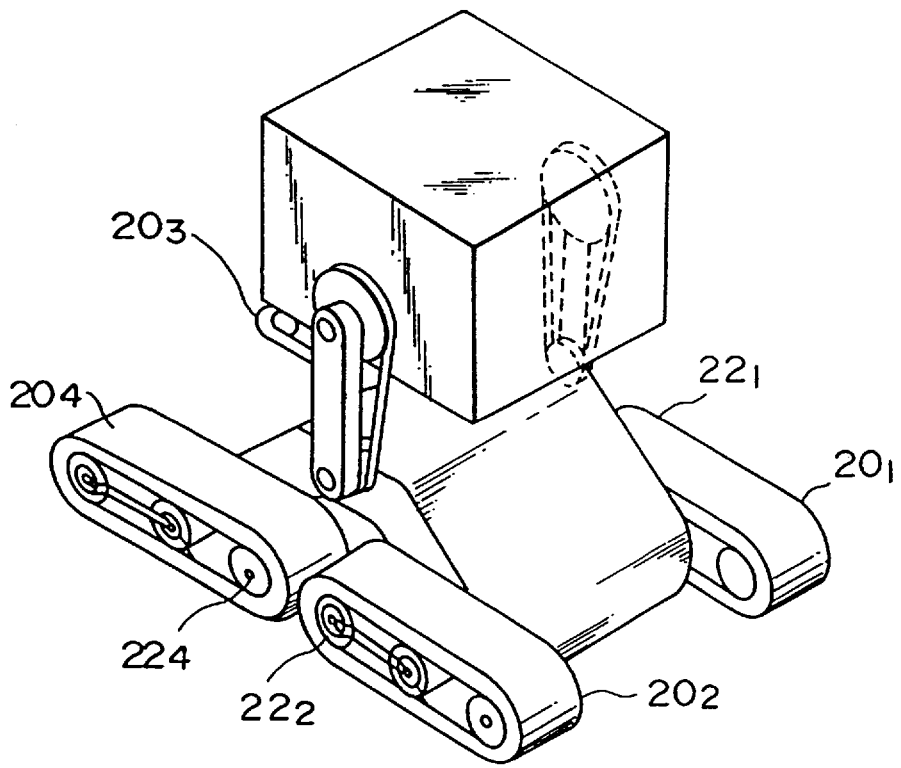
Figure 4:
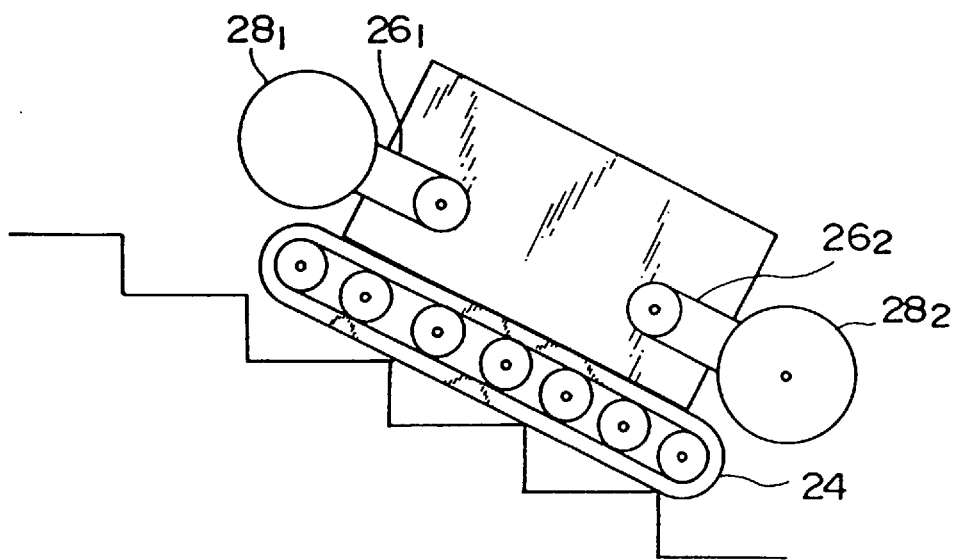

Preferred embodiments of the traveling apparatus according to the present invention will be described in detail with reference to the accompanying drawings. In the drawings, same or like elements are denoted by same reference numerals.

Figure 5:
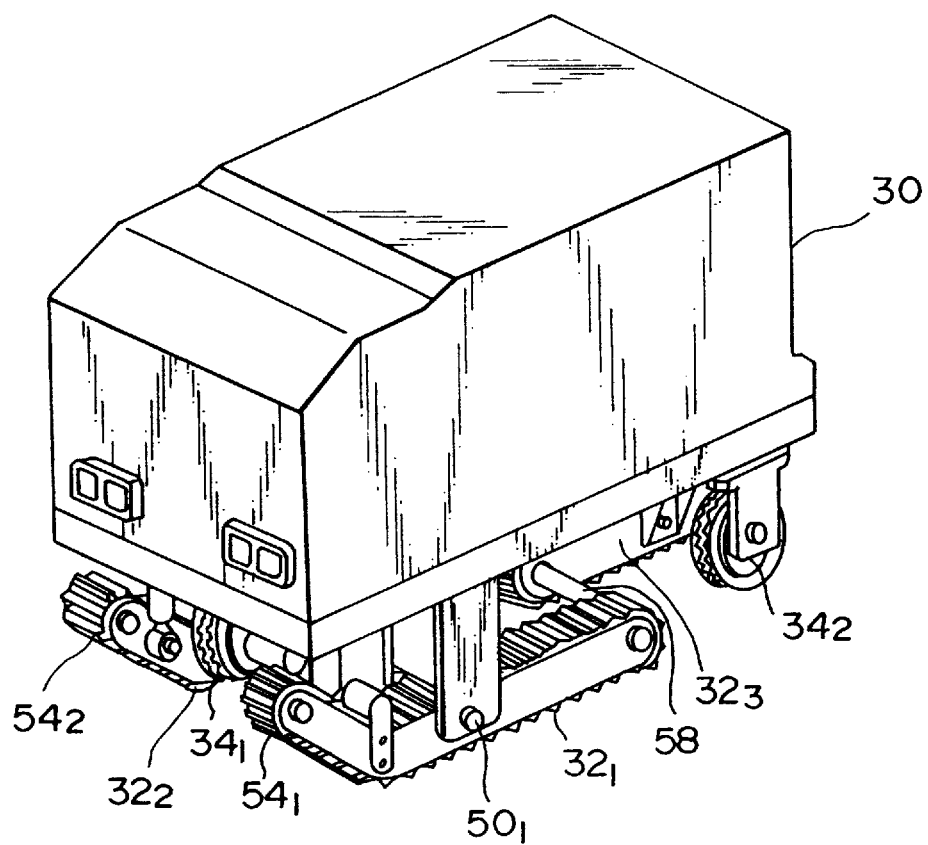
FIG. 5 is a perspective view to show appearance of a traveling apparatus in an embodiment of the present invention.
Figure 6:
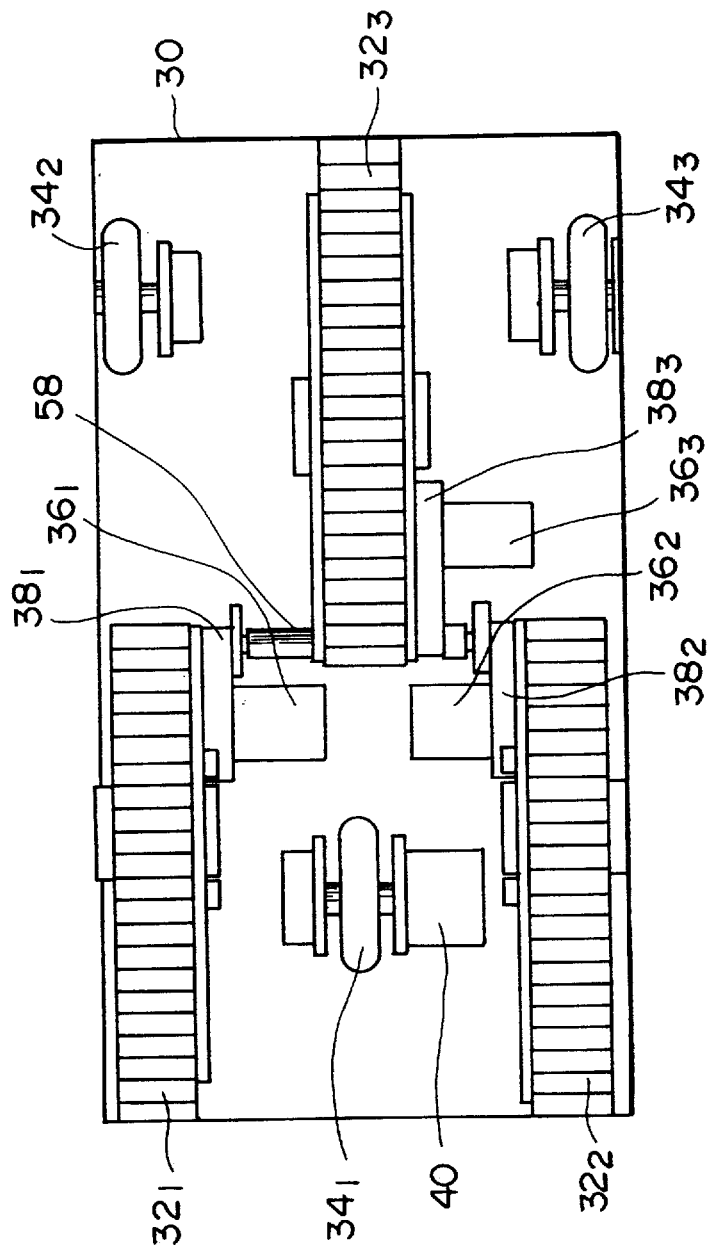
FIG. 6 is a bottom plan view to show the bottom view of the traveling apparatus of FIG. 5.

FIG. 5 is a perspective view to show a traveling apparatus in an embodiment. There are three crawler units $32_1$–$32_3$ and three wheels $34_1$–$34_3$ located below body 30. FIG. 6 is a bottom view of the traveling apparatus as seen from underneath the apparatus. A pair of crawler units $32_1$, $32_2$ are set in a front portion of the traveling apparatus (on the left side in FIG. 6) and a crawler unit $32_3$ is located in a rear portion of the traveling apparatus. Further, a wheel $34_1$ is set between the pair of crawler units $32_1$, $32_2$, and a pair of wheels $34_2$, $34_3$ are set left and right with respect to the crawler unit $32_3$. The wheel $34_1$ is a front wheel while the wheels $34_2$, $34_3$ are rear wheels. The crawler units $32_1$–$32_3$ are driven through reduction mechanisms $38_1$–$38_3$ for reducing the power of motors $36_1$–$36_3$. Power of drive mechanism 40 rotates the front wheel $34_1$ whereby the traveling apparatus is driven forward or backward. Further, the front wheel $34_1$ is rotated about the axis perpendicular to the plane of FIG. 6 to change the traveling direction of the traveling apparatus.

Figure 7:
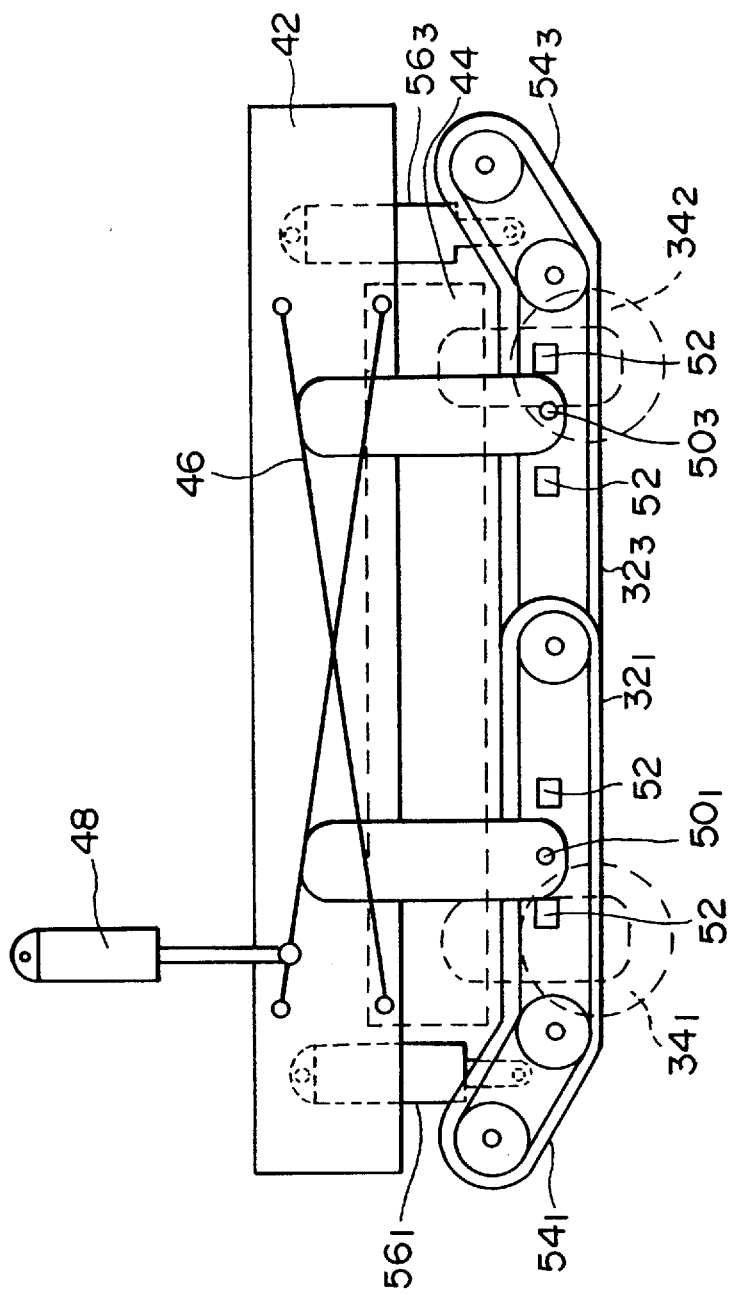
FIG. 7 is a side view of the traveling apparatus of FIG. 5.

Next described referring to FIG. 7 is a switching mechanism for switching the traveling mode between traveling with crawler units $32_1$–$32_3$ and traveling with wheels $34_1$–$34_3$. A frame of the traveling apparatus is composed of a body frame 42 and a subframe 44. The crawler units $32_1$–$32_3$ are mounted on the body frame 42, while the wheels $34_1$–$34_3$ on the subframe 44.

The body frame 42 and the subframe 44 are connected to each other through a parallel link mechanism 46. When a hydraulic cylinder 48 for elevation extends or contracts, the subframe 44 changes its height to be located at the same height as or below the body frame 42. FIG. 7 shows, by dashed lines, a state in which the subframe 44 is located at the down position, where the bottom surfaces of crawler units $32_1$–$32_3$ are located above the ground-contact surfaces of wheels $34_1$–$34_3$, which is a wheel traveling mode. In this state the traveling apparatus can lightly travel on the flat ground through the rotation drive and steering operation of wheel $34_1$ while the crawler units $32_1$–$32_3$ are kept at rest. While the subframe 44 is kept at the down position, it is in contact with the crawler units $32_1$–$32_3$ to prevent undesired swinging of crawler units $32_1$–$32_3$.

When the subframe 44 is kept at the same height as the body frame 42, the wheels are in a floating condition and the apparatus is in a crawler traveling mode. In this state, all crawler units $32_1$–$32_3$ are driven to travel without driving the wheels. Since comb-teeth protrusions are formed on the outer surface of each crawler belt, as shown in FIG. 5, the apparatus can travel up and down on the stairs while surely catching the edges of stairs.

Figure 8:
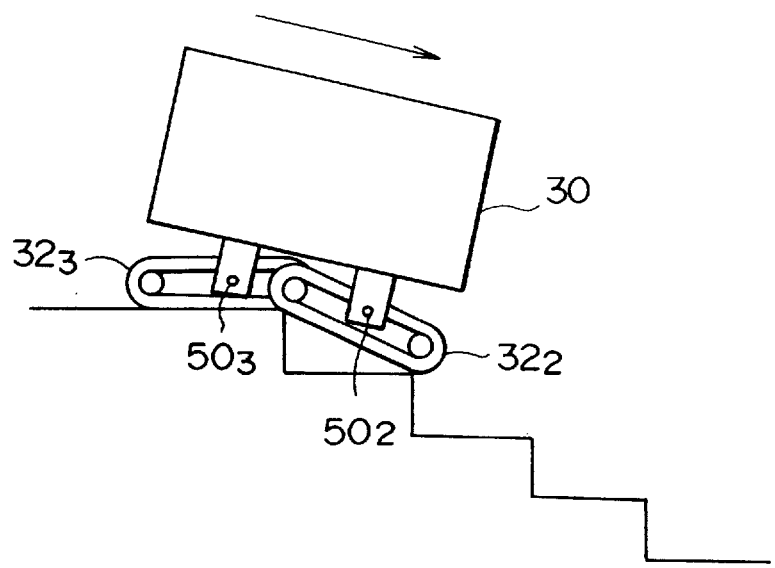
FIGS. 8 and 9 are drawings to show the operation of crawler units in such a circumstance that a slant angle of road suddenly changes.
Figure 9:
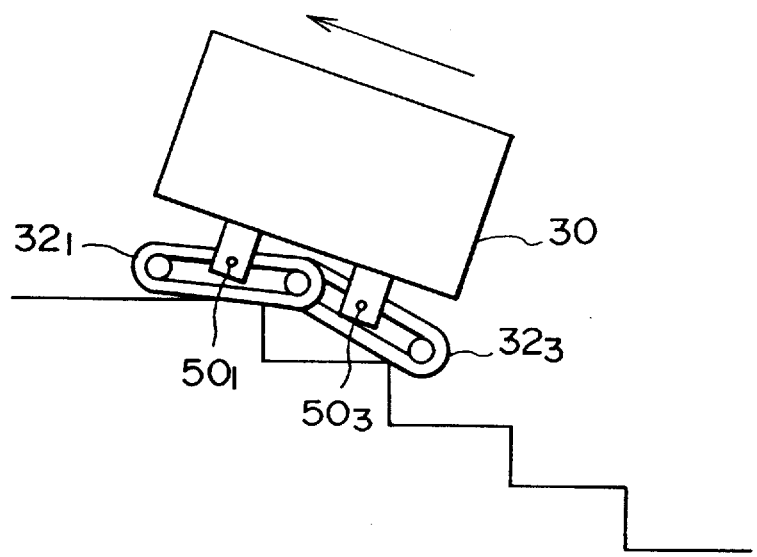

Next described is the swinging operation of crawler units $32_1$–$32_3$. Each crawler unit $32_1$–$32_3$ can rotate about the swing center axis $50_1$–$50_3$ (FIG. 5 and FIG. 7), so that it swings to follow the road surface with a change in inclination of road surface under such a circumstance that the road surface changes its inclination, whereby the traveling apparatus can move along the road surface. Such swinging operation is necessary at the start of descending the stairs, as shown in FIG. 8, and at the end of ascending the stairs, as shown in FIG. 9. Stoppers 52 (FIG. 7) define the upper limit and the lower limit of swinging angle of crawler unit $32_1$–$32_3$ so that the front crawler units $32_1$, $32_2$ can swing only in the direction in which the rear end rises and that the rear crawler unit $32_3$ can swing only in the direction in which the front end rises. The swinging operation of crawler unit $32_1$–$32_3$ is not started at the moment of the ascending start or the descending end. The front crawler units $32_1$, $32_2$ each have a slant portion $54_1$, $54_2$ extending forward and upward to facilitate smooth ascending start for a first step in the ascending stairs, while the rear crawler unit $32_3$ has a similar slant portion $54_3$ at the rear end to facilitate smooth descending end for a final step in the descending stairs.

Further, crawler units $32_1$–$32_3$ are equipped with respective dampers $56_1$–$56_3$, as shown in FIG. 7, which control the swinging speed. Even if the road surface has a sudden change of slant angle, as shown in FIG. 8 or FIG. 9, the crawler units $32_1$–$32_3$ will not swing soon, but the total inclination of the traveling apparatus slowly changes without positively controlling the swinging of crawler units $32_1$–$32_3$, which can avoid shock. It is noted that the slant portions $54_1$–$54_3$ are omitted in FIG. 8 and in FIG. 9.

The present embodiment was so arranged that the subframe 44 moving up and down was arranged in addition to the body frame 42 and that the wheels $34_1$–$34_3$ were mounted on the subframe 44, but the wheels $34_1$–$34_3$ may be so arranged as to be mounted through an up-and-down mechanism on the body frame 42.

Figure 10:
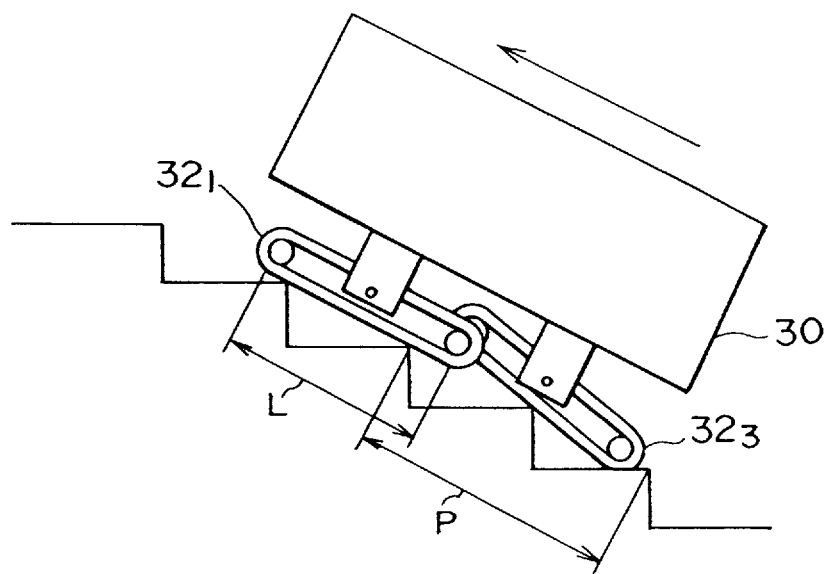
FIGS. 10 and 11 are drawings to show a difference in swinging motion between two types of traveling apparatus with and without a common shaft.
Figure 11:
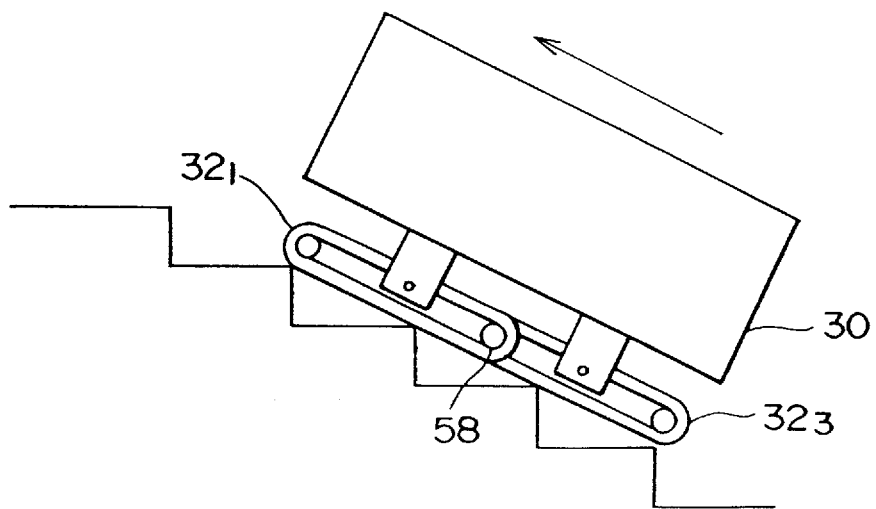

Center sprockets in crawler units $32_1$–$32_3$ are connected to each other through a common shaft 58, as shown in FIGS. 5 and 6. FIGS. 10 and 11 are explanatory drawings of the operation to show swinging states of respective traveling apparatus with and without the common shaft 58.

Since the length of ground contact of each crawler unit $32_1$–$32_3$, L, is shorter than a double of the pitch of the stairs, P, there are repetitive chances that a crawler unit $32_1$–$32_3$ contacts a step only at a point in ascending or descending the stairs, as shown in FIG. 10, which causes swinging motions on all such occasions. Connecting the front and rear crawler units $32_1$–$32_3$ through the common shaft 58, as shown in FIG. 11, even if one crawler unit is in a condition of swinging start, another crawler unit is in a non-swinging condition, which can prevent the swinging motion. Namely, the crawlers can function as if to be a continuous crawler belt having the length three or more times longer than the stairs pitch P during ascending or descending the stairs. This arrangement will never interfere the aforementioned swinging motion at the descending start or at the ascending end of the stairs.

It is noted that the slant portions $54_1$–$54_3$ are omitted in FIG. 10 and in FIG. 11.

Further, the present invention can be applied to all types of traveling vehicles which are either manned or unmanned and which can travel on the flat ground and up and down on the stairs.

Figure 12:
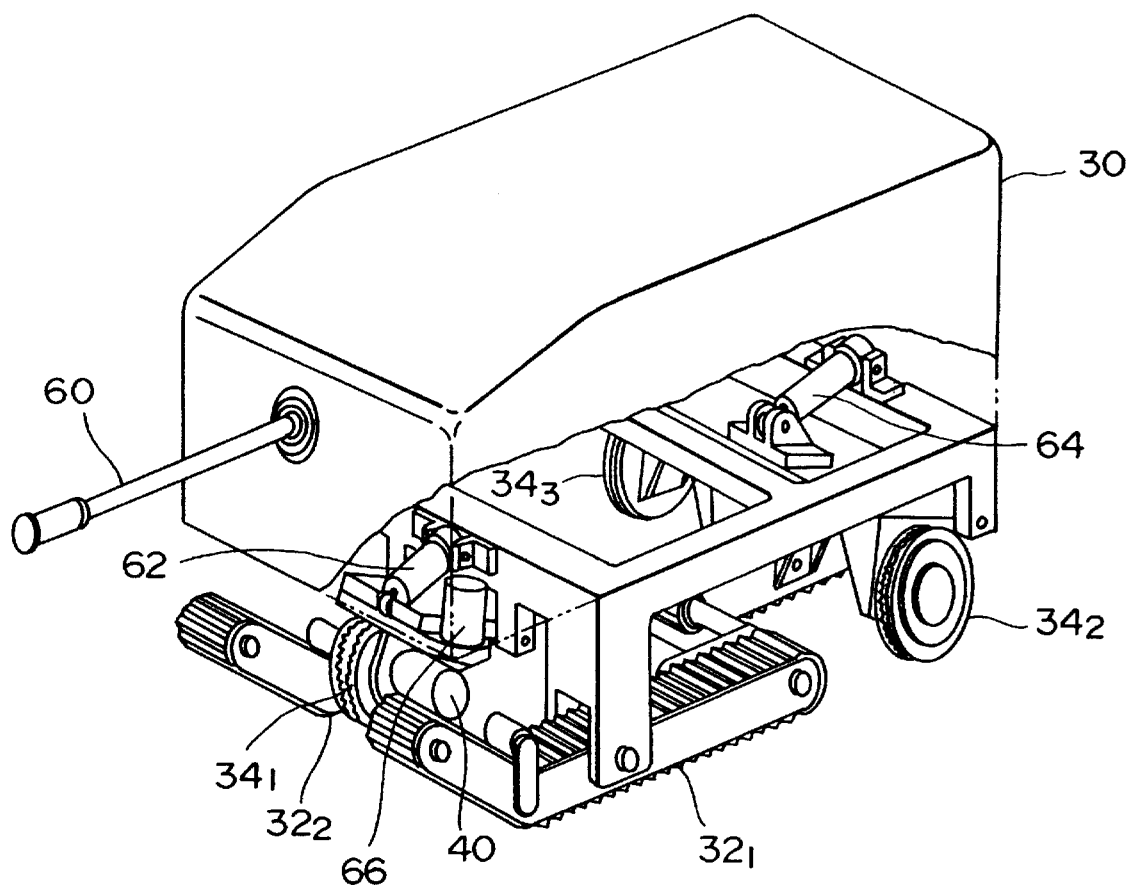
FIG. 12 is a drawing to show the traveling apparatus shown in FIG. 5 as equipped with a control bar to be controlled by an operator.

Next described is an embodiment of a control apparatus and a method applied to the traveling apparatus of the present invention. FIG. 12 is a drawing to show an arrangement in which the traveling apparatus shown in FIG. 5 is equipped with a control bar 60. The traveling apparatus of FIG. 5 was so arranged that the wheels $32_1$–$32_3$ were mounted on the subframe 44 and that the wheels $32_1$–$32_3$ moved up and down relative to the crawler units $32_1$–$32_3$ with an up or down motion of subframe 44, but the traveling apparatus of FIG. 12 is so arranged that the front wheel $34_1$ moves up and down with extension or contraction of cylinder 62 for moving the front wheel up and down while the rear wheels $34_2$, $34_3$ move up and down with extension or contraction of cylinder 64 for moving the rear wheels up and down. FIG. 12 also shows a steering motor 66 for changing the direction of front wheel $34_1$.

Figure 13:
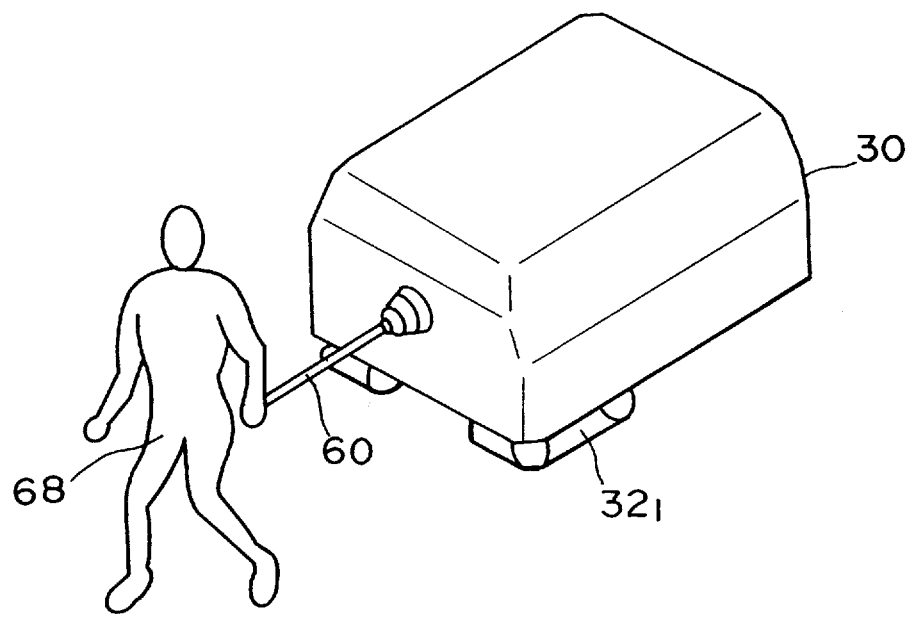
FIG. 13 is a drawing to show a state in which an operator grasps the control bar to manipulate the traveling apparatus.

FIG. 13 is a drawing to show an application of the present embodiment, in which an operator 68 holds the control bar 60 to control the traveling apparatus.

Figure 14:
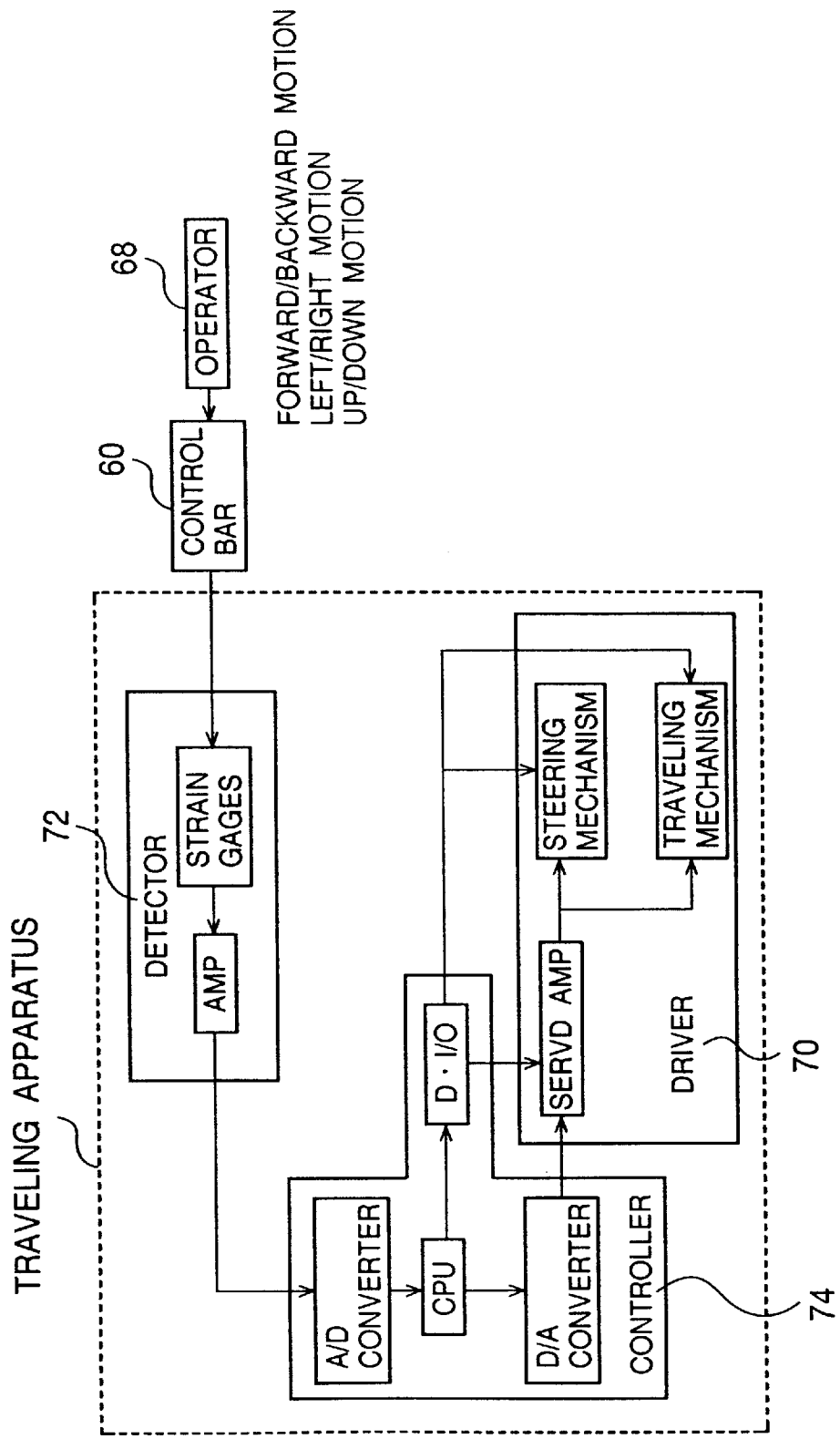
FIG. 14 is a block diagram to show a control system for the traveling apparatus.

In this case, a motion of operator 68 is transmitted trough the control bar 60 to the traveling apparatus. FIG. 14 is a schematic block diagram to show the construction of the present embodiment. The traveling apparatus is provided with a drive unit 70 having the traveling mechanism composed of crawler units $32_1$–$32_3$ and wheels $34_1$–$34_3$ and the steering mechanism for front wheel $34_1$; a detection unit 72 for detecting a motion of operator 68 through the control bar 60; and a control unit 74 for controlling the drive unit 70, based on detection results in the detection unit 72. The detection unit 72 has strain gages for detecting a force acting depending upon a speed difference between the traveling apparatus and the operator 68, and an amplifier for amplifying a signal detected by the strain gages. A signal amplified by the amplifier is supplied to the control unit 74. The control unit 74 includes an A/D converter, a CPU, a D/A converter, and DI/O (digital I/O). A signal output from the detection unit 72 is subjected to the analog-to-digital conversion in the AID converter and a converted signal is supplied to CPU. The CPU executes predetermined processing and outputs the results through the D/A converter and DI/O to the drive unit 70. The drive unit 70 has a servo amplifier in addition to the steering mechanism and the traveling mechanism. Traveling and steering is carried out by the steering mechanism and traveling mechanism, based on the signals supplied from the control unit 74. The constitution and the operation of the present embodiment will be described in more detail in the following.

Figure 15:
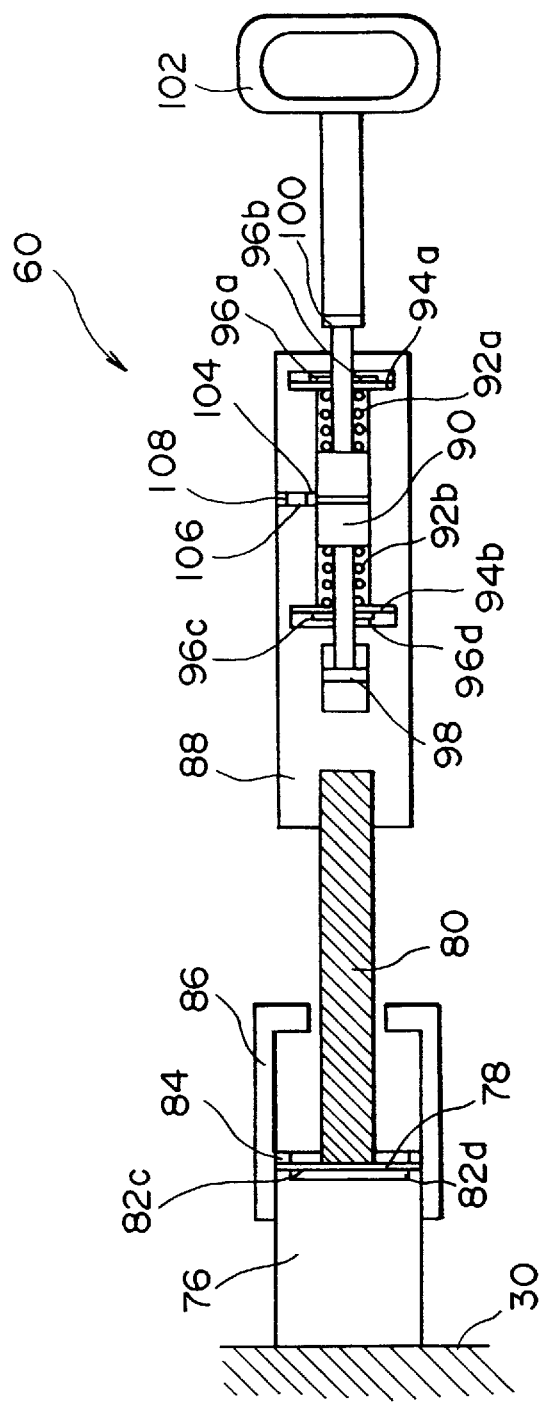
FIG. 15 is a drawing to show the structure of the control bar.
Figure 16:
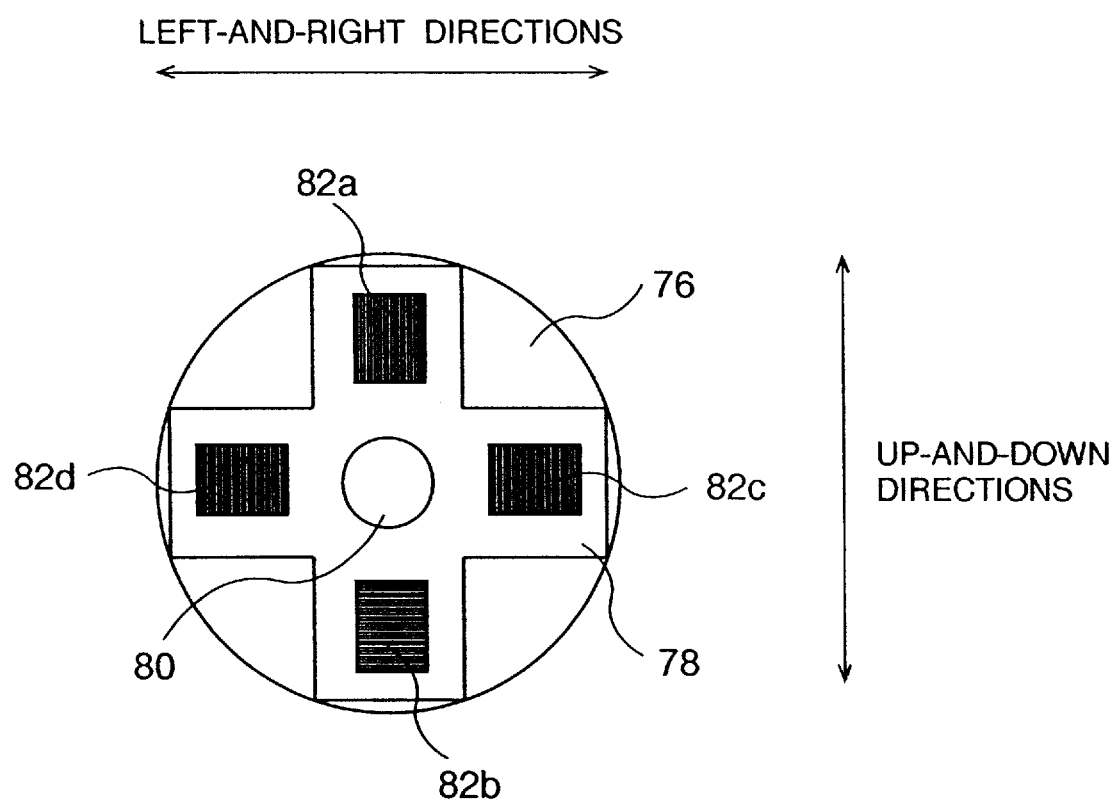
FIG. 16 is a drawing to show the structure of a diaphragm to which strain gages are bonded.

FIG. 15 is a top plan view of the control bar 60, which is connected through a cylindrical connecting portion 76 with a body 30 of the traveling apparatus. A diaphragm 78 is set on the connecting portion 76. One end of coil spring 80 is fixed on diaphragm 78, and four strain gages 82a thru 82d are attached to the diaphragm on the other side, as shown in FIG. 16. The diaphragm 78 is secured to the connecting portion 76 with junk ring 84. A protection cover 86 is fixed to the connecting portion 76 so as to cover the diaphragm 78 and the strain gages 82a–82d. A cylindrical block 88 is fixed to the other end of coil spring 80. Inside the block 88 there are a cylinder 90, a pair of coil springs 92a, 92b applying a thrust force on the cylinder 90, and plate springs 94a, 94b fixed to the block 88. Strain gages 96a, 96b are bonded to the plate spring 94a, while strain gages 96c, 96d to the plate spring 94b. A forward stopper 98 is given at one end of cylinder 90 while a backward stopper 100 and a control handle 102 at the other end. A compression coil spring 106 and a set screw 108 urge a neutral-point holding ball 104 into a groove at the center of cylinder 90, whereby the position of the groove (hereinafter referred to as a neutral point) is kept at the center even with small deviation of force balance between coil springs 92a and 92b on the both sides of cylinder 90. At the neutral point the coil springs 92a, 92b are nearly free with a small compressive force being exerted thereon.

Figure 17:
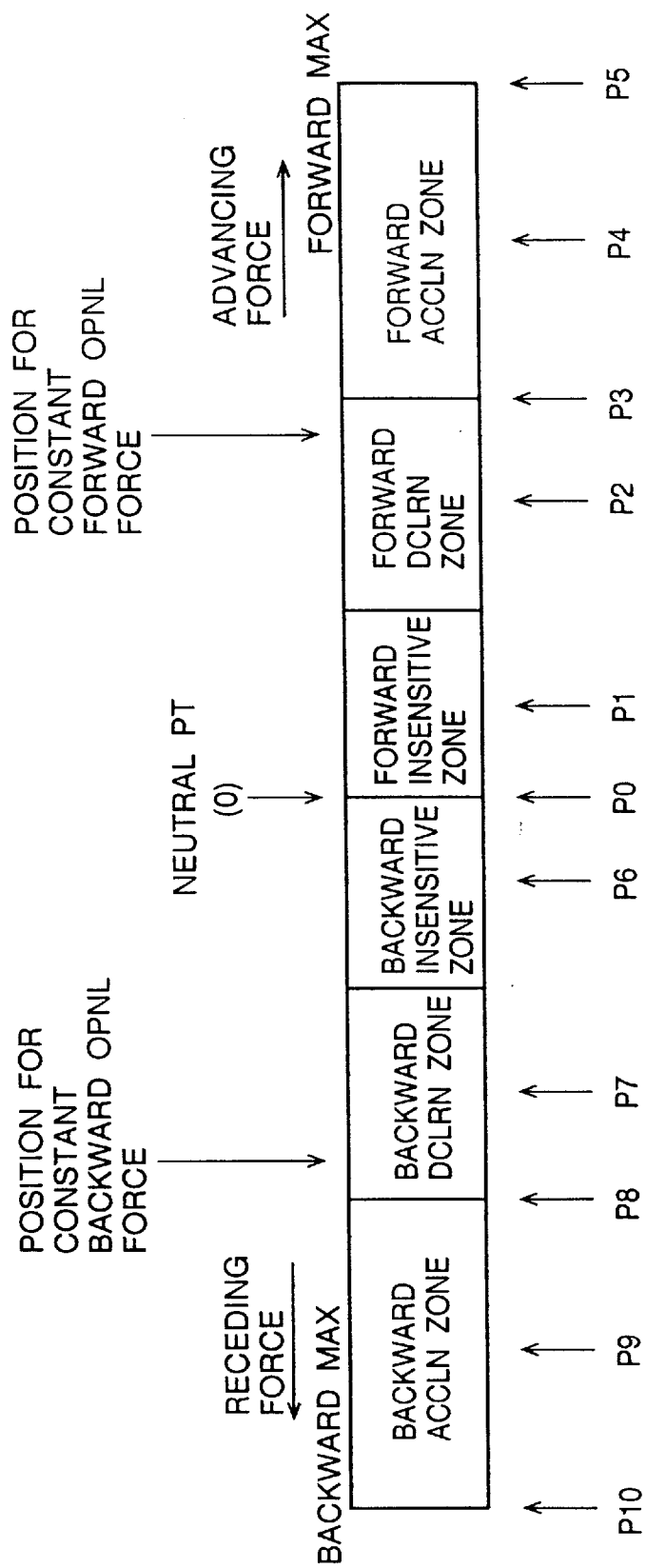
FIG. 17 is a drawing to show a relation between a force exerted on the control bar and a speed control of the traveling apparatus.
Figure 18:
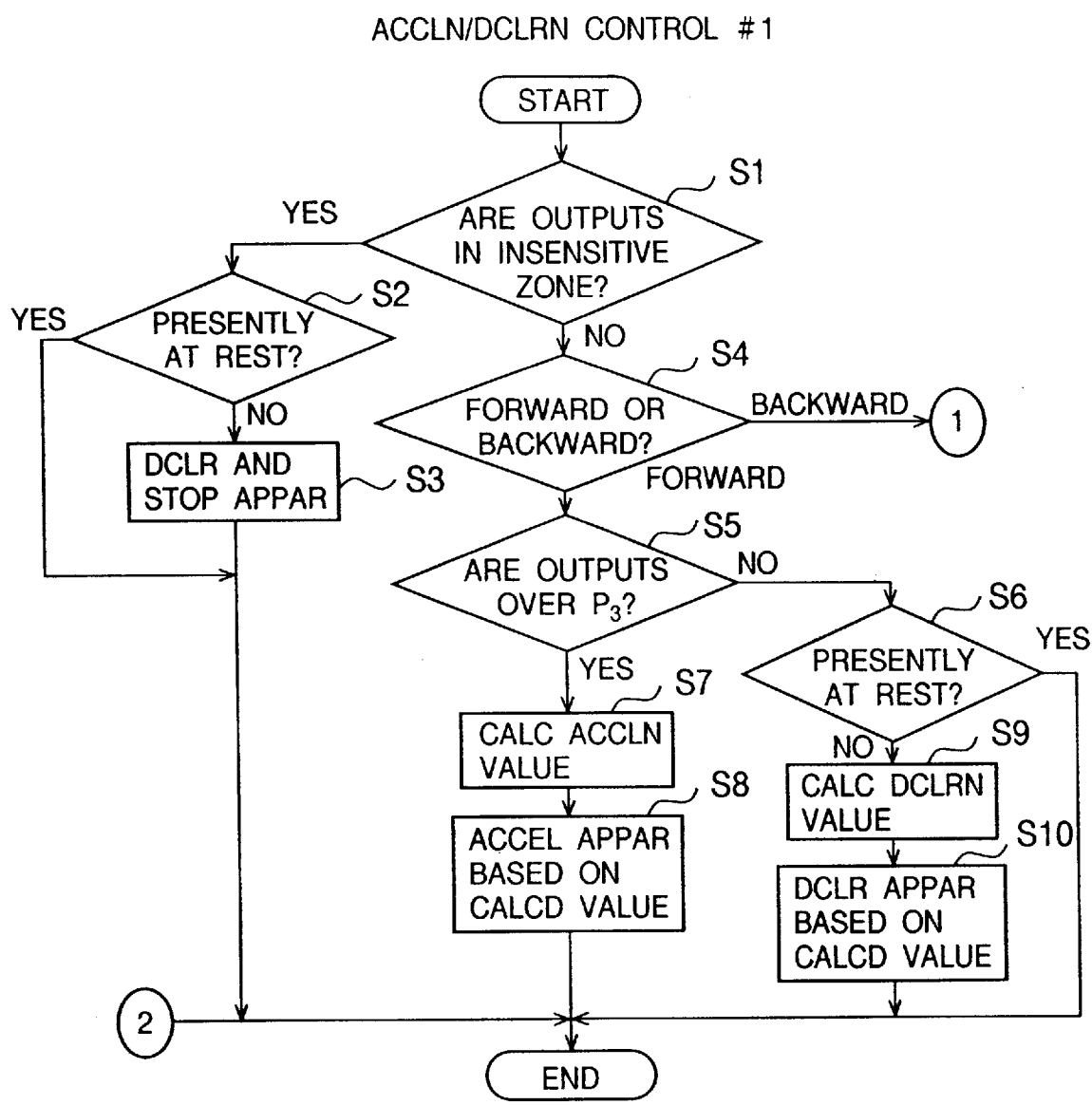
FIGS. 18 and 19 are a flowchart to show an acceleration/deceleration control of the traveling apparatus.
Figure 19:
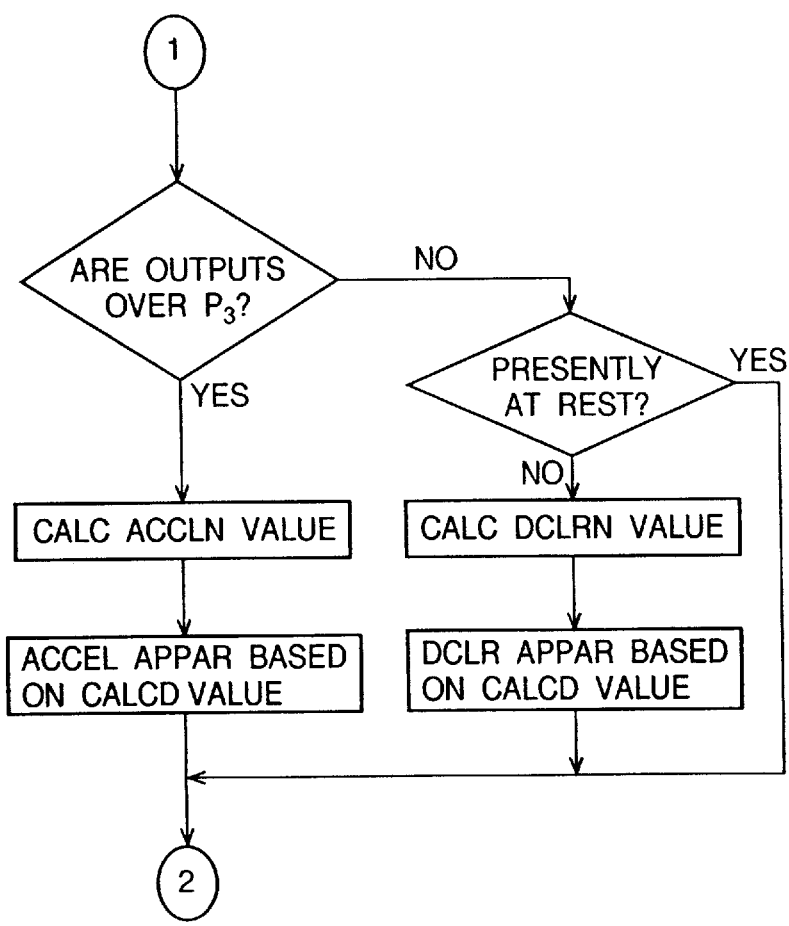

FIG. 17 is a drawing to show a relation between the force exerted on the control bar 60 (outputs from strain gages 96a–96d) and the speed control of the traveling apparatus, and FIGS. 18 and 19 are a flowchart to indicate a sequence of the control. Next described is the steps of the acceleration and deceleration control in the present embodiment. While the operator 68 applies no force onto the control handle 102, the cylinder 90 is kept at the neutral point through the balance of coil springs 92a, 92b and the neutral point holding ball 104, as described above. Supposing values of signals from strain gages 96a–96d are zero at this moment, the position of neutral point $P_0$ in FIG. 17 indicates a relation at this moment between the force exerted on the control bar 60, i.e., the values of signals output from the strain gages 96a–96d, and the speed control. In this case, the control unit 74 (FIG. 14) sends a control signal for stopping the traveling apparatus to the drive unit 70 (step S1, FIG. 18). Then whether the traveling apparatus is at rest or not is judged (step S2). If it is at rest that state is maintained; if it is moving deceleration is effected to stop the traveling apparatus (step S3).

A memory (not shown) in control unit 74 preliminarily stores a value to be output from strain gages 96a, 96b at position $P_3$ for a constant operating force shown in FIG. 17. When the operator 68 starts walking forward at a certain speed as grasping the control handle 102, the cylinder 90 is pulled forward to compress the coil spring 92a, deforming the plate spring 94a. If it is judged at the above step S1 that values of output signals from strain gages 96a, 96b bonded to the plate spring 94a indicate a position in forward insensitive zone $P_1$ in FIG. 17, the control unit 74 sends a control signal to stop the traveling apparatus to the drive unit 70 (steps S1 and S2). When the cylinder 90 is further pulled forward, an amount of deformation of plate spring 94a increases whereby the values of signals from strain gages 96a, 96b further change. The control unit 74 compares the values with the preliminarily stored value at position $P_3$ for constant operational force (steps S4 and S5). If the values of signals are smaller than the value for position $P_3$ then the control unit proceeds to step S6. At step S6 the control unit judges whether the traveling apparatus is at rest or not. If it is at rest then that state is maintained. The operation with the traveling apparatus moving will be described later.

While the cylinder 90 is further pulled forward to increase an amount of deformation of plate spring 94a, the values of output signals from strain gages 96a, 96b increase through a forward deceleration zone $P_2$ and the position $P_3$ of constant operational force in FIG. 17 to go into a forward acceleration zone $P_4$. In this case, it is judged at step S5 that the values of signals from strain gages 96a, 96b are larger than the value for position $P_3$ of constant operational force, and the control unit 74 calculates an acceleration for accelerating the traveling apparatus, based on the detected values of signals (step S7), to output the thus calculated value to the drive unit 70. Since the values of signals from strain gages 96a, 96b indicate a difference of speed between the traveling apparatus and the operator 68, the control unit 74 calculates an acceleration value depending upon the values of signals. For example, if the values of signals are large (or if a difference between the values of signals and the value for position $P_3$ is large) the control unit 74 calculates a high acceleration value under the judgment that the speed difference is great. If the values are small (or if the difference between the values of signals and the value for position $P_3$ is small) the control unit 74 calculates a low acceleration value under the judgment that the speed difference is small. The drive unit 70 accelerates the traveling apparatus at the calculated acceleration in the selected direction (step S8).

After the start of movement of the traveling apparatus, the control unit 74 always compares the values of output signals from strain gages 96a, 96b with the preliminarily stored value for position $P_3$ of constant operational force (steps S1 and S5). If the values of signals are larger than the value for position $P_3$ (or if they are in the forward acceleration zone $P_4$), the control unit accelerates the traveling apparatus depending upon the values (steps S5, S7, and S8). If the values of signals are in the forward deceleration zone $P_2$ lower than the value for position $P_3$, the control unit proceeds to step S6. It is judged at step S6 whether the traveling apparatus is at rest or not. Since the traveling apparatus is in a moving state, the control unit calculates an acceleration for decelerating the traveling apparatus (which is a negative acceleration with respect to the traveling direction) (step S9). In this case, the negative acceleration thus calculated (hereinafter referred to as a deceleration) is set depending upon the values of signals. If a difference between the values of signals and the value for position $P_3$ is large the control unit calculates a high deceleration value depending upon the values of signals under the judgment that the speed difference is great. If the difference between the values of signals and the value for position $P_3$ is small the control unit calculates a low deceleration value depending upon the values of signals under the judgment that the speed difference is small. The drive unit 70 decelerates the traveling apparatus at the calculated deceleration in the selected direction (step S10).

As described, the control unit 74 outputs an acceleration/deceleration instruction to the drive unit 70 so that the values of output signals from strain gages 96a, 96b become equal to the value for position $P_3$ of constant operational force, whereby the traveling apparatus can move matching with the moving speed of operator 68 while the operator 68 feels a constant tension through the control handle 102 of control bar 60 during movement of traveling apparatus.

When the operator 68 stops, the compressive force of coil spring 92a cannot be kept constant. Then the values of signals from strain gages 96a, 96b pass through the forward deceleration zone $P_2$ to reach a position in the forward insensitive zone $P_1$. If the values become lower than the border between the deceleration zone $P_2$ and the insensitive zone $P_1$, the control unit 74 sends a control signal to stop the traveling apparatus to the drive unit 70 at step S1. Then it is judged whether the traveling apparatus is at rest or not (step S2). Since the traveling apparatus is still in a moving state, the control unit decelerates the traveling apparatus to stop it (step S3).

In case the operator 68 pushes the control handle 102, the control unit judges through coil spring 92b and strain gages 96c, 96d that the operator is in a backward motion (step S4). Similarly as in case of the forward motion, the control unit 74 and drive unit 70 execute a control of backward movement. FIG. 19 shows the control steps for the backward movement, the description of which will be omitted because it is conducted in the same manner as the forward movement. In FIGS. 18 and 19, ① and ② represent connections between the two flowchart segments.

Figure 20:
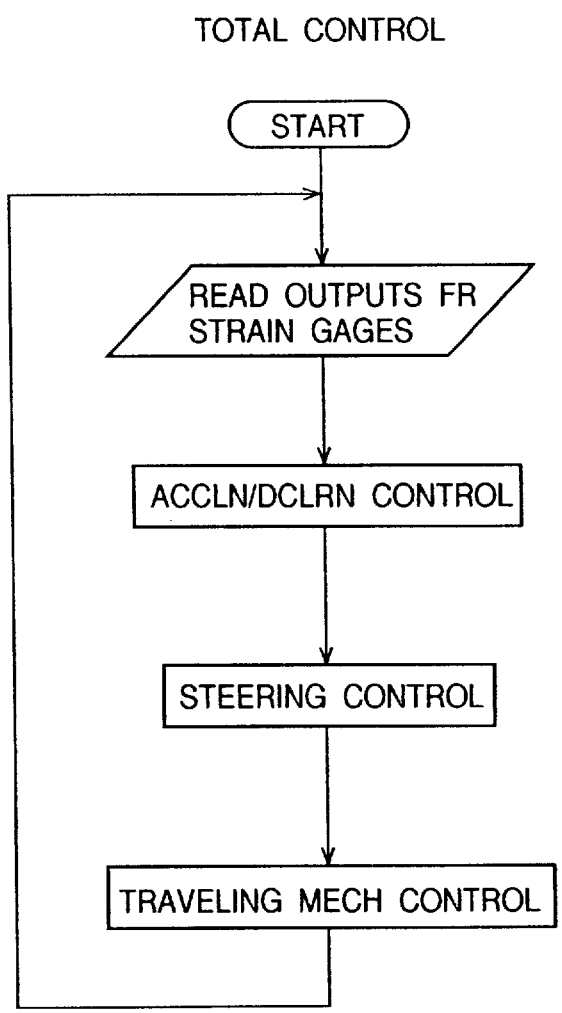
FIG. 20 is a flowchart to show a total control of the traveling apparatus.

The above description concerned the acceleration/deceleration control of the traveling apparatus. In addition, further executed are a steering control by changing the angle of front wheel 34, and a traveling mechanism control for switching the traveling mode between the traveling with crawler units $32_1$–$32_3$ and the traveling with wheels $34_1$–$34_3$. FIG. 20 shows a flowchart of the total control.

Figure 21:
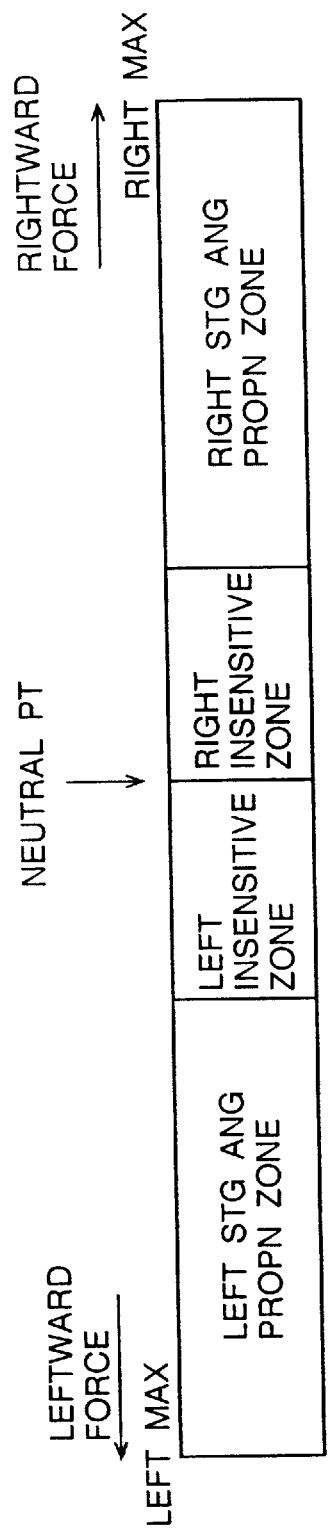
FIG. 21 is a drawing to show a relation between a force exerted on the control bar and a steering control of the traveling apparatus.
Figure 22:
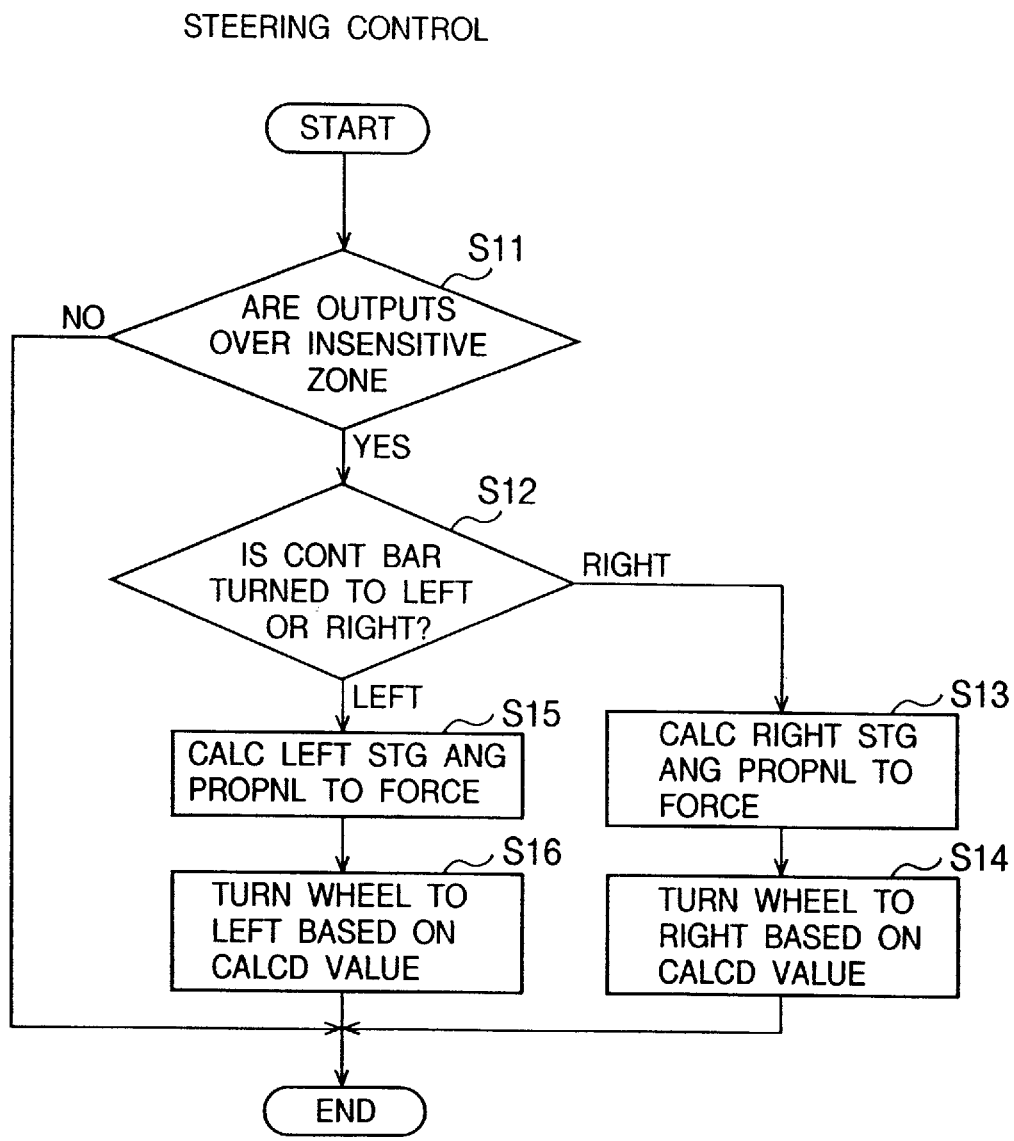
FIG. 22 is a flowchart to show the steering control of the traveling apparatus.

Next described is the steering control, which is the control for a left or right turning motion by changing the angle of front wheel $34_1$. This control is carried out based on output signals from strain gages 82c, 82d bonded to the diaphragm 78 (FIGS. 15 and 16). While the operator 68 moves forward or backward grasping the control handle 102 and when the operator makes a left or right turn, the coil spring 80 is deformed in that direction so as to deform the diaphragm 78 depending upon a force bending the coil spring 80. Because of the deformation, values of signals from strain gages 82c, 82d bonded to the diaphragm 78 change depending upon the direction and the force bending the coil spring 80. FIG. 21 is a drawing for the steering control, similar to FIG. 17, and FIG. 22 is a flowchart of the steering control.

First described is a case where the operator 68 lightly or a little turns the control bar 60 to the right. This case occurs when the operator 68 erroneously turns the control bar 60 to the right with a desire to go straight. In this case, signals from strain gages 82c, 82d are at a position in a right insensitive zone (FIG. 21). Then the control unit 74 judges whether the signals exceed the insensitive zone (step S11). Since the signals are within the insensitive zone, no steering operation is carried out. When the operator 68 strongly or largely turns the control bar 60 to the right, the signals from strain gages 82c, 82d exceed the right insensitive zone to reach a position in a right steering-angle proportional zone (FIG. 21). The control unit 74 also judges in this case whether the signals exceed the insensitive zone (step S11). Since they exceed the insensitive zone, it is further judged whether the control bar 60 is turned to the left or to the right (step S12). If the control bar is turned to the right, the control unit 74 calculates a steering angle to the right proportional to the magnitude of output signals from strain gages 82c, 82d, that is, proportional to the force bending the coil spring 80 to the right (step S13). The steering mechanism in drive unit 70 turns the front wheel $34_1$ to the right, based on the calculated value (step S14). Like operation is carried out if the control unit judges at step S12 that the control bar 60 is turned to the left (steps S15 and S16).

Figure 23:
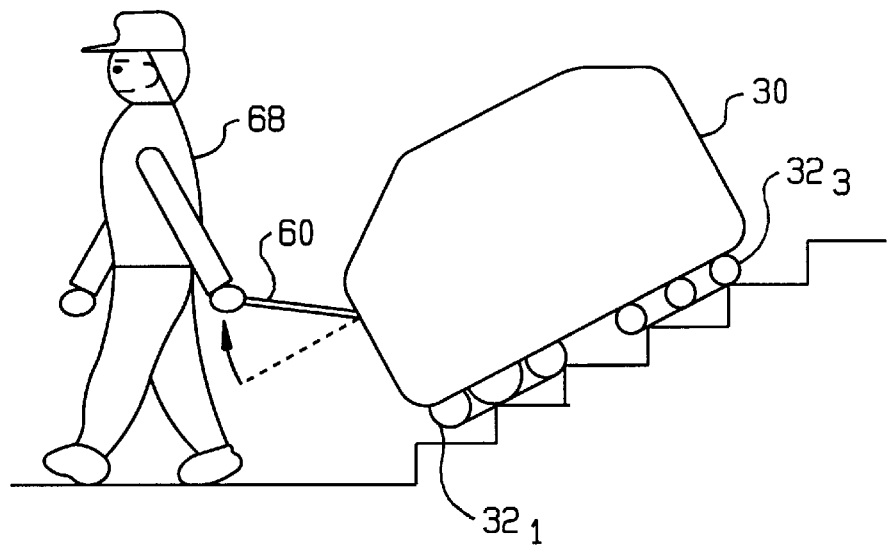
FIGS. 23 and 24 are drawings to show circumstances where a traveling mechanism control is executed.
Figure 24:
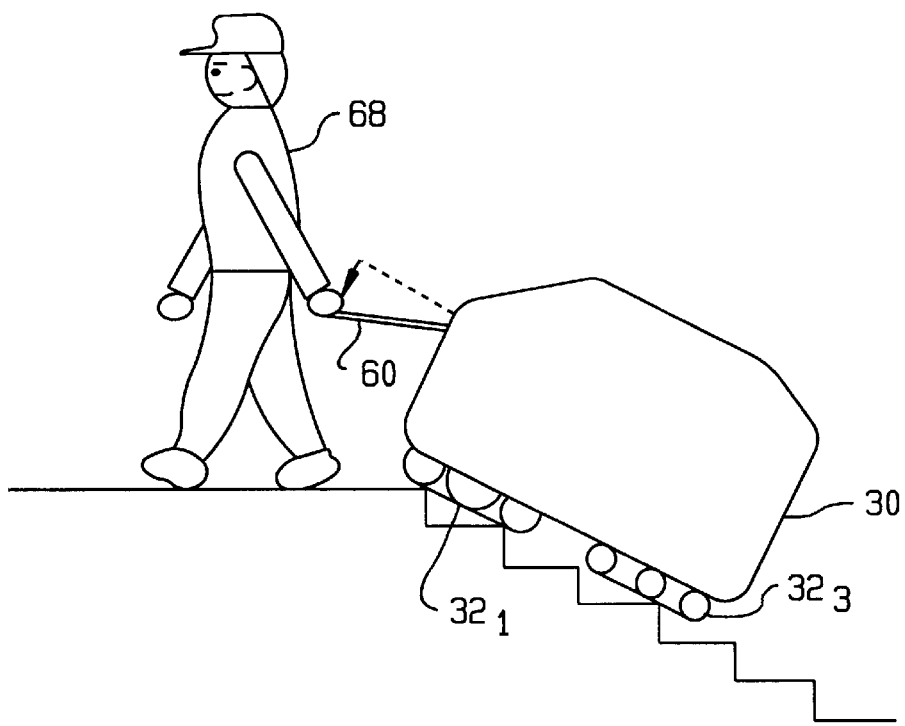
Figure 25:
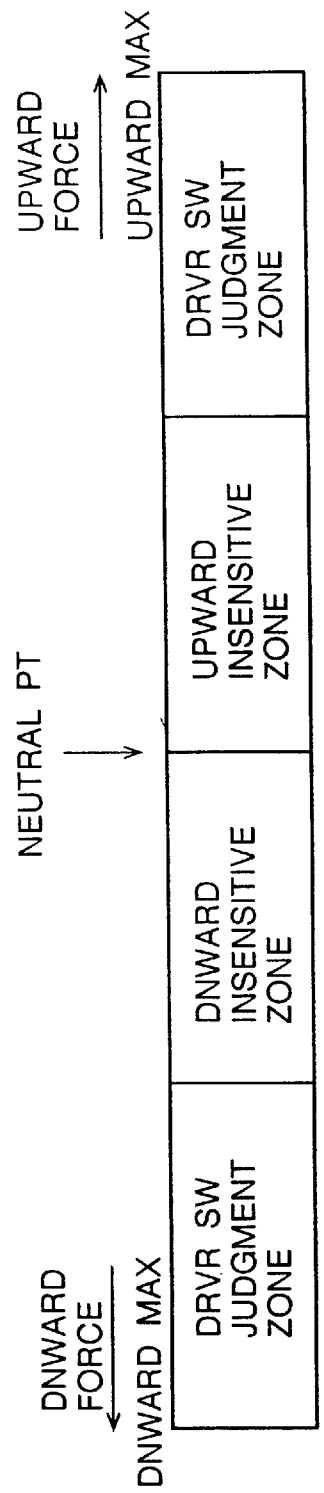
FIG. 25 is a drawing to show a relation between a force exerted on the control bar and the traveling mechanism control of the traveling apparatus.
Figure 26:
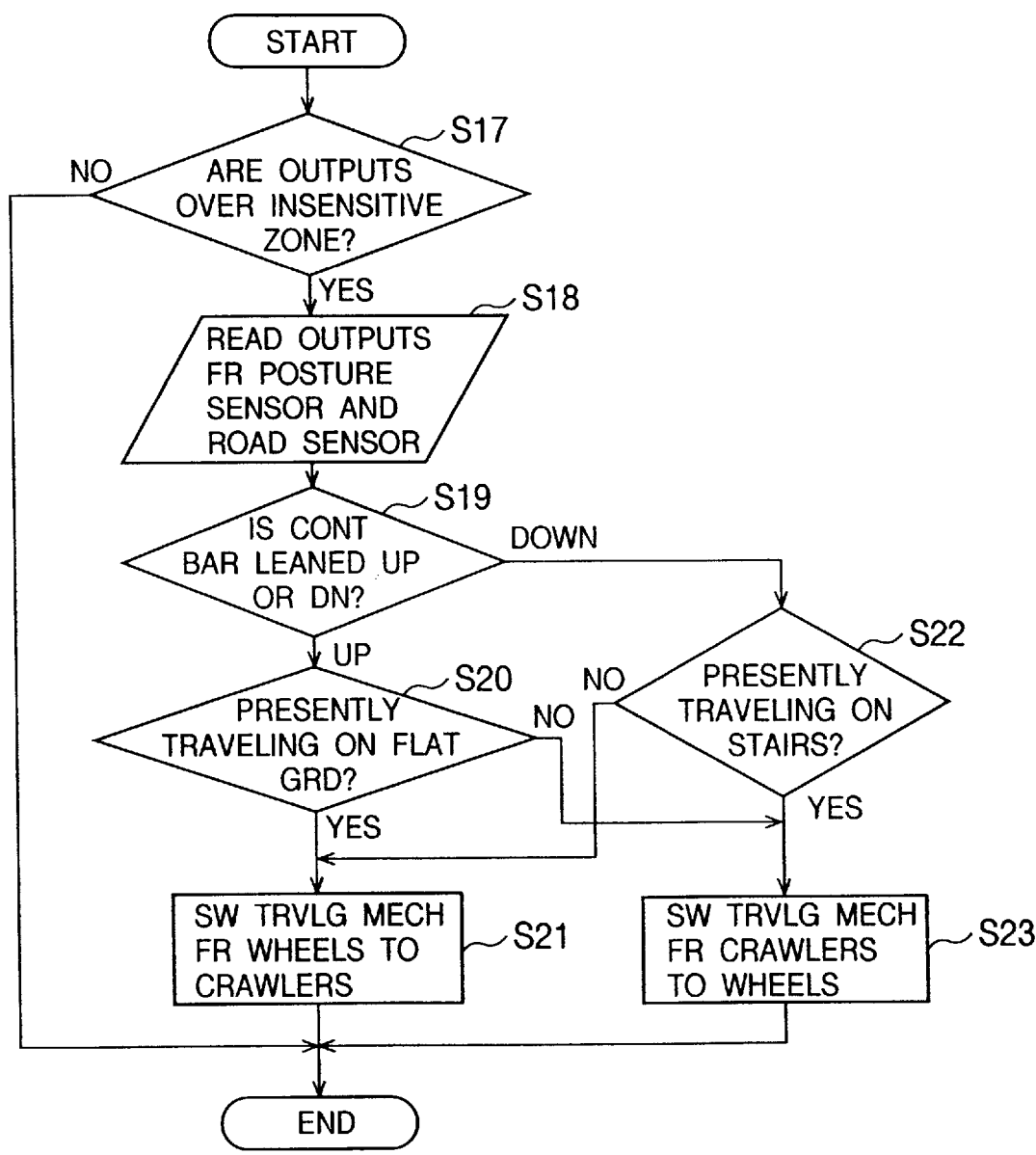
FIG. 26 is a flowchart to show the traveling mechanism control of the traveling apparatus.

Next described is the traveling mechanism control, which is the control for switching the traveling mode between the traveling with crawler units $32_1$–$32_3$ and the traveling with wheels $34_1$–$34_3$. This control is executed in the following cases: where the traveling apparatus finishes the operation of descending the stairs and starts traveling on the flat ground, as shown in FIG. 23; where the traveling apparatus finishes the operation of ascending the stairs and starts traveling on the flat ground, as shown in FIG. 24; where the motion is changed over from traveling on the flat ground to ascending the stairs; where the motion is changed over from the traveling on the flat ground to descending the stairs; where the traveling apparatus starts ascending or descending a slope; and where the traveling apparatus gets over a difference in level of road. This control is carried out based on output signals from strain gages 82a, 82b bonded to the diaphragm 78 (FIG. 16). The above cases occur while the operator 68 moves forward grasping the control handle 102. When the operator 68 leans the control bar 60 upward or downward, the coil spring 80 is deformed in that direction to deform the diaphragm 78 depending upon the force bending the coil spring 80. Because of the deformation, values of signals from strain gages 82a, 82b bonded to the diaphragm 78 change depending upon the direction and the force bending the coil spring 80. FIG. 25 is a drawing for the traveling mechanism control, similar to FIGS. 17 and 21, and FIG. 26 is a flowchart of the traveling mechanism control.

First described is a case where the operator 68 lightly or a little leans the control bar 60 upward. This case occurs when the operator 68 erroneously leans the control bar 60 upward in spite of no need to change over the traveling mechanism. In this case, signals from strain gages 82a, 82b are at a position in an upward insensitive zone (FIG. 25). The control unit 74 judges in this state whether the signals exceed the insensitive zone (step S17). Since the signals are within the insensitive zone, no changeover of the traveling mechanism is carried out.

Next described is a case of the state of FIG. 23. In this case, the operator 68 strongly or largely leans the control bar 60 upward. Then signals from strain gages 82a, 82b exceed the upward insensitive zone to reach a position in a drive-unit-switching determination zone (FIG. 25). The control unit 74 also judges at this moment whether the signals exceed the insensitive zone (step S17). Since the signals exceed the insensitive zone, a posture detecting sensor (not shown) and a road surface sensor (not shown) detect a posture of the traveling apparatus (whether the apparatus leans forward or backward) and road conditions (whether the traveling machine is traveling on the flat ground or on the stairs)(step S18), and it is further judged whether the control bar 60 is leaned upward or downward (step S19). Since the control bar 60 is leaned upward in this case, it is judged at step S20 whether the currently traveling surface is flat or not. Since the apparatus travels on the stairs, the operation of descending the stairs must be shifted to the operation of traveling on the flat ground. The traveling mechanism is thus changed over from the traveling mode with crawler units $32_1$–$32_3$ into the traveling mode with wheels $34_1$–$34_3$ (step S23).

In case of the state of FIG. 24, the control bar 60 is leaned downward and the currently traveling surface is the stairs. Then the traveling mechanism is changed over at step S23 from the traveling mode with crawler units $32_1$–$32_3$ into the traveling mode with wheels $34_1$–$34_3$ If the traveling apparatus is changed over from the flat traveling operation into the operation of ascending the stairs, the control bar 60 is leaned upward and the currently traveling surface is flat. Accordingly, the traveling mechanism is changed over at step S21 from the traveling mode with wheels $34_1$–$34_3$ into the traveling mode with crawler units $32_1$–$32_3$. Similarly, if the traveling apparatus is changed over from the flat traveling operation into the operation of descending the stairs, the control bar 60 is leaned downward and the currently traveling surface is flat. Therefore, the traveling mechanism is changed over at step S21 from the traveling mode with wheels $34_1$–$34_3$ into the traveling mode with crawler units $32_1$–$32_3$.

Figure 27:
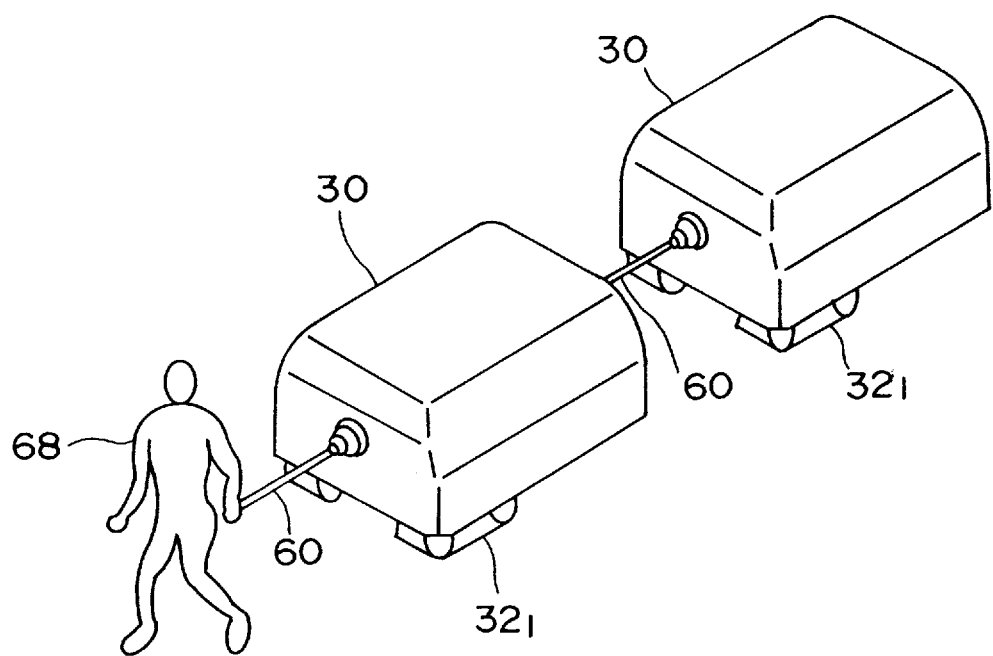
FIG. 27 is a drawing to show a state in which an operator is handling two traveling apparatus.

Performing the acceleration/deceleration control, steering control, and traveling mechanism control as described above, the traveling apparatus can follow up any motion of operator 68. The present embodiment concerned the example where an operator 68 handled a traveling apparatus. It is also possible that an operator 68 manipulates a plurality of traveling apparatus coupled with each other, as shown in FIG. 27. In this case, the second traveling apparatus regards the first traveling apparatus as an operator 68 and is so controlled as to follow up the first traveling apparatus. Also, the present embodiment showed an example of the traveling mechanism using the crawler units and wheels, but it should be noted that the present invention is by no means limited to the example.

Figure 28:
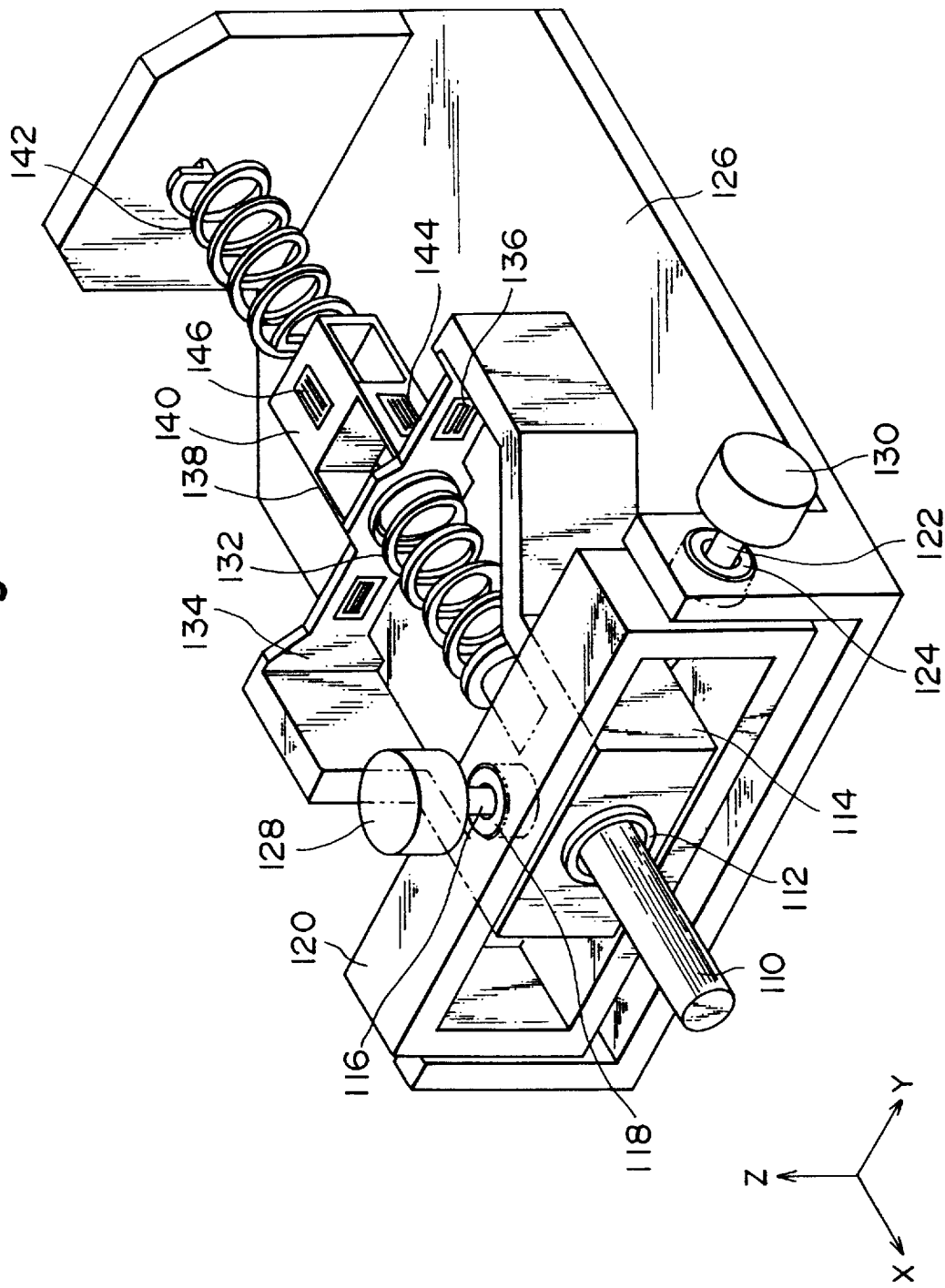
FIG. 28 is a perspective view to show an embodiment equipped with a different mechanism for the control bar from that shown in FIG. 15.

FIG. 28 is a perspective view to show another embodiment using a different mechanism for control bar 60 from that shown in FIG. 15. In FIG. 28, a control handle 110 is held by a linear bearing 112. The linear bearing 112 restricts motions of control handle 110 except for a motion along the x-axis (FIG. 28). The linear bearing 112 is fixed in block 114. A shaft 116 is arranged to project from block 114 in the z-direction. The shaft 116 is fixed to an inner ring of bearing 118. Although not shown, another bearing same as bearing 118 is arranged on the opposite side to bearing 118, supporting the block 114 in cooperation with bearing 118. The block 114 can freely rotate about the z-axis through the bearing 118 and another bearing on the opposite side.

An outer ring of bearing 118 is fixed in an outer frame 120. A shaft 122 is arranged to project from outer frame 120 in the y-axis and is fixed to an inner ring of bearing 124. Although not shown, another bearing same as bearing 124 is arranged on the opposite side of bearing 124, supporting the outer frame 120 in cooperation with bearing 124. The outer frame 120 can freely rotate about the y-axis through the bearing 124 and another bearing on the opposite side. Further, an outer ring of bearing 124 is fixed to a base 126, which is fixed inside the traveling apparatus. Thus, a gimbal is formed by the four bearings, i.e., bearing 118, bearing 124 and bearings arranged as opposed thereto. This gimbal permits the control handle 110, linear bearing 112, and block 114 to freely rotate about the y-axis and about the z-axis with respect to the traveling apparatus. A rotational angle can be read through encoder 128, 130 connected to shaft 116, 122. A coil spring 132 is fixed to the end of control handle 110 at one end and to a central portion of plate spring 134 integral with the block 114, at the other end. Strain gages 136 are bonded to the plate spring 134. Further, a parallel spring 138 is fixed to the central portion of plate spring 134 in such a manner that it can be deflected in the y-direction. Another parallel spring 140 is fixed to the rear end of parallel spring 138 in such a manner that it can be deflected in the z-direction. Further, a coil spring 142 is connected to the rear end of parallel spring 140 at one end and to the base 126 at the other end. The coil spring 142 prevents the block 114 from leaning because of its own weight. Strain gages 144 and 146 are bonded to the parallel springs 138 and 140, respectively.

The operation of this embodiment is next described. The linear bearing 112 permits the control handle 110 to be moved along the x-axis, as described above. Moving the control handle 110 forward or backward extends or contracts the coil spring 132, and a force due to the extension or contraction is transmitted to the plate spring 134. Since the plate spring 134 is fixed to the block 114 at the both ends, the extension or contraction of coil spring 132 deflects the plate spring 134 to cause a strain. Detecting an amount of the strain through the strain gages 136, an amount of extension or contraction of coil spring 132, i.e., the magnitude of the force moving the control handle 110 forward or backward, can be detected. Therefore, the acceleration/deceleration control can be performed by control unit 74 and drive unit 70 in the same manner as in case of the control bar 60 in FIG. 15. (Reference is made to FIG. 14.)

Next described is a case where the operator 68 turns to the right or to the left while grasping the control handle 110. In this case, the block 114 turns to the right or to the left about bearing 118. A rotational angle of the turn is detected by an encoder 128. Since the block 114 is connected to the parallel spring 138 through the plate spring 134, the parallel spring 138 also moves in a same direction with right or left turn of block 114. Further, the parallel spring 138 is connected through the parallel spring 140 to the coil spring 142, and the coil spring 142 is connected to the base 126 fixed on the traveling apparatus. When the block 114 turns to the left or to the right, the other end of parallel spring 138 is pulled by the coil spring 142 in the opposite direction to the rotation direction, producing a strain according to the rotational angle. An amount of the strain is detected by the strain gages 144. Since the block 114 is connected through the coil spring 142 to the base 126, some force is required for rotating the block left or right through the control handle 110. Releasing the force, the control handle 110 returns to the neutral position because of a restoring force of coil spring 142. Namely, the strain gages 144 detect the force necessary for left or right rotation. With the force necessary for rotation and the rotational angle obtained through encoder 128, the steering control can be performed by control unit 74 and drive unit 70 in the same manner as in case of the control bar 60 in FIG. 15.

Next described is a case where the operator 68 moves up or down while grasping the control handle 110. This case occurs when the operator starts ascending or descending the stairs or a slope or when the operator gets over a difference in level of road. Upon ascending or descending the stairs or upon getting over a difference in level the operator 68 needs to transmit a change of operational mode through the control handle 110 to the traveling apparatus. When the operator 68 turns the control handle 110 upward or downward while walking with the control handle 110 in hand, the block 114 rotates upward or downward about bearing 124. An angle of the rotation is detected by encoder 130. Since the block 114 is connected through plate spring 134 and parallel spring 138 to parallel spring 140, the parallel spring 140 moves in the same direction with upward rotation or downward rotation. The parallel spring 140 is interlocked with coil spring 142, which is connected to the base 126 fixed on the traveling apparatus. Because of the connection, upward or downward rotation of block 114 causes the coil spring 142 to pull the other end of parallel spring 140 in the opposite direction to the rotational direction, producing a strain according to the rotational angle. An amount of the strain is detected by strain gages 146. Since the block 114 is interlocked through the coil spring 142 with base 126, some force is required for rotating the block 114 upward or downward through the control handle 110. Releasing the force, the control handle 110 returns to the original neutral position because of the restoring force of coil spring 142. Namely, the strain gages 146 detect the force necessary for the upward or downward rotation. With the force necessary for the rotation and the rotational angle obtained through encoder 130 the traveling mechanism control can be made by control unit 74 and drive unit 70 in the same manner as in case of the control bar 60 of FIG. 15.

Figure 29:
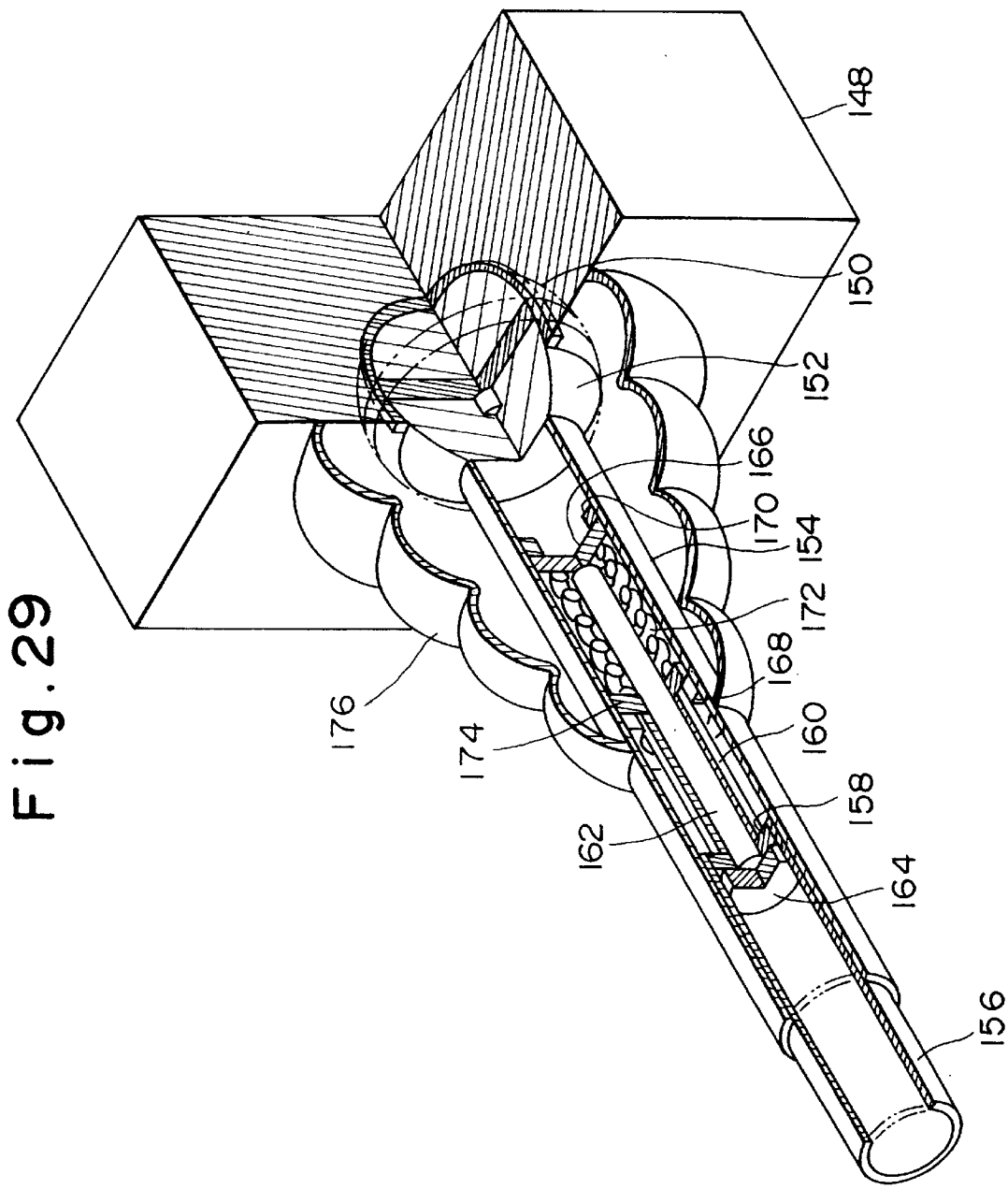
FIG. 29 is a perspective view, partly in cross section, to show another embodiment equipped with a further different mechanism for the control bar from those shown in FIGS. 15 and 28.

FIG. 29 is a perspective cross section to show another embodiment using a mechanism different from those shown in FIGS. 15 and 28. A base 148 is fixed on a traveling apparatus. The base 148 has a spherical holder 150. The holder 150 holds a ball 152 so that the ball can rotate up and down or left and right within a certain angular range. That is, the holder 150 and ball 152 constitute a spherical joint. A cylindrical outer casing 154 is fixed to ball 152. An inner casing 156 is telescopically set in the outer casing 154. A control handle (not shown) is attached to one end of inner casing 156 (left end in FIG. 29). A ring 158 and a force transmission pipe 160 are fixed to the other end of inner casing 156. A shaft 162 is slidably set in the force transmission pipe 160. A disk 164 is fixed to one end of shaft 162 (left end in FIG. 29), and a spring stopper 166 is fixed to the other end. Further, ring stoppers 168, 170 are fixed inside the outer casing 154. The spring stopper 166 is in contact with stopper 170 on one side while it is in contact with one end of compression coil spring 172 on the other side of the spring stopper 166 opposite to the stopper 170. A spring stopper 174 is in contact with the other end of compression coil spring 172 on one side while it is in contact with stopper 168 on the other side of spring stopper 174 opposite to the compression coil spring 172. The compression coil spring 172 exerts a compressive force between spring stopper 166 and spring stopper 174.

The operation of this embodiment is described in the following. When the operator 68 pulls the control handle (not shown) in the longitudinal direction of the inner casing 156 in FIG. 29, the inner casing 156 also moves in the same direction whereby the ring 158 fixed to the inner casing 156 moves the disk 164. Subsequently, the ring 158 moves the spring stopper 166 through shaft 162, compressing the compression coil spring 172. On this occasion the other end of compression coil spring 172 is stationary because it is in contact with stopper 168 through spring stopper 174.

When the operator 68 pushes the control handle in the longitudinal direction of the inner casing 156 in FIG. 29, the inner casing 156 also moves in the same direction. Since the ring 158 and force transmission pipe 160 are fixed to the inner casing 156, one end of force transmission pipe 160 pushes the spring stopper 174, compressing the compression coil spring 172. On this occasion the other end of compression coil spring 172 is stationary because it is in contact with stopper 170 through spring stopper 166.

Although not shown, a mechanism similar to the plate spring 94a and strain gages 96a, 96b shown in FIG. 15 is arranged near the stopper 170 and, similarly, a mechanism similar to the plate spring 94b and strain gages 96c, 96d near the stopper 168. Accordingly, in case of pulling or pushing of the control handle, the strain gages can detect the magnitude of the compressive force exerted on stopper 168 or stopper 170, so that the magnitude of the force pulling or pushing the control handle can be detected, enabling the acceleration/deceleration control by control unit 74 and drive unit 70 in the same manner as in case of the control bar 60 of FIG. 15.

Next described in detail is a rational-angle detecting mechanism in cases where the control handle is moved left and right or up and down to incline the outer casing 154 left and right or up and down. As described above, the outer casing 154 is fixed to the ball 152 and the ball 152 is held in the holder 150 so as to rotate up and down or left and right. Removing a force to incline the outer casing 154, the outer casing 154 returns to the position of FIG. 29, i.e., to the neutral position because of a force of bellows 176.

Figure 30:
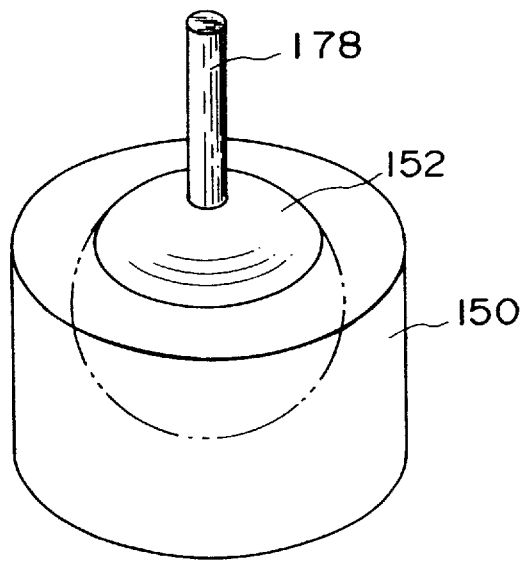
FIG. 30 is a diagrammatic drawing of a general spherical joint.

FIG. 30 is a diagrammatic drawing of a general spherical joint. The spherical joint is composed of a shank 178, a ball 152, and a holder 150. The shank 178 corresponds to the outer casing 154. The ball 152 is arranged as freely rotatable through a bearing of a spherical portion of holder 150 in contact therewith.

Figure 31:
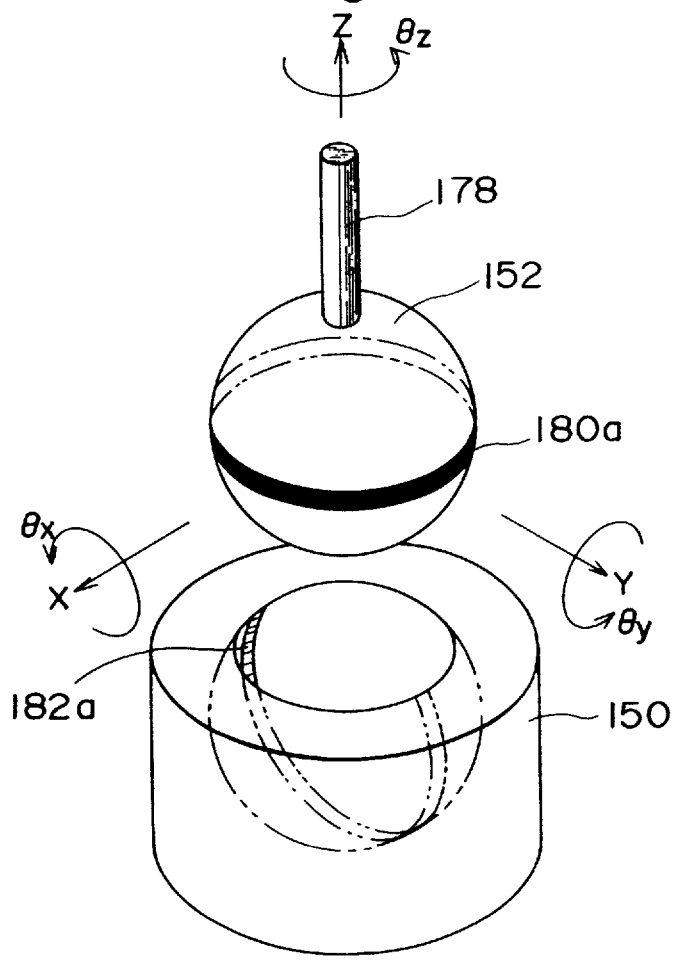
FIG. 31 is a drawing to show a state of the spherical joint with a belt light-emitting member and a belt light-receiving member.

FIG. 31 is a drawing to show a belt light-emitting member 180a arranged on the equator of ball 152, and a belt light-receiving member 182a arranged on a longitude line on the spherical portion of holder 150 as perpendicular to the light-emitting member 180a. To describe the present embodiment, the coordinate system is defined as shown in FIG. 31. Namely, the z-axis is taken along the axis of shank 178, the y-axis along a line connecting two intersections between the light-emitting member 180a and the light-receiving member 182a, and the x-axis along a line perpendicular to the z-axis and the y-axis. Setting such a coordinate system, a rotational angle of ball 152 can be divided into three-directional components, i.e., rotation θz about the z-axis, rotation θx about the x-axis, and rotation θy about the y-axis. Accordingly, the light-receiving member 182a is located on an intersecting line between a plane including the y-axis and the spherical surface of holder 150. FIG. 31 shows the ball 152 separated from the holder 150 to help recognition of the arrangement. An example of light-receiving member 182a is a photoelectric, linear positioning sensor.

Figure 32:
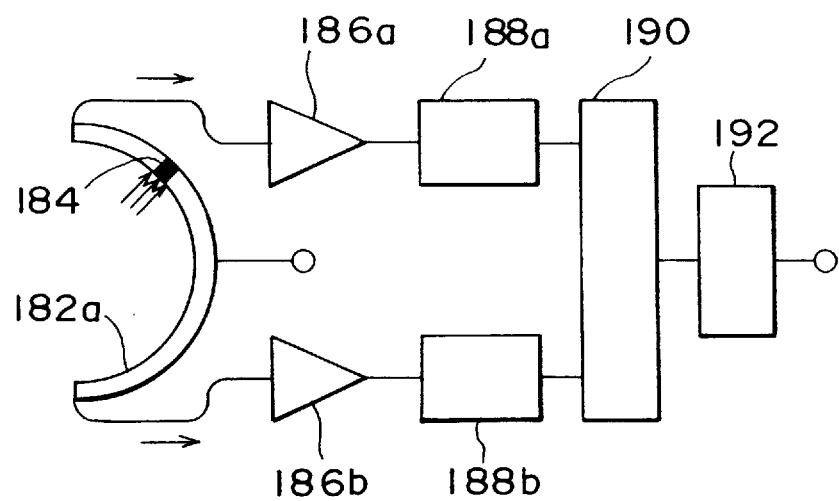
FIG. 32 is a drawing to show a detecting unit for detecting a position of an intersection between the light-emitting member and the light-receiving member, and a processing unit for obtaining a relative angle between a holder and a ball.

FIG. 32 is a drawing to show a detecting unit for detecting positions of intersections between light-emitting member 180a and light-receiving member 182a, and a processing unit for calculating a relative angle between holder 150 and ball 152. A photocurrent is produced at a light-receiving position 184 of an intersection between belt light-emitting member 180a and belt light-receiving member 182a. The photocurrent is converted into a voltage signal at pre-amplifier 186a, 186b and the amplified signal is processed at signal processing circuit 188a, 188b. Further, the signal is processed at the processing circuit 190 to obtain a relative angle between ball 152 and holder 150.

Figure 33:
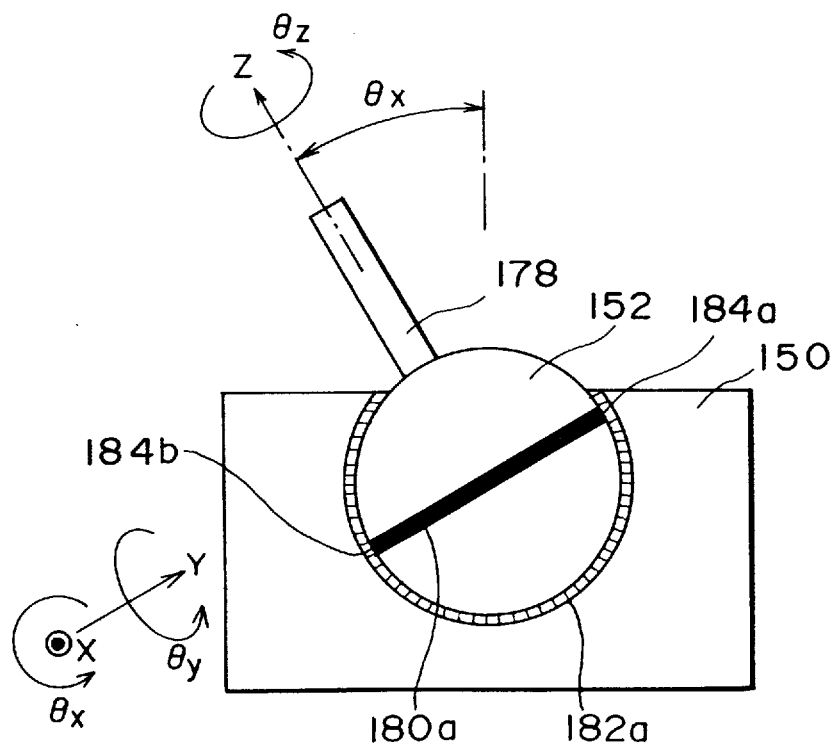
FIG. 33 is a cross-sectional view of the joint with a shank being rotated by an angle $\theta_x$ about the x-axis as taken on a plane perpendicular to the x-axis and including the y-axis.

FIG. 33 is a cross section by a plane perpendicular to the x-axis and including the y-axis where the shank 178 is rotated by a certain angle θx about the x-axis. In FIG. 33, the y-axis is included in the plane of the drawing and the x-axis is perpendicular to the plane. As the shank 178 rotates about the x-axis in FIG. 33, positions of contact points 184a and 184b between the light-emitting member 180a on the equator of ball 152 and the light-receiving member 182a on the longitude line on the spherical portion of holder 150 change depending upon the rotational angle θx of shank 178. Detecting where the contact points 184a, 184b are located in the light-receiving member 182a, the angle θx of shank 178 about the x-axis can be obtained.

Figure 34:
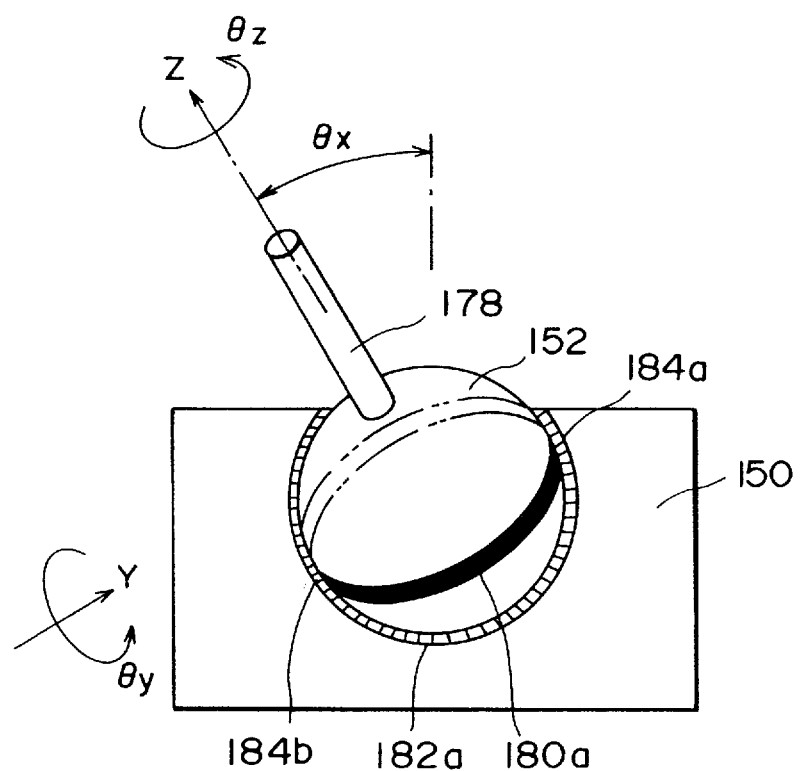
FIG. 34 is a drawing to show a state obtained when the shank is rotated by an angle $\theta_y$ about the y-axis from the state of FIG. 33.

FIG. 34 is a cross section cut by the same plane as FIG. 33, showing a state where the shank is rotated by angle θy about the y-axis while keeping the rotational angle θx about the x-axis in FIG. 33. The x-axis is not shown because it is inclined relative to the plane of FIG. 34. As seen from FIG. 34, the positions of contact points 184a, 184b between light-emitting member 180a and light-receiving member 182a are kept unchanged irrespective of the rotational angle θy about the y-axis as long as θx is constant. When the ball 152 is rotated by θz about the z-axis in the state of FIG. 34, the positions of contact points 184a, 184b are kept unchanged as well. Namely, the angle detecting apparatus shown in FIG. 31 can independently detect only θx, and is characterized in that a change of θy or θz does not affect the detection results of θx at all.

Figure 35:
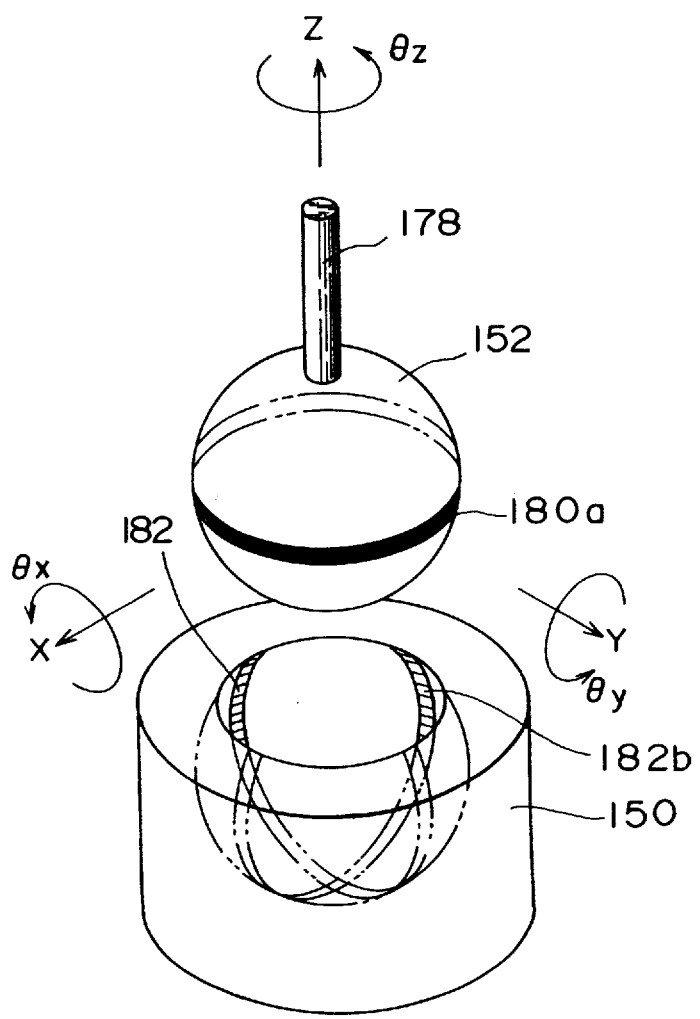
FIG. 35 is a drawing to show a second array of light-receiving member provided on the holder.
Figure 36:
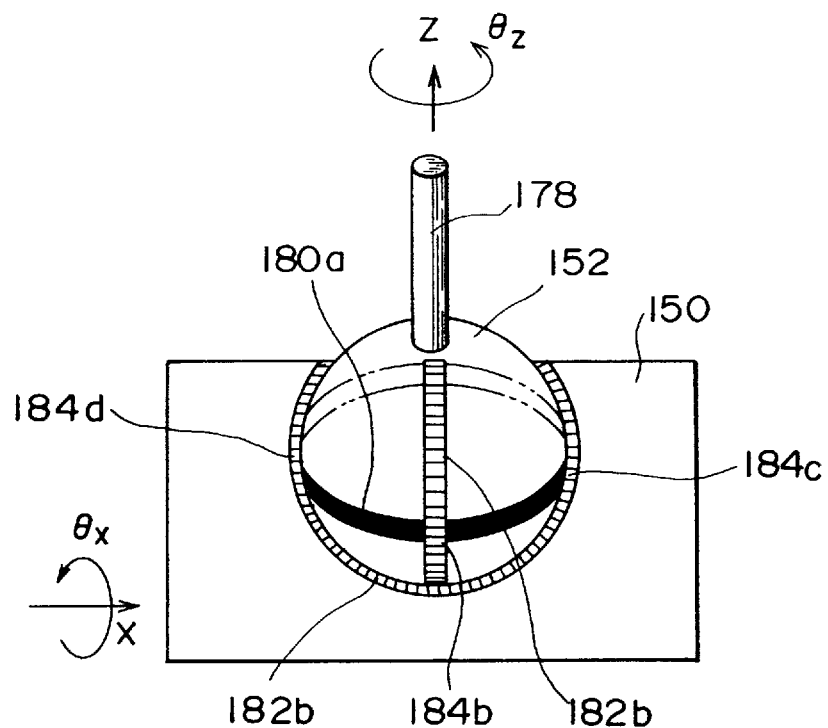
FIG. 36 is a drawing to show a state in which the second array of light-receiving member is set on the holder, as seen from the left on the plane of FIG. 33.
Figure 37:
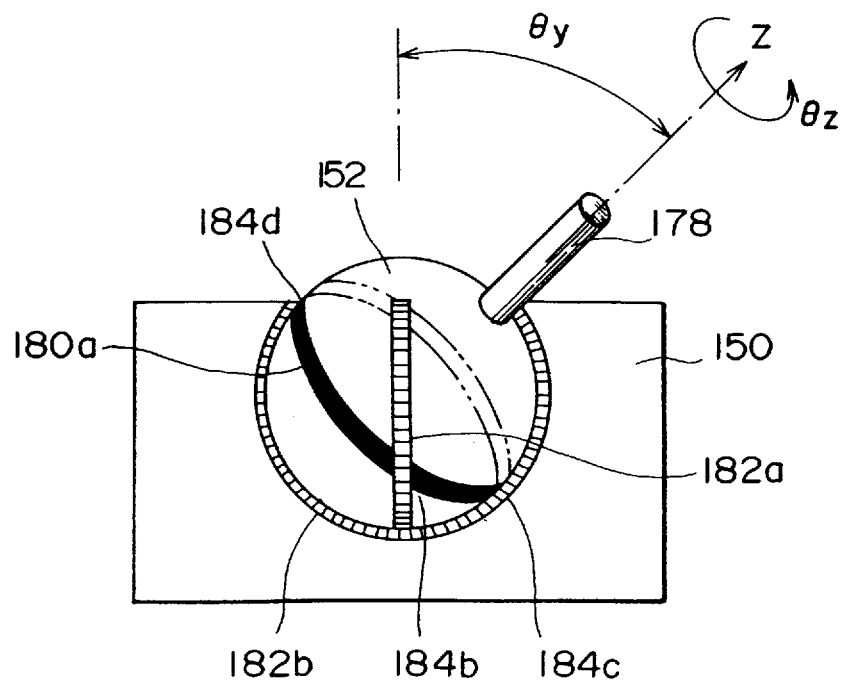
FIG. 37 is a drawing to show a state in which the second array of light-receiving member is set on the holder, as seen from the left on the plane of FIG. 34.

FIG. 35 shows an arrangement in which a second line of light-receiving member 182b is provided on another longitude line on the spherical portion of holder 150 so that it is perpendicular to the light-receiving member 182a in FIG. 31. Since the light-receiving member 182a is on the plane including the y-axis, the light-receiving member 182b is present on the plane including the x-axis. FIG. 36 is a drawing taken from the left of the plane of FIG. 33 with the light-receiving member 182b, and FIG. 37 is a drawing taken from the left of the plane of FIG. 34 with the light-receiving member 182b. In FIG. 36 the x-axis is horizontal on the plane. In FIG. 37 the x-axis and the y-axis are inclined relative to the plane of the drawing. Let contact points 184c, 184d be intersections between the light-emitting member 180a arranged on the equator of ball 152 and the light-receiving member 182b on the longitude line on the spherical portion of holder 150. Arranging the light-receiving member and light-emitting members as described, the rotational angle θx about the x-axis can be detected from the positions of contact points 184a, 184b, as described previously, and the rotational angle θy about the y-axis from the positions of contact points 184c, 184d, independently of each other.

In FIG. 36 and FIG. 37, the positions of contact points 184a, 184b, 184c, 184d are kept unchanged when the shank 178 rotates about the z-axis, i.e., about its own axis. In summary, the angle detecting apparatus shown in FIG. 35 can independently detect θx and θy and is characterized in that a change of θz does not affect the detection results of θx and θy at all.

Figure 38:
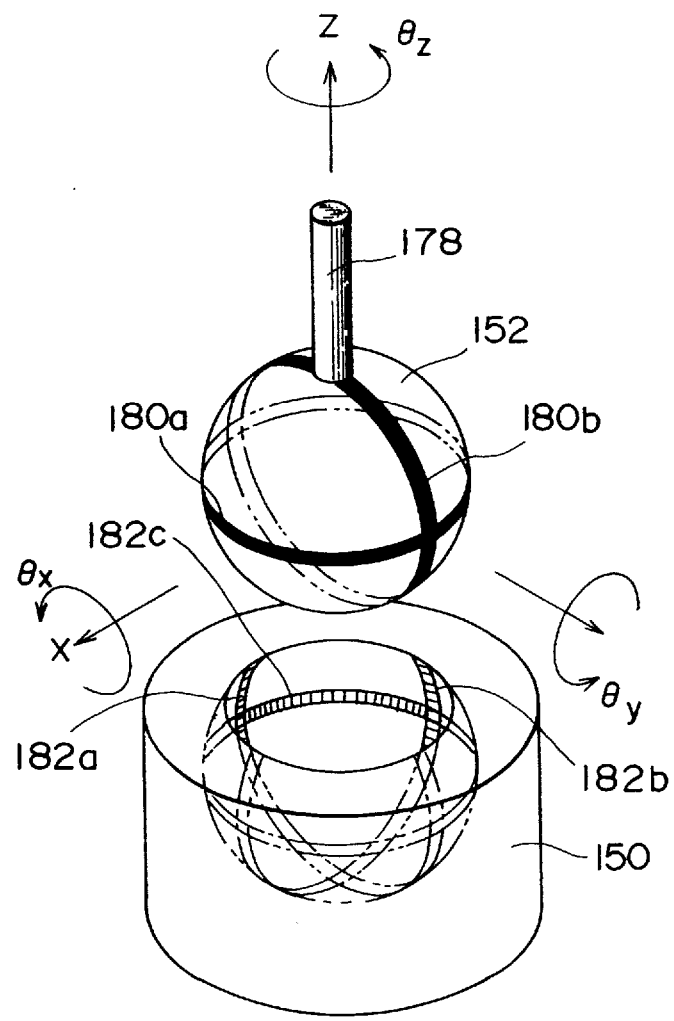
FIG. 38 is a drawing to show a rotational-angle detecting apparatus provided with a second array of belt light-emitting member and a third array of belt light-receiving member.
Figure 39:
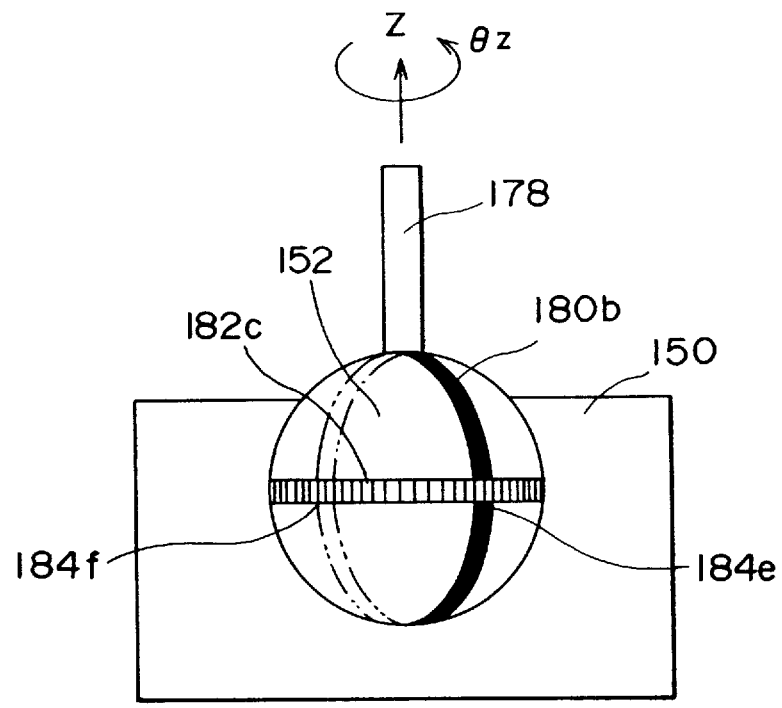
FIG. 39 is a drawing to show a method for detecting a rotational angle about the z-axis.

FIG. 38 shows an arrangement where a second line of belt light-emitting member 180b is arranged on a longitude line of ball 152 as being perpendicular to the light-emitting member 180a in FIG. 35 and a third line of belt light-receiving member 182c is on the equator of holder 150 as being perpendicular to the light-receiving members 182a and 182b. FIG. 39 is a front elevation of FIG. 38. In FIG. 39 the light-emitting member 180a and light-receiving members 182a, 182b are omitted to avoid complexity.

When the shank 178 is rotated by θz about the z-axis in FIG. 39, positions of contact points 184e, 184f between the light-emitting member 180b and light-receiving member 182c change. Accordingly, detecting where the positions of contact points 184e, 184f are located in the light-receiving member 182c, the rotational angle θz of shank 178 about the z-axis can be obtained.

Even if the shank 178 rotates about the x-axis or about the y-axis, the positions of contact points 184e, 184f are kept unchanged without rotation about the z-axis. Namely, the angle detecting apparatus shown in FIG. 38 can detect θx, θy, and θz independently of each other.

Figure 40:
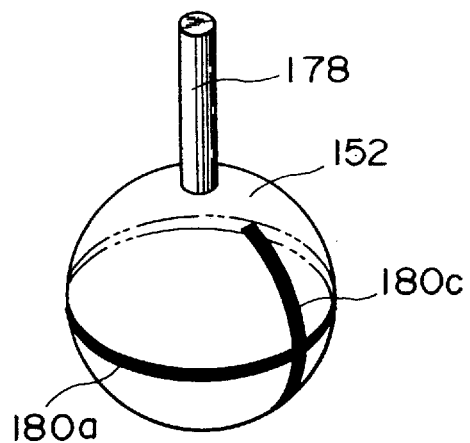
FIG. 40 is a drawing to show a partial light-emitting member arranged on a longitude line on a ball.

FIG. 40 shows an arrangement where a light-emitting member 180c is set only on a part of a longitude line of ball 152. The light-emitting member 180b in FIG. 38 may be constructed like the light-emitting member 180c in FIG. 40 only on a part of a longitude line of ball 152 as long as θx and θy are limited within a certain range.

In case of the arrangement off FIG. 38 with two lines of light-emitting members and three lines of light-receiving members, there is a chance that the light-emitting member 180a and the light-receiving member 182c are overlaid on each other over the entire circumference or a chance that the light-emitting member 180b and light-receiving member 182a or 182b are overlaid on each other over the entire circumference, depending upon the angle. Such accidents disable the angular detection effected by detecting positions of contact points.

To avoid such a problem, the wavelength of light emitted from light-emitting member 180a is differentiated from that of light-emitting member 180b. An example is such that the light-emitting member 180a emits green light and the light-emitting member 180b emits red light. Also, the light-receiving members 182a, 182b are arranged with photodetectors which can detect only green light while the light-receiving member 182c with photodetectors which can detect only red light. Supposing the light-emitting member 180b is overlaid on the light-receiving member 182a in such an arrangement, the light-emitting member 180b emitting the red light does not affect the light-receiving member 182a which can detect only the green light.

The above example showed discrimination utilizing the wavelengths of light. Actually, the present invention is not limited to the discrimination with wavelengths, but may employ any means which can discriminate light from light-emitting member 180a from that from light-emitting member 180b. For example, discrimination is possible with pulse beams having different pulse widths or with light beams having different intensities.

Figure 41:
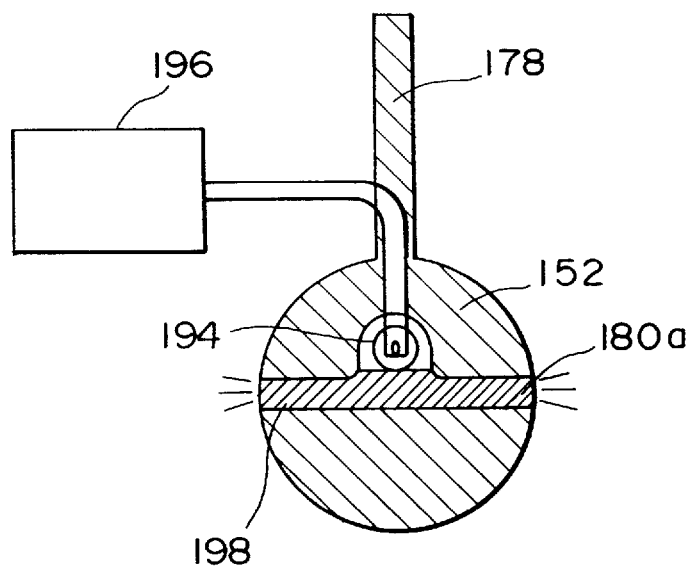
FIG. 41 is a drawing to show an example of a light supply unit for supplying light to a light-emitting member.

FIG. 41 shows an example of means for supplying light to light-emitting member 180a. A light emitter 194 is set inside the ball 152 of spherical joint. A power source 196 for lighting the light emitter 194 is located outside the spherical joint and is connected through wires with the light emitter 194 inside the ball 152. It is evident that the power source 196 can be set at any place, for example inside the shank 178. Light emitted from the light emitter 194 is guided through inside light guide 198 made of a transparent material such as glass, to the light-emitting member 180a. Although the description concerned the example where the light emitter 194 was set inside the ball 152, another arrangement may be such that a light emitter is set outside the ball 152 and light therefrom is guided through means such as an optical fiber to inside ball 152. Similar means may be employed in the cases where the light-emitting member 180b is added as shown in FIGS. 38, 39, and 40.

The above embodiments showed an arrangement for only θx as detection of angle about a single axis and an arrangement for a combination of θx and θy as detection of angle about two axes. The same technology permits one to achieve a single-axis-angle detecting apparatus which can detect only θz or a double-axis-angle detecting apparatus which can detect a combination of θz and θx or a combination of θz and θy.

FIG. 42 is a perspective cross section to show an embodiment in which another rotational-angle detecting mechanism is applied to the mechanism of FIG. 29. Next described is the rotational-angle detecting mechanism employed in this embodiment.

Figure 43:
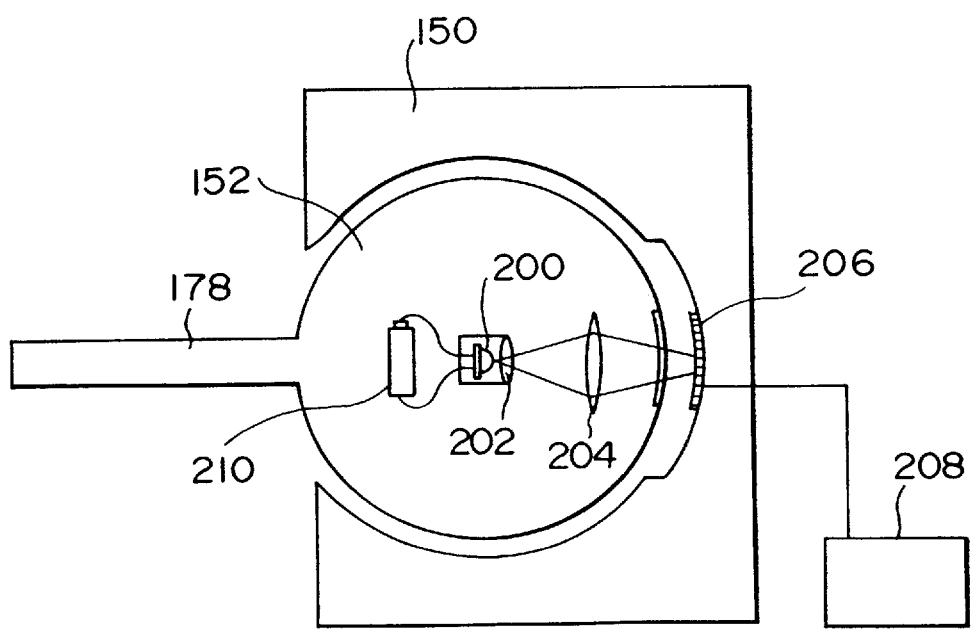
FIG. 43 is a schematic cross section of the rotational-angle detecting apparatus with the spherical joint employed in the embodiment of FIG. 42.

FIG. 43 is a schematic cross section of a rotational-angle detecting apparatus with a spherical joint applied herein. The following description concerns the embodiment of rotational-angle detecting apparatus with the spherical joint.

The spherical joint is composed of a shank 178, a ball 152, and a holder 150. The ball 152 can be freely rotated through shank 178 with a bearing of a spherical portion of holder 150 in contact therewith. A light-emitting element 200 (for example, LED) is set in ball 152 (or holder 150) in the spherical joint. Light from the light-emitting element 200 passes through lens 202 and lens 204 to form a light spot on a light-receiving element 206 and is subjected to photoelectric conversion. The photoelectrically converted signal is processed by a processing unit 208. The lens 202 is for adjusting the light from the light source into a desired spot size and the lens 204 is for making the light from lens 202 incident normally into the light-receiving portion. The present embodiment is so arranged that the light-emitting element is set in the ball 152 and the light-receiving element in the holder 150, but the light-emitting element may be set in the holder 150 and the light-receiving element in the ball 152. Further, the present embodiment has an emission power supply 210 inside the ball 152, but it can be set outside the ball 152 with an optical fiber guiding light therefrom. As the shape of the light-receiving portion there are two types, a spherical light-receiving portion and a light-receiving portion in combination of planes of small area. The sizes of the spot and the light-receiving element are determined depending upon a range of angle to be detected.

Next described is the operation of the detecting apparatus having the above basic construction and using a quarterly divided photodetector as a divided light-receiving member.

Figure 44A:
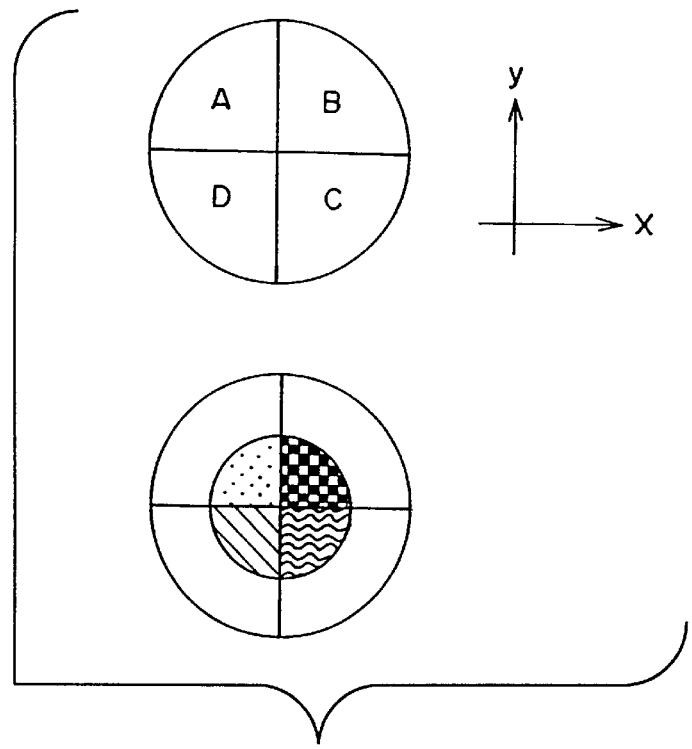
FIGS. 44a and 44b are drawings to show a relation between the initial position of a spot on a light-receiving surface of a quarterly divided light-receiving element and a position after a ball moved.
Figure 44B:
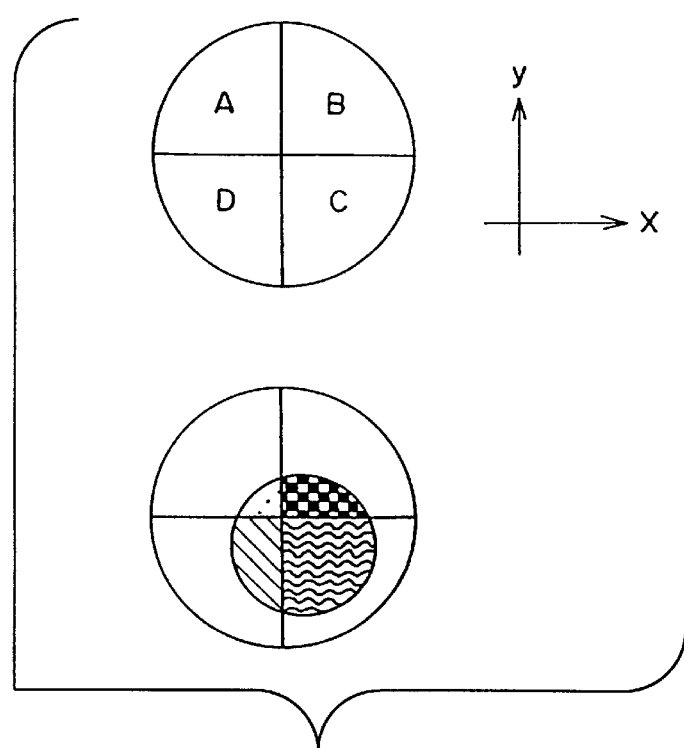

FIGS. 44a and 44b and drawings to illustrate four divided regions A, B, C, D in the quarterly divided photodetector, an initial position of a spot on a light-receiving surface, and a position after the ball moved a certain angle. Light emitted from the light source is guided through the lenses to be focused on the quarterly divided light-receiving portions A, B, C, D in the form of spot. A state at this moment is defined as the initial position. As the ball moves a certain angle, the light spot formed on the light-receiving portions also moves with the ball. On this occasion an angular change from the initial position is attained as a change in voltage outputs from the divided light-receiving portions. Since a displacement of the light spot from the initial position and the rotational angle to be detected are in a proportional relation, the rotational angle can be obtained from the displacement of the light spot.

Figure 45:
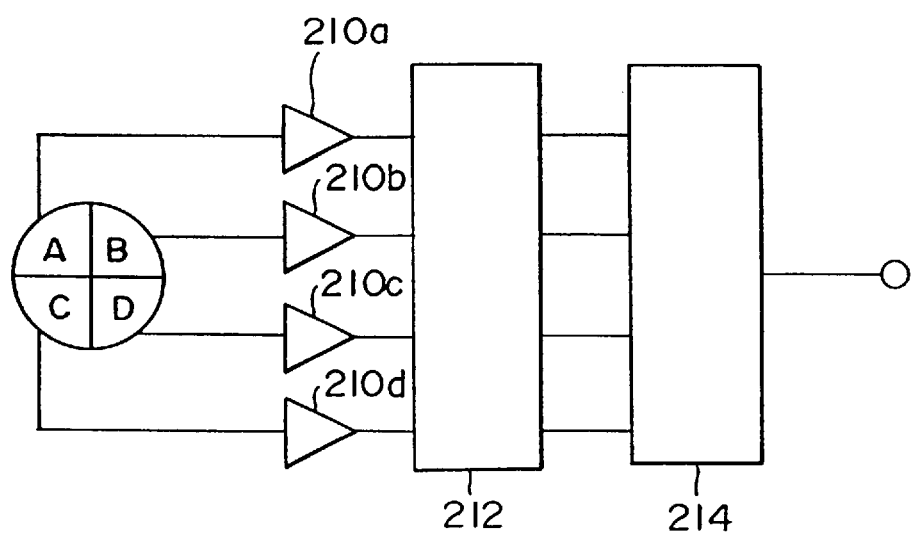
FIG. 45 is a block diagram to show a process for processing output signals from respective light-receiving zones, as executed in a processing unit.

FIG. 45 is a block diagram of a process for processing output signals from the light-receiving regions as executed in the processing unit 208. A photocurrent produced in each light-receiving region is converted into a voltage signal in pre-amplifier 210a–210d and the signal is processed in signal processing circuit 212 and operation processing circuit 214.

Next described is a method for calculating an angle from the obtained voltage outputs while receiving light emitted from the light-emitting member by the divided light-receiving surfaces.

Light impinging on each light-receiving region A, B, C, D is subjected to photoelectric conversion to be converted into a voltage. Letting S(N) be an illuminated area on light-receiving portion N (N=A, B, C, D), V(N) be a photoelectrically converted voltage of light-receiving portion N, and k be a conversion coefficient for the photoelectric conversion, the following relation holds:

$$V(N)=k \cdot S(N) \qquad (1)$$

When the light spot illuminates the center of divided light-receiving portions, illuminated areas of light-receiving portions are in the following relation:

$$Si(A)=Si(B)=Si(C)=Si(D).$$

Here, letting Vi(N) be a photoelectrically converted voltage of light-receiving portion N, the voltages obtained from the light-receiving portions are in the following relation from formula (1):

$$Vi(A)=Vi(B)=Vi(C)=Vi(D).$$

When the shank 178 rotates angle θx about the x-axis and angle θy about the y-axis to move the light spot from the center position, the angles θx, θy can be obtained as follows. Let Sm(N) be an area of a light-receiving portion N in this state, Vm(N) be a photoelectrically converted voltage of light-receiving portion N, and Wx(n) and Wy(n) be the X coordinate and Y coordinate of the barycenter of the light spot on light-receiving portion N. In this case, the coordinates of the barycenter of the light spot are obtained by the following formulas.

$$P(X) = \frac{Wx(A) \cdot Sm(A) + Nx(B) \cdot Sm(B) + Wx(C) \cdot Sm(C) + Wx(D) \cdot Sm(D)}{Sm(A) + Sm(B) + Sm(C) + Sm(D)}$$

$$P(Y) = \frac{Wy(A) \cdot Sm(A) + Wy(B) \cdot Sm(B) + Wy(C) \cdot Sm(C) + Wy(D) \cdot Sm(D)}{Sm(A) + Sm(B) + Sm(C) + Sm(D)}$$

In the above formulas, Wx(A), Wx(D), Wy(C), Wy(D) are negative values.

Accordingly, letting L be a distance from the center of ball 152 to the surface of light-receiving member, the following relations hold:

$$\tan \theta x = P(Y)/L$$

$$\tan \theta y = P(X)/L.$$

Thus, the rotational angles θx, θy about the x-axis and about the y-axis can be expressed as follows:

$$\theta x = \tan^{-1} P(Y)/L$$

$$\theta y = \tan^{-1} P(X)/L.$$

Another embodiment is next explained. The above embodiments are arranged to make the traveling apparatus follow up the operator while keeping constant the distance between the operator and the traveling apparatus.

The traveling apparatus of this type, however, will cause the operator to get tired after long-time work because a constant force always acts on the operator during travel of the traveling apparatus. Also, there is a time delay due to response property of a drive motor between pushing or drawing operation of the transmitting member and movement of the traveling apparatus, which could make manipulation rather difficult where the operator performs fine control of velocity, for example, when the operator puts the traveling apparatus into a garage or when the operator goes with the traveling apparatus through a narrow area.

The traveling apparatus according to the present embodiment is provided with a control method in which the acceleration of the traveling apparatus is proportional to the length of expansion of the transmitting member telescopically arranged and a control method in which the velocity of the traveling apparatus is similarly proportional to the length of expansion of the transmitting member telescopically arranged. The former control method will be called as "acceleration control" method and the latter control method as "velocity control" method.

In the "acceleration control" method, when the length of expansion of the transmitting member is zero, that is, when the transmitting member is located at the neutral position, the acceleration of the traveling apparatus is zero; thus, when the traveling apparatus is stopped, it is kept stationary; when it is moving at a certain velocity, it continues moving at constant velocity as keeping the velocity. If the apparatus is so arranged that a force proportional to the length of expansion of the transmitting member is exerted on the operator, the operator needs no force while moving at constant velocity. With deceleration of the operator, the transmitting member contracts from the neutral position, so that the length of expansion takes a negative value. Since the acceleration of the traveling apparatus is proportional to the length of expansion, the acceleration of the traveling apparatus also takes a negative value, resulting in decreasing the velocity of the traveling apparatus. As the velocity of the traveling apparatus decreases, an amount of contraction of the transmitting member becomes gradually smaller. When the velocity of the traveling apparatus finally becomes equal to the velocity of the operator, the amount of contraction (length of expansion) of the transmitting member becomes zero and the acceleration of the traveling apparatus also becomes zero, whereby the traveling apparatus becomes moving again at constant velocity.

The "acceleration control" method is a control method very effective in moving the traveling apparatus at constant velocity because no force is needed. It is, however, not suitable for the cases where fine velocity adjustment is needed. Therefore, the "velocity control" method is preferred upon garaging or upon passage through the narrow area. Since the length of expansion of the transmitting member is proportional to the velocity of the traveling apparatus in the "velocity control" method, the operator must continuously put a constant force on the transmitting member when desiring to move the traveling apparatus at constant velocity. Thus, this method is not suitable for long-time work, but it has such a feature that the fine velocity adjustment is easier than in the "acceleration control" method.

In the present embodiment, the above two types of control methods can be selectively used as manually or automatically switching one from another depending upon operating conditions. When the automatic switching is employed, the traveling apparatus can be easily controlled not only in normal traveling, but also in traveling requiring the fine velocity control.

This embodiment will be explained in detail with reference to the accompanying drawings.

Figure 46:
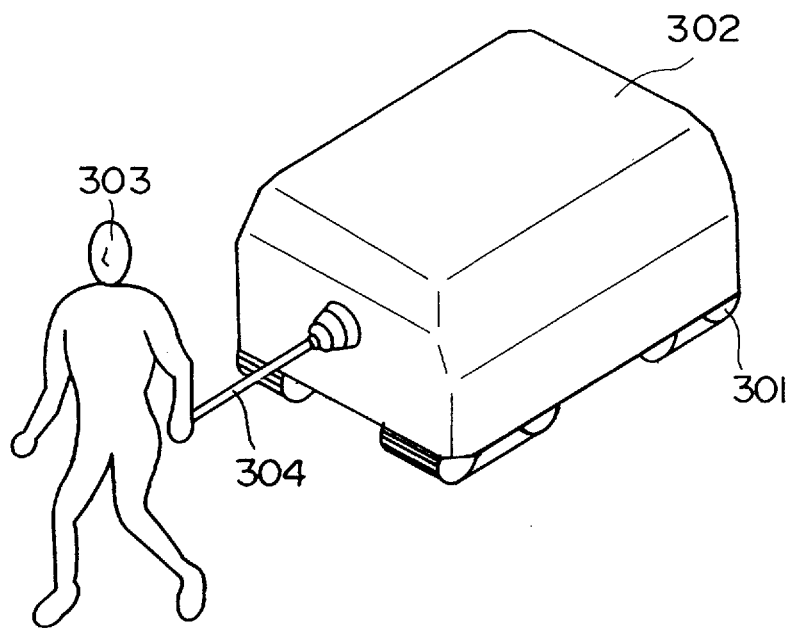
FIG. 46 is a perspective view to conceptually show an embodiment of the present invention.

FIG. 46 is a perspective view of the construction of the traveling apparatus using the follow-up control method of this embodiment, as a drawing similar to FIG. 13. FIG. 46 shows a state in which the operator 303 is manipulating the traveling apparatus 302 having a drive unit 301. In this case, a motion of the operator 303 is transmitted through a transmitting member 304 gripped by the operator 303 to the traveling apparatus 302.

Figure 47:
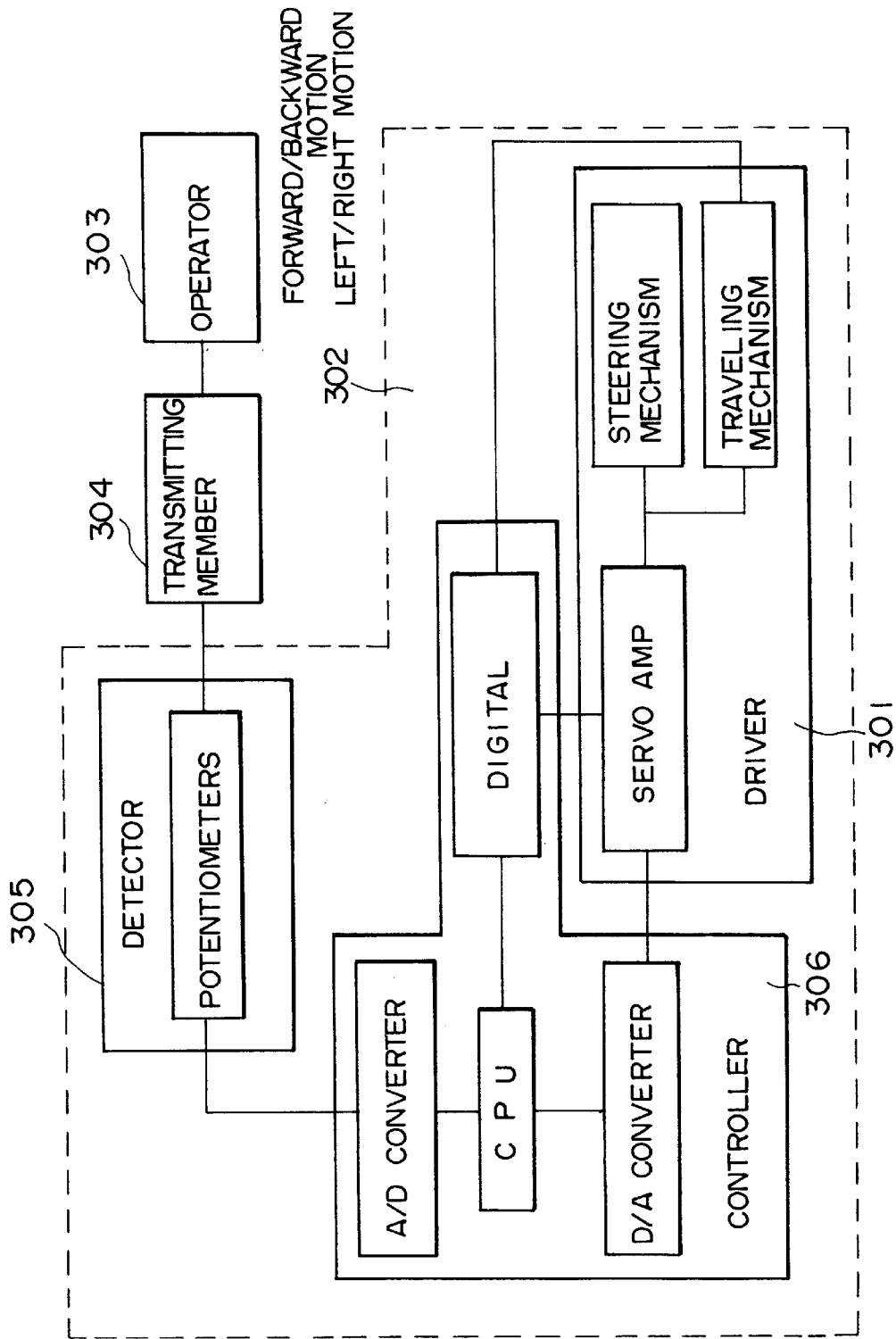
FIG. 47 is a block diagram to show the construction of a control unit for realizing a follow-up control method.

FIG. 47 is a schematic block diagram to show the construction of the present embodiment. The traveling apparatus 302 is provided with the drive unit 301 having a traveling mechanism including wheels, crawlers, etc., a detection unit 305 for detecting the motion of the operator 303 through the transmitting member 304, and a control unit 306 for controlling the drive unit 301, based on a result of the detection by the detection unit 305.

The detection unit 305 is provided with a potentiometer for detecting a change of distance between the operator 303 and the traveling apparatus 302 and a potentiometer for detecting a rotational angle of the transmitting member 304. Voltage signals obtained from the potentiometers are sent to the control unit 306. The control unit 306 consists of an A/D converter, a CPU, a D/A converter, and a digital I/O. The voltage signals sent from the detection unit 305 are converted into digital values in the A/D converter, and thereafter the digital values are sent to the CPU. The CPU executes predetermined processing to calculate a velocity and a steering angle of the traveling apparatus 302 and to output the velocity value and steering angle value through the D/A converter and digital I/O to the drive unit 301.

The drive unit 301 has a servo amplifier, a steering mechanism, and a traveling mechanism including the crawlers, the wheels, etc., and performs control of drive and steering by its steering function and traveling function, based on the velocity value and steering angle value sent from the control unit 306.

Figure 48:
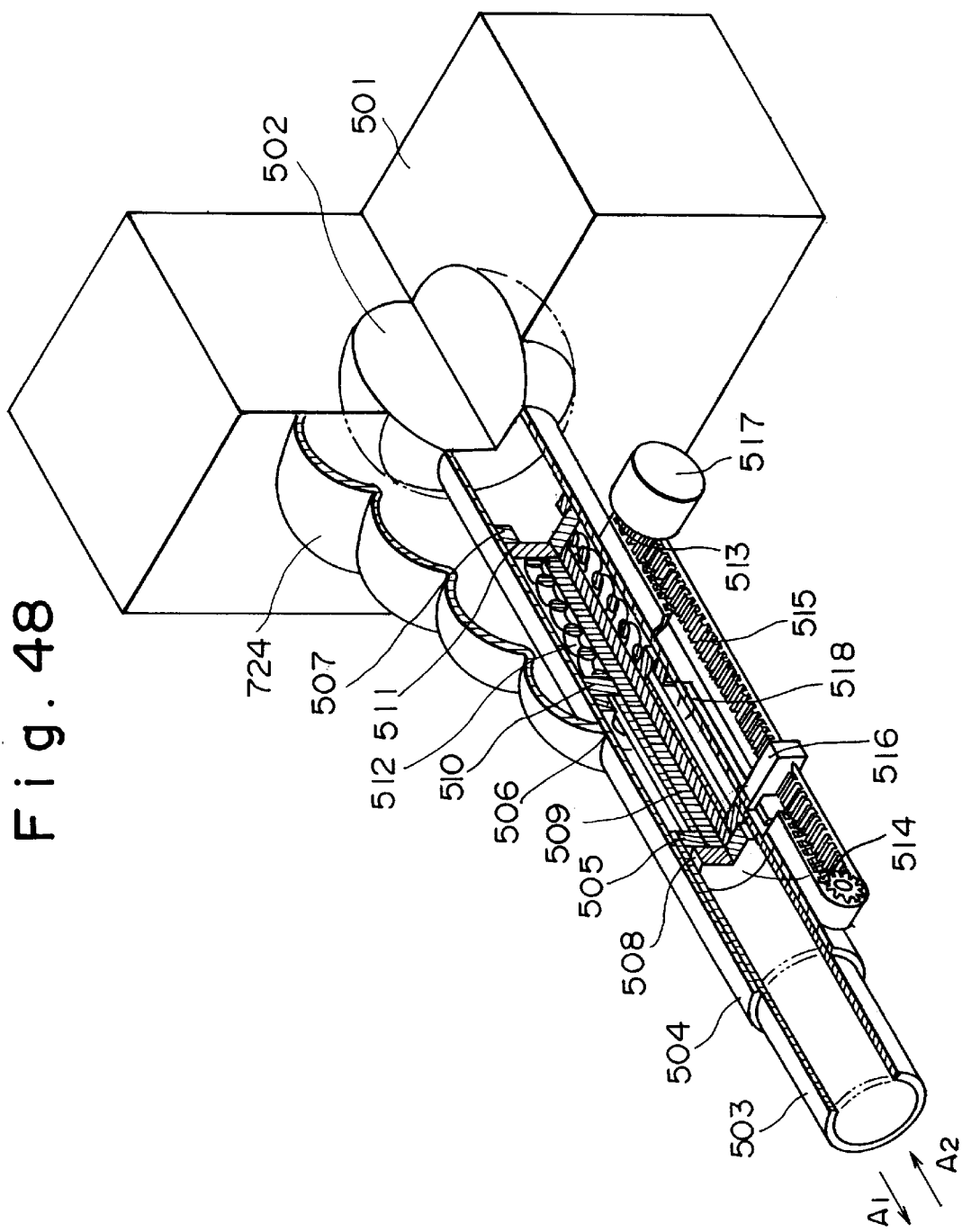
FIG. 48 is a perspective view, partly in cross section, to show the construction of a transmitting member used in the follow-up control method.

Next explained in detail is a method for calculating the velocity value of the traveling apparatus 302 from the voltage signal obtained from the potentiometer in the present embodiment. FIG. 48 is a cross section of the detecting unit for detecting a longitudinal displacement of the transmitting member 304. Here, it is noted that an angle detecting unit for detecting a steering angle is omitted in FIG. 48.

In FIG. 48, an inner casing 503 is arranged as free to slide back and forth on an inner surface of an outer casing 504. Further, the outer casing 504 is fixed to a spherical joint 502 set in a main-body block 501, which is mounted on the traveling apparatus 302, and is thus free to rotate up and down and right and left. Here, the structure of the rotating portion may be any other structure than the spherical joint, for example a gimbals structure. A hollow pipe block 505 is fixed to the end of the inner casing 503, and stopper 506 and stopper 507 are fixed on the inner periphery of the outer casing 504. A shaft 509 penetrates the block 505, and a spring stopper 511 is fixed to one end of the shaft 509 while a stopper 508 to the other end. There are a spring stopper 510 and a compression coil spring 512 between the block 505 and the spring stopper 511. The block 505 and the spring stopper 510 are not fixed.

In FIG. 48, let us suppose that the operator 303 pulls the inner casing 503 in the direction of arrow $A_1$. On that occasion, the inner casing 503, block 505, stopper 508, shaft 509, and spring stopper 511 are pulled together in the direction of arrow $A_1$. Since one end of the compression coil spring 512 is fixed through the spring stopper 510 and stopper 506 to the outer casing 504, the spring stopper 511 compresses the compression coil spring 512 in the direction of arrow $A_1$. Accordingly, a force is exerted in a direction to pull back the operator 303 in proportion to a length of draw of the inner casing 503.

In contrast, when the operator 303 pushes the inner casing 503 in the direction of arrow $A_2$ shown in FIG. 48, the inner casing 503, block 505, and spring stopper 510 are pushed together in the direction of arrow $A_2$. Since one end of the compression coil spring 512 is fixed through the spring stopper 511 and stopper 507 to the outer casing 504, the spring stopper 510 compresses the compression coil spring 512 in the direction of arrow $A_2$. Accordingly, a force is exerted on the operator in a direction to push back the operator 303 in proportion to a length of push of the inner casing 503.

Center shafts of pulley 513 and pulley 514 are fixed to the outer casing 504, and the pulley 513 and pulley 514 are arranged as free to rotate. A timing belt 515 is stretched between the pulley 513 and the pulley 514. The inner casing 503 and timing belt 515 are connected to each other by a belt stopper 516 through a slit 518 provided in the outer casing 504. When the inner casing 503 slides back and forth on the inner surface of the outer casing 504, the timing belt 515 moves back and forth in response to the motion of the inner casing to rotate the pulley 513 and pulley 514. Connecting a rotation shaft of potentiometer 517 to the pulley 513 as shown in FIG. 48, the potentiometer 517 rotates as the pulley 513 rotates in response to the motion of the inner casing 503. Since a value of output voltage from the potentiometer is uniquely determined from an angle of rotation thereof, an amount of movement of the inner casing 503 can be measured by the potentiometer 517. The potentiometer may be of either a contact type or a non-contact type. Instead of the potentiometer, any type of instrument may be employed as long as it can detect an angle, such as a rotary encoder.

Figure 49:
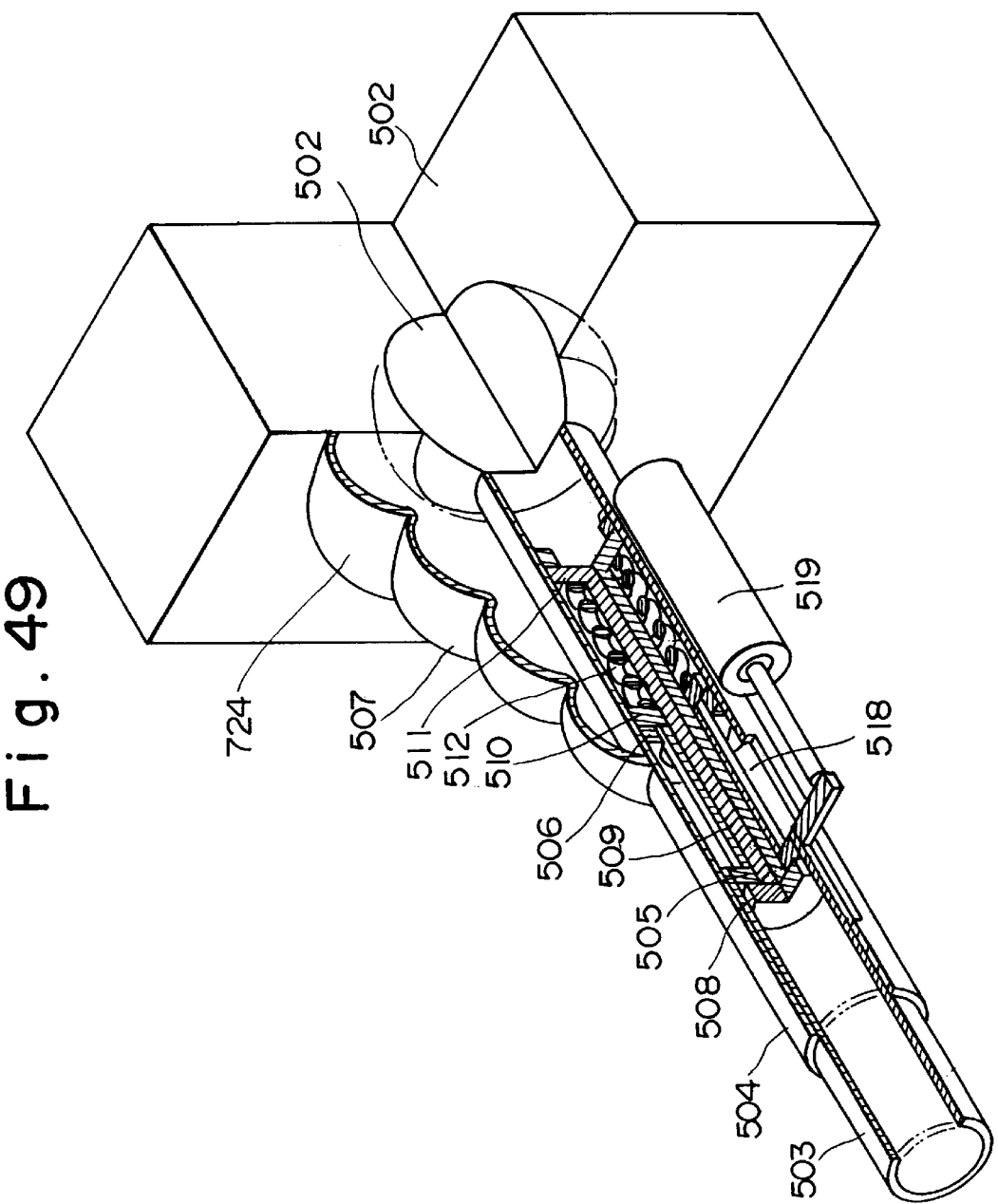
FIG. 49 is a perspective view, partly in cross section, to show the construction of another transmitting member different in construction from that of FIG. 48.

FIG. 49 is a cross section to show another structure of the detecting unit where a linear encoder is used for detection of the amount of longitudinal movement of the inner casing 503.

FIG. 48 showed the example in which the amount of longitudinal movement of the inner casing 503 was detected as converted into a rotation angle of the potentiometer 517, while it can also be measured using the linear encoder 519 as shown in FIG. 49. In either method, the amount of movement of the inner casing 503 is measured as an output voltage value from the potentiometer or the linear encoder, or the like.

In FIG. 48 and FIG. 49, the rotation angle detecting unit, as provided with FIGS. 30 to 41 and described previously, may be provided in the portion of spherical joint 502. Preferably, a cover 724 made of a flexible material such as rubber is provided between the body block 501 and the outer casing 504 in order to prevent dust from intruding into the spherical joint 502.

Figure 50:
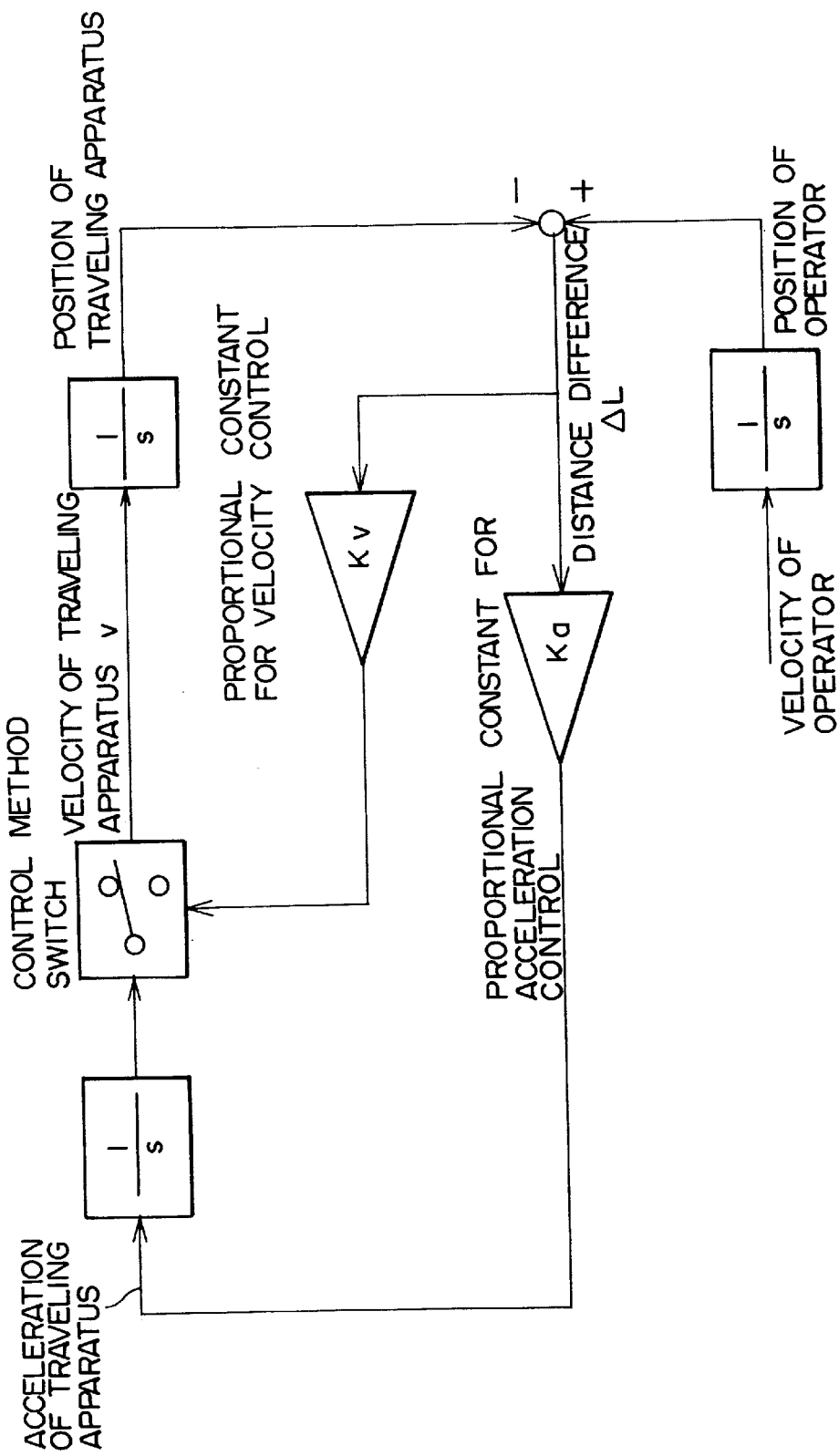
FIG. 50 is a block diagram to show a follow-up control method.

FIG. 50 is a block diagram to show a control method in the present embodiment. In FIG. 50, a distance difference ΔL between a position of the operator 303 and a position of the traveling apparatus 302 corresponds to an amount of expansion (amount of contraction) of the transmitting member 304. In FIG. 50, there are two ways to determine the velocity of the traveling apparatus 302. One of them is a method for proportioning the velocity of the traveling apparatus 302 to the distance difference ΔL (the amount of expansion of the transmitting member 304) through a proportional constant Kv, which will be called as "velocity control" method. The other one is a method for proportioning the acceleration of the traveling apparatus 302 to the distance difference ΔL through a proportional constant Ka, which will be called as "acceleration control" method. Here, the description concerns the control method, but it can also be applicable to the control apparatus. FIG. 50 shows an example in which these two control methods are used as switching the control between them by a switch.

Here, the distance difference ΔL in FIG. 50 can be obtained as expressed in formula (2), based on the output voltage from the potentiometer 517 in FIG. 48 (or the linear encoder 519 in FIG. 49). Further, mathematical representations of the "velocity control" method and "acceleration control" method are, for example, the following formulas (3) and (4), respectively.

$$\Delta L = K_L(V_{Pot} - V_0) \qquad (2)$$

ΔL: distance difference (amount of expansion or contraction of the transmitting member)
$K_L$: distance difference per unit output voltage
$V_{Pot}$: output voltage from potentiometer
$V_0$: output voltage when the transmitting member is at the neutral position The "velocity control" method:

$$v_{vehicle} = K_v \cdot \Delta L \qquad (3)$$

The "acceleration control" method:

$$v_{vehicle} = \int K_a \cdot \Delta L \, dt \qquad (4)$$

Figure 51:
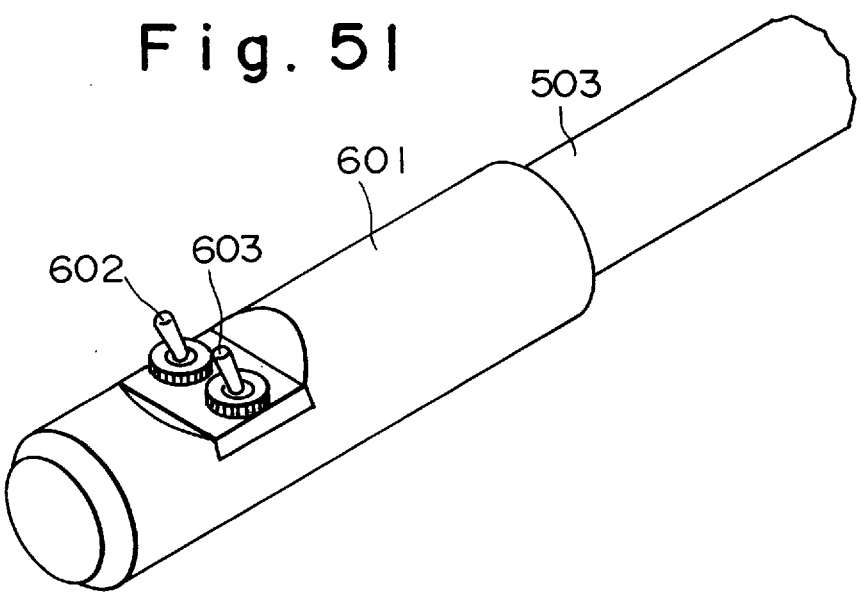
FIG. 51 is a perspective view to show a portion for switching the control method in the follow-up control method.

$v_{vehicle}$: velocity of the traveling apparatus
ΔL: distance difference (amount of expansion or contraction of the transmitting member)
$K_v$: velocity of traveling apparatus per unit distance difference
$K_a$: acceleration of traveling apparatus per unit distance difference Next described is the switching method between the "velocity control" method and the "acceleration control" method. FIG. 51 is a structural drawing of control method switching means to show a grip portion 601 corresponding to a tip end of the transmitting member 304. In the grip portion 601 there are two toggle switches, a first control method switching switch 602 and a second control method switching switch 603. The first control method switching switch 602 is used for switching between manual switching and automatic switching between the "velocity control" method and the "acceleration control" method. When the first control method switching switch 602 is set to the manual switching, the operator 303 performs switching between the "velocity control" method and the "acceleration control" method by selecting an optimum control method according to the circumstances surrounding through the second control method switching switch 603. When the first control method switching switch 602 is set to the automatic switching, the second control method switching switch 603 is disabled.

Next described is the timing of switching between the "velocity control" method and the "acceleration control" method when the first control method switching switch 602 is set to the automatic switching. Basically, the control method for low velocities of the traveling apparatus 302 is the "velocity control" method, while the control method for high velocities is the "acceleration control" method. Let us define a switching velocity vc as a velocity at switching from the "velocity control" method to the "acceleration control" method.

Figure 52:
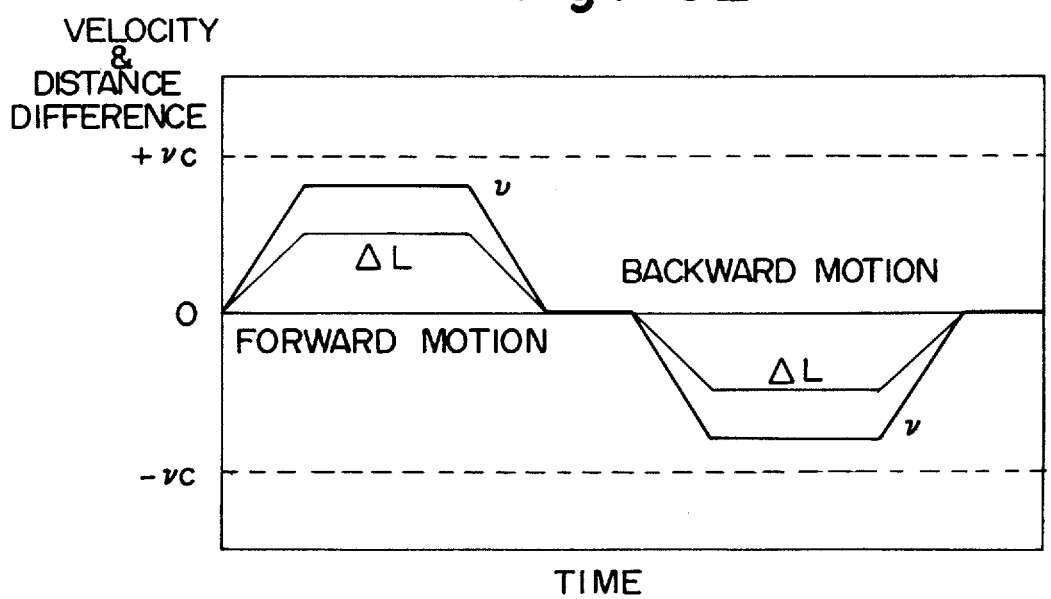
FIG. 52 is an explanatory drawing of control operation to show a relation between the distance difference and the velocity of traveling apparatus in the "velocity control" method.

FIG. 52 is an explanatory drawing of the control operation to show the distance difference ΔL between the operator 303 and the traveling apparatus 302, and the velocity v of the traveling apparatus 302 when the operator pushes and pulls the transmitting member 304 in the state where the absolute value of the velocity v of the traveling apparatus 302 is smaller than the switching velocity vc. Since the absolute value of the velocity v of the traveling apparatus 302 is smaller than the switching velocity vc, the control method is the "velocity control" method. When the distance difference ΔL takes a positive value (or when the transmitting member 304 is pulled), the velocity v of the traveling apparatus 302 is also positive, so that the traveling apparatus 302 moves forward. When the distance difference ΔL takes a negative value (or when the transmitting member 304 is pushed back), the velocity v of the traveling apparatus 302 also takes a negative value, so that the traveling apparatus 302 moves backward. When the distance difference ΔL is zero, the velocity v of the traveling apparatus 302 is also zero, so that the traveling apparatus 302 is stopped.

Figure 53:
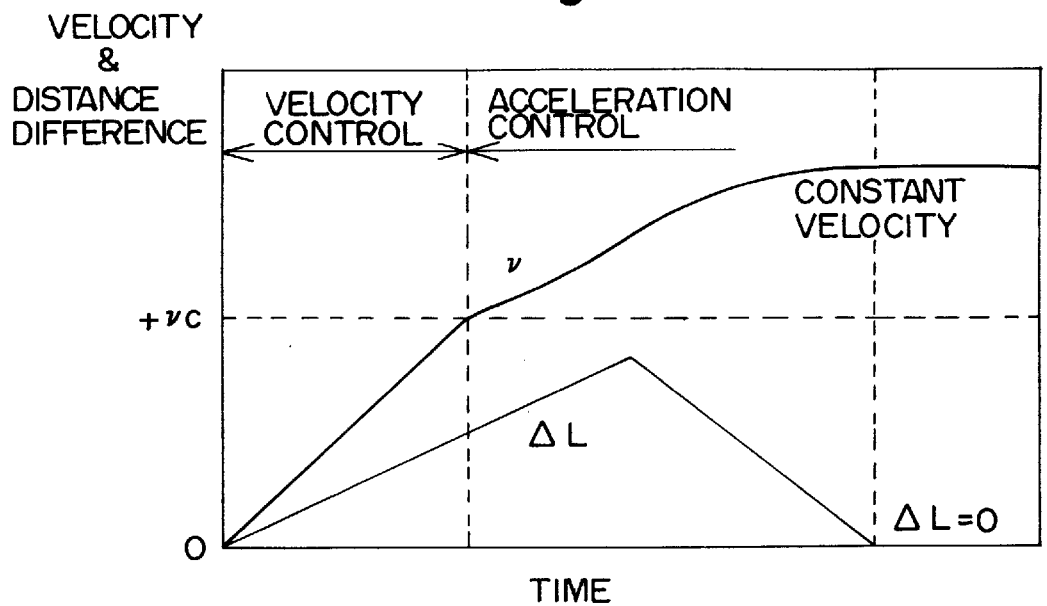
FIG. 53 is an explanatory drawing of control operation to show a relation between the distance difference and the velocity of traveling apparatus in transition from the "velocity control" method to the "acceleration control" method.

Here, let us suppose that the operator 303 pulls the transmitting member 304 from the state where the traveling apparatus 302 is stopped. As the operator 303 continues moving at higher velocity than the traveling apparatus 302, the distance difference ΔL gradually increases, so that the velocity v of the traveling apparatus 302 also continues increasing. When the velocity v of the traveling apparatus 302 reaches the switching velocity vc, the control method is transferred from the "velocity control" method to the "acceleration control" method. FIG. 53 is an explanatory drawing of control operation to show a state in which the control method is transferred from the "velocity control" method to the "acceleration control" method.

In the "acceleration control" method, the acceleration of the traveling apparatus 302 is proportional to the distance difference ΔL. Accordingly, the velocity of the traveling apparatus 302 gradually increases after transferred to the "acceleration control" method. If the velocity of the operator 303 is constant, the distance difference ΔL becomes gradually smaller, then reaching zero at some point. When the distance difference ΔL is zero, the acceleration of the traveling apparatus 302 is zero, so that the traveling apparatus 302 moves at constant velocity. The velocity at this moment coincides with that of the operator 303.

Figure 54:
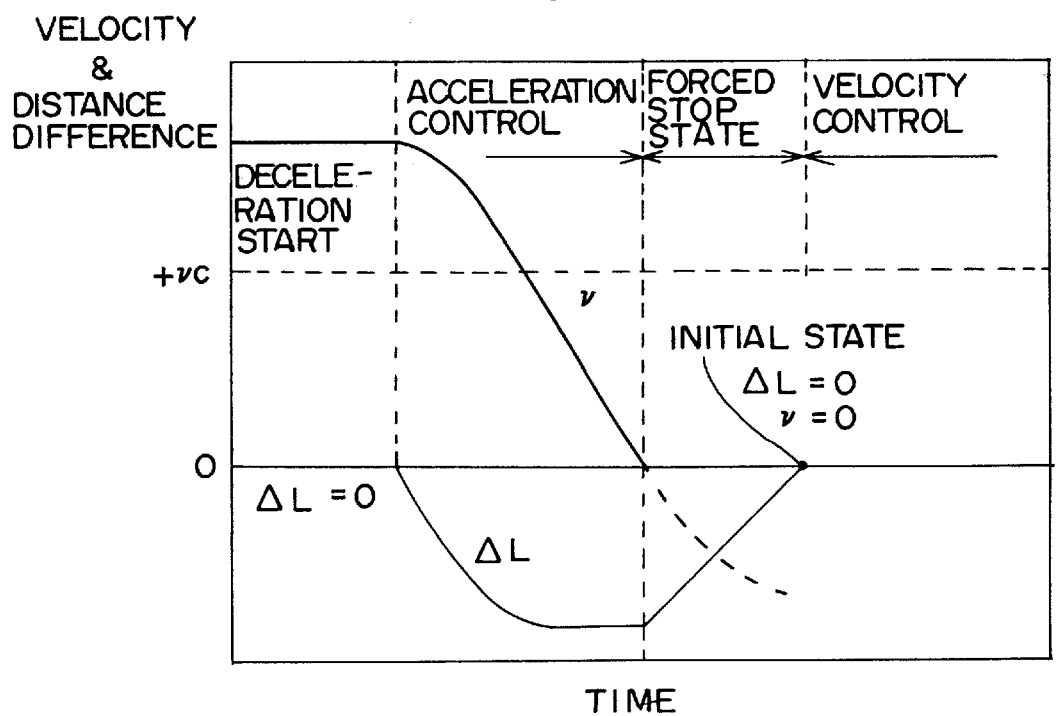
FIG. 54 is an explanatory drawing of control operation to show a relation between the distance difference and the velocity of traveling apparatus in stop of the traveling apparatus in the follow-up control method.

Next described is a case where the traveling apparatus 302 is brought into stop from the state where the traveling apparatus 302 is moving at constant velocity (or where the distance difference ΔL is zero). FIG. 54 is an explanatory drawing of control operation to show a case where the operator 303 stops from the state that the operator 303 is moving with the traveling apparatus 302 at constant velocity.

Since the traveling apparatus 302 is still moving at the point of stop of the operator 303, the transmitting member 304 is pushed in with stop of the operator 303, which shortens the distance between the operator 303 and the traveling apparatus 302, thus making the distance difference ΔL negative. Since the acceleration of the traveling apparatus 302 is proportional to the distance difference ΔL, the acceleration of the traveling apparatus 302 also becomes negative, thus gradually decreasing the velocity v. As the velocity v of the traveling apparatus 302 decreases, it reaches the switching velocity vc some time later. Although in case of the increase of velocity, the control was switched from the "velocity control" method to the "acceleration control" method when the velocity reached the switching velocity vc, the "acceleration control" method is maintained in case of decrease of velocity. The reason is as follows. Since the distance difference ΔL is negative at this point, the velocity v of the traveling apparatus 302 will be negative if the control is switched into the "velocity control" method, which will reverse the traveling direction of the traveling apparatus 302.

The velocity v of the traveling apparatus 302 continues decreasing as the control is maintained in the "acceleration control" method. The velocity v becomes zero some time later. However, the distance difference ΔL at this point is still negative, and the acceleration of the traveling apparatus 302 is also negative. If this state were continued, the velocity v would pass the zero point to become negative as indicated by the dashed line in FIG. 54, reversing the traveling direction of the traveling apparatus 302. This would result in not stopping the traveling apparatus 302. Therefore, when the distance difference ΔL is negative and when the velocity v of the traveling apparatus 302 obtained by integrating the acceleration proportional to the distance difference ΔL changes from positive to negative, the velocity v of the traveling apparatus 302 is forcibly made to become zero regardless of the distance difference ΔL to stop the traveling apparatus 302. This state that the velocity of the traveling apparatus 302 is forcibly made to become zero will be called as "forced stop state." Namely, the apparatus is brought into the "forced stop state" when the sign of a product between the distance difference ΔL and the velocity v of the traveling apparatus 302 changes from negative to positive.

The "forced stop state" is released by returning the transmitting member 304 to the neutral position, that is, by making the distance difference ΔL become zero. At this point, the velocity v of the traveling apparatus 302 is zero and the distance difference ΔL is also zero, thus returning to the initial state shown in FIG. 54. The control method returns from the "acceleration control" method to the "velocity control" method when the "forced stop state" is released. In other words, once the control transfers from the "velocity control" method to the "acceleration control" method, the control is kept in the "acceleration control" method before the "forced stop state" is released.

The above description concerned the method in which the transmitting member 304 was pulled to move the traveling apparatus 302 forward and thereafter the transmitting member 304 was pushed to stop the traveling apparatus 302. The same method can be applicable to the converse case where the transmitting member 304 is first pushed to move the traveling apparatus 302 backward and thereafter the transmitting member 304 is pulled to stop the traveling apparatus 302. As for the condition to be brought into the "forced stop state," since the "forced stop state" is activated when the distance difference ΔL is positive and when the velocity v of the traveling apparatus 302 changes from negative to positive, there is no contradiction to the above condition that the "forced stop state" is activated when the sign of the product between the distance difference ΔL and the velocity v of the traveling apparatus 302 changes from negative to positive.

The above description concerned the method for directly detecting the distance difference ΔL between the traveling apparatus 302 and the operator 303, but the distance difference ΔL may be measured in an indirect manner.

Figure 55:
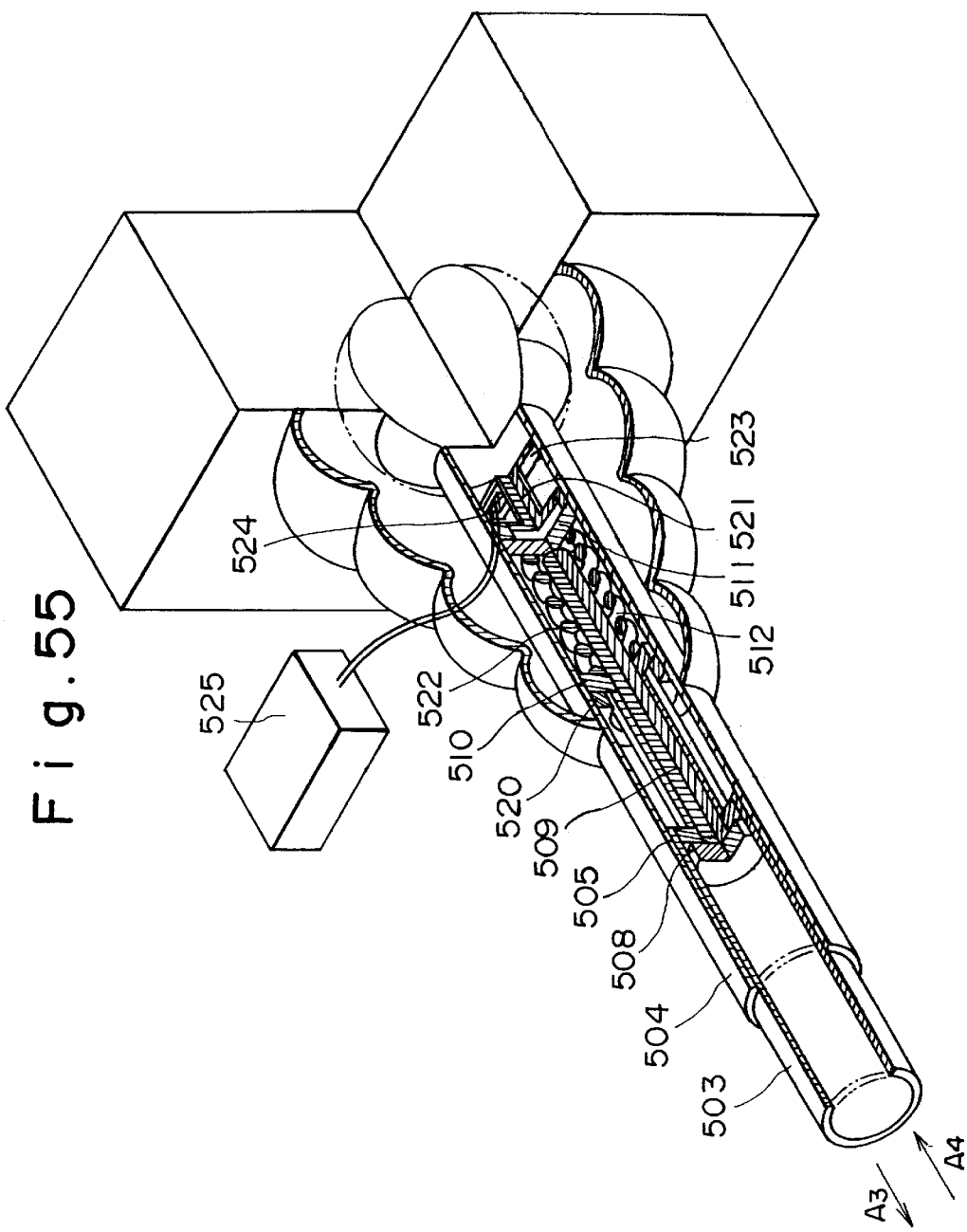
FIG. 55 is a perspective view, partly in cross section, to show the construction of a transmitting member for converting a force detected into a distance difference, used in the follow-up control method.

FIG. 55 is a cross sectional view to show the structure of a detection unit for detecting a force exerted on the compression coil spring 512 and converting it into the distance difference ΔL.

In FIG. 55, the inner casing 503 is free to slide back and forth on the inner surface of the outer casing 504. Further, the outer casing 504 is fixed to the spherical joint 502 provided in the body block 501 mounted on the traveling apparatus 302, and is arranged as free to rotate up and down and right and left. It is noted here that the structure of the rotating portion may be any other mechanism than the spherical joint, for example the gimbals structure. The hollow pipe block 505 is fixed to the end of the inner casing 503, and the ends of a plate spring 523 are fixed to the inner periphery of the outer casing 504. A stopper 521 is fixed in the center of the plate spring 523, and the stopper 521 is fixed to one end of the hollow pipe block 522. Another stopper 520 is fixed to the other end of the block 522, and the block 522 is arranged as free to slide back and forth on the inner periphery of the inner casing 503. The shaft 509 penetrates the block 505, and the spring stopper 511 is fixed to one end of the shaft 509 and the stopper 508 to the other end. There are the spring stopper 510 and compression coil spring 512 between the block 505 and the spring stopper 511. The block 505 and spring stopper 510 are not fixed.

In FIG. 55, let us suppose that the operator 303 pulls the inner casing 503 in the direction of arrow $A_3$. On that occasion, the inner casing 503, block 505, stopper 508, shaft 509, and spring stopper 511 are pulled together in the direction of arrow $A_3$. Since one end of the compression coil spring 512 is fixed to the outer casing 504 through the spring stopper 510, stopper 520, block 522, stopper 521, and plate spring 523, the compression coil spring 512 is compressed by the spring stopper 511 in the direction of arrow $A_3$. Accordingly, a force acts to pull back the operator 303 in proportion to a length of pull of the inner casing 503.

In contrast, when the operator 303 conversely pushes the inner casing 503 in the direction of arrow $A_4$ in FIG. 55, the inner casing 503, block 505, and spring stopper 510 are pushed together in the direction of arrow $A_4$. Since one end of the compression coil spring 512 is fixed to the outer casing 504 through the spring stopper 511, stopper 521, and plate spring 523, the compression coil spring 512 is compressed by the spring stopper 510 in the direction of arrow $A_4$. Accordingly, a force acts to push back the operator 303 in proportion to a length of push of the inner casing 503.

When the compression coil spring 521 is compressed in the direction of arrow $A_3$ or $A_4$, the central portion of the plate spring 523 is pulled by the stopper 521 in the direction of arrow $A_3$ or $A_4$. Meanwhile, since the both ends of the plate spring 523 are fixed to the inner periphery of the outer casing 504, the plate spring 523 is bent. A strain gage 524 is stuck to the plate spring 523, and it can detect strain appearing in the surface of the plate spring 523 according to a bending amount when the plate spring 523 is bent. An amount of strain detected by the strain gage 524 is converted into a voltage value by a gage amplifier 525.

Here, the distance difference $\Delta L$ between the traveling apparatus 302 and the operator 303 in FIG. 55 can be obtained as expressed by the following formula (5), based on the voltage value into which the gage amplifier 525 has converted the amount of strain of the plate spring 523 detected by the above strain gage 524. A value of output voltage $V\epsilon$ per unit load on the plate spring 523 in formula (5) needs to be preliminarily obtained by calibration. After the strain amount of the plate spring 523 is converted into the distance difference $\Delta L$ by formula (5), the control of the traveling apparatus 302 can be carried out in the same manner as in the case of direct detection of the distance difference $\Delta L$.

$$\Delta L = V\epsilon/(K\epsilon \cdot Ks) \quad (5)$$

$\Delta L$: distance difference (amount of expansion or contraction of the transmitting member)

$V\epsilon$: output voltage value from the gage amplifier $K\epsilon$: output voltage per unit load $Ks$: spring constant of the compression coil spring (load per unit distance difference)

Figure 56:
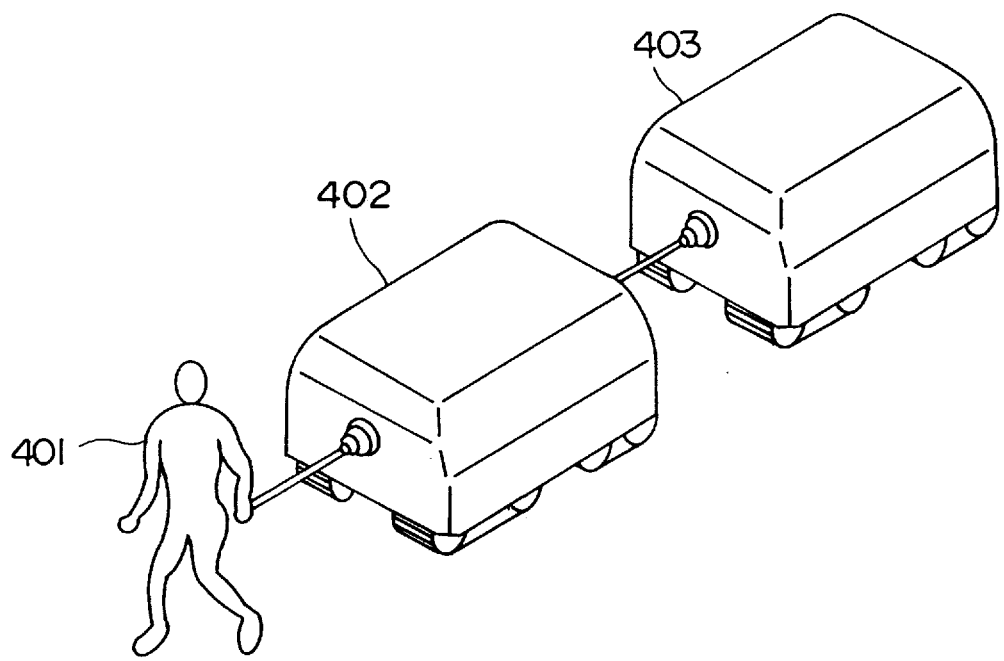
FIG. 56 is a perspective view to conceptually show an example in which an operator controls a plurality of traveling apparatus in the follow-up control method.

Thus far, the description concerned the control method where one operator 303 manipulated one traveling apparatus 302, but using the same control method, one operator 401 can manipulate two traveling apparatus 402, 403 as shown in FIG. 56. In this case, a relation between the operator 401 and the front traveling apparatus 402 is identical to that between the front traveling apparatus 402 and the rear traveling apparatus 403, so that the front traveling apparatus 402 follows up the operator 401 while the rear traveling apparatus 403 follows up the front traveling apparatus 402. The same control can be used for the cases with three or more traveling apparatus.

Figure 57:
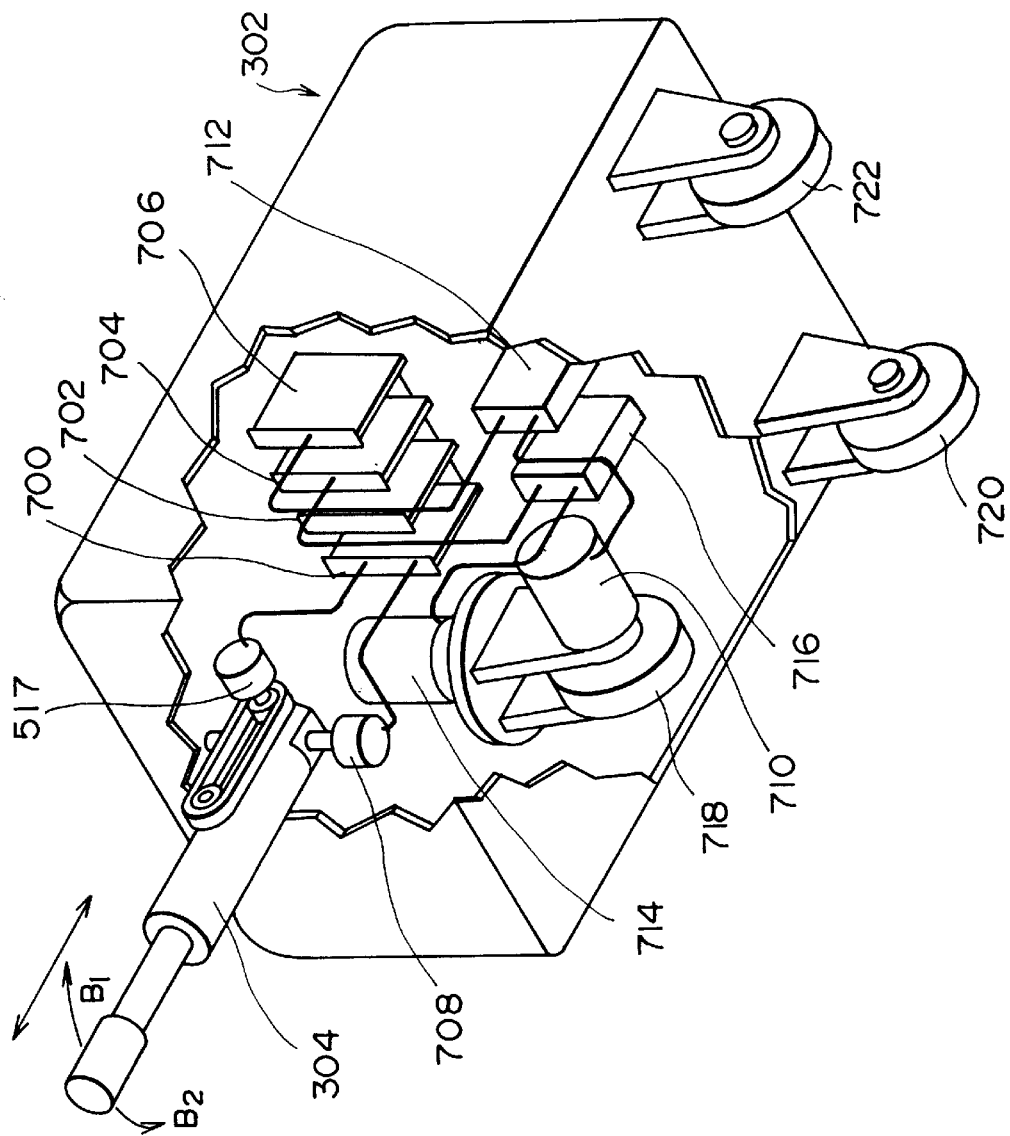
FIG. 57 is a perspective view, partly in cross section, to show the overall construction of the traveling apparatus controlled by the follow-up control method.

FIG. 57 is a perspective view to show the overall structure of the traveling apparatus 302 of the present embodiment. A part of the housing of the traveling apparatus 302 is taken away to show the inside. Arranged in parallel to each other are the A/D converter 700, CPU 702, digital I/O 704, and D/A converter 706 in the control unit 306 as described in FIG. 47. The CPU 702 is connected to the A/D converter 700, digital I/O 704, and D/A converter 706 through a bus set behind, so that the CPU 702 can send or receive signals through the bus.

First, the A/D converter 700 receives the detection signals from the aforementioned potentiometer 517 attached to the transmitting member 304, and the potentiometer 708 for detecting a horizontal angle. The transmitting member 304 is arranged as rotatable left and right (in directions of arrows $B_1$, $B_2$ in FIG. 57) relative to the housing of the traveling apparatus 302, and the potentiometer 708 detects a rotational angle of the transmitting member. Namely, when the operator (not shown) capturing the tip of the transmitting member 304 moves to the left, the transmitting member 304 rotates in the direction of arrow $B_1$, and the potentiometer 708 detects an angle of the rotation. The operation is the same when the operator moves to the right. Analog signals corresponding to the longitudinal extension and horizontal rotation of the transmitting member 304, detected by these potentiometers 517, 708, are converted into digital signals by the A/D converter 700. The CPU 702 performs predetermined processing based on the digital signals to supply commands to a driver 712 for the drive motor 710 and to a driver 716 for the steering motor 714 through the D/A converter 706. These drivers 712, 716 correspond to the servo amplifier in FIG. 47. Also, the CPU 702 sends or receives the digital signals through the digital I/O 704 to or from the drivers 712, 716, and gives predetermined commands to these drivers 712, 716.

Receiving power from the driver 712, the drive motor 710 drives a wheel 718 to drive the traveling apparatus 302 at a velocity according to the command of CPU 702. On the other hand, receiving power from the driver 716, the steering motor 714 changes the direction of the wheel 718, thus changing the traveling direction of the traveling apparatus 302 according to the command of CPU 702. Although only the wheel 718 is driven in this example, the other wheels 720, 722 may be arranged to be driven.

As described above, it becomes possible in the present embodiment to perform the control of the follow-up traveling apparatus moving so as to follow up a man or a moving object such as a car in the simple method. With such traveling apparatus, any one can easily manipulate the apparatus without special labor, technique, or skill. Fields of applications of the apparatus of the present embodiment can include self-propelled article carrying vehicles used in railroad station precincts, airports, harbors, plants, construction sites, amusement parks, golf courses, etc.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Applications No.199680/1993 filed on Aug. 11, 1993, No.237655/1993 and No.237656/1993 filed on Sep. 24, 1993, and No.315451/1993 and No. 315453/1993 filed on Dec. 15, 1993 and No. 307254/1994 filed on Dec. 12, 1994 are hereby incorporated by reference.

What is claimed is:

1. A traveling apparatus which can travel on a flat ground and on stairs, comprising:

a pair of left and right crawler units arranged on either one of a front portion and a rear portion below a body;

an another crawler unit arranged on a portion below the body, said portion being on the rear portion below the body and said portion being said rear portion below the body when the pair of left and right crawler is arranged on the front portion below the body;

a wheel arranged at a center between said pair of left and right crawler units; and a pair of wheels arranged left and right with respect to said another crawler unit;

wherein said wheels are arranged to move up and down relative to said crawler units.

2. A traveling apparatus according to claim 1, wherein said crawler unit arranged on a front portion of the body has a slant portion extending forward and upward of the body and said crawler unit arranged on the rear portion below the body has a slant portion extending backward and upward of the body.

3. A traveling apparatus according to claim 1, wherein said another crawler units can swing about a fulcrum substantially positioned at the center of the length of said another crawler unit.

4. A traveling apparatus according to claim 3, wherein said crawler units are equipped with a damper to control a swinging speed of said another crawler unit.

5. A traveling apparatus according to claim 3, wherein said crawler unit arranged on the front portion below the body swings only in the direction in which the rear end of the body rises and the crawler unit arranged on the rear portion below the body swings only in the direction in which the front end of the body rises.

6. A traveling apparatus according to claim 3, wherein a common shaft is provided to connect the rear end of said another crawler unit arranged in the front portion of the body with the front end of another said crawler unit arranged in the rear portion of the body.

7. A traveling apparatus according to claim 1, wherein said wheels are mounted on a frame arranged to move up and down relative to said another crawler units.

* * * * *